US010863317B2

(12) United States Patent
South et al.

(10) Patent No.: US 10,863,317 B2
(45) Date of Patent: Dec. 8, 2020

(54) INTERACTIVE EMERGENCY VISUALIZATION METHODS

(71) Applicant: PATROCINIUM SYSTEMS, INC., Reston, VA (US)

(72) Inventors: John A. South, McLean, VA (US); Richard Daniel Murphy, Jr., Silver Spring, MD (US)

(73) Assignee: PATROCINIUM SYSTEMS, INC., Reston, VA (US)

( * ) Notice: Subject to any disclaimer, the term of this patent is extended or adjusted under 35 U.S.C. 154(b) by 0 days.

(21) Appl. No.: 16/372,640

(22) Filed: Apr. 2, 2019

(65) Prior Publication Data

US 2019/0261145 A1  Aug. 22, 2019

Related U.S. Application Data

(63) Continuation of application No. 15/783,196, filed on Oct. 13, 2017, now Pat. No. 10,257,663, which is a
(Continued)

(51) Int. Cl.
*H04W 24/00* (2009.01)
*H04W 4/029* (2018.01)
(Continued)

(52) U.S. Cl.
CPC .............. *H04W 4/029* (2018.02); *G01S 1/68* (2013.01); *G01S 5/14* (2013.01); *H04W 4/021* (2013.01);
(Continued)

(58) Field of Classification Search
CPC ......... H04W 4/04; H04W 4/021; H04W 4/22; G01S 5/14; G01S 1/68; G06F 3/0482
(Continued)

(56) References Cited

U.S. PATENT DOCUMENTS 5,563,931 A  10/1996  Bishop et al.
5,894,591 A   4/1999  Tamayo
(Continued)

FOREIGN PATENT DOCUMENTS

WO  WO 2011/059308 A2  5/2011
WO  WO 2013/087719 A1  6/2013
(Continued)

OTHER PUBLICATIONS

Campbell, M., "Apple invention uses iPhone and wearable sensors to monitor activities, automate alarms," http://appleinsider.com/articles/14/06/19/apple-invention-uses-iphone-and-wearable-sensor, Jun. 19, 2014, pp. 1-10.
(Continued)

*Primary Examiner* — Marcos Batista
(74) *Attorney, Agent, or Firm* — Haynes and Boone, LLP

(57) ABSTRACT

Methods for emergency visualization are disclosed. The methods include a computer-implemented method for interactive emergency visualization that includes receiving a notification concerning an incident associated with a multi-floor structure, requesting location information from a user device geographically associated with the multi-floor structure, and receiving, in response to the request, a beacon identifier from the user device, the beacon identifier being associated with a beacon disposed within the multi-floor structure. The method also includes determining on which floor of the multi-floor structure the user device is located based on the beacon identifier and stored information indicating the location of the beacon and displaying a graphical map of the multi-floor structure and information indicating the specific floor on which the user device is located.

23 Claims, 29 Drawing Sheets

Related U.S. Application Data continuation of application No. 15/495,497, filed on Apr. 24, 2017, now Pat. No. 9,794,755.

(60) Provisional application No. 62/326,921, filed on Apr. 25, 2016.

(51) Int. Cl.

| | | |
|---|---|---|
| *G01S 1/68* | (2006.01) | |
| *G01S 5/14* | (2006.01) | |
| *H04W 4/021* | (2018.01) | |
| *H04W 4/33* | (2018.01) | |
| *H04W 4/90* | (2018.01) | |
| *H04W 4/30* | (2018.01) | |
| *G06F 3/0482* | (2013.01) | |

(52) U.S. Cl.
CPC .............. *H04W 4/30* (2018.02); *H04W 4/33* (2018.02); *H04W 4/90* (2018.02); *G06F 3/0482* (2013.01)

(58) Field of Classification Search
USPC ........................................... 455/457; 370/338
See application file for complete search history.

(56) References Cited

U.S. PATENT DOCUMENTS

| | | | |
|---|---|---|---|
| 6,084,510 | A | 7/2000 | Lemelson et al. |
| 6,509,833 | B2 | 1/2003 | Tate |
| 6,745,021 | B1 | 6/2004 | Stevens |
| 6,816,878 | B1 | 11/2004 | Zimmers et al. |
| 6,882,307 | B1 | 4/2005 | Gifford |
| 6,882,837 | B2 | 4/2005 | Fernandez et al. |
| 6,885,936 | B2 | 4/2005 | Yashio et al. |
| 6,909,903 | B2 | 6/2005 | Wang |
| 7,046,140 | B2 | 5/2006 | Adamczyk et al. |
| 7,071,821 | B2 | 7/2006 | Adamczyk et al. |
| 7,109,859 | B2 | 9/2006 | Peeters |
| 7,194,249 | B2 | 3/2007 | Phillips et al. |
| 7,233,781 | B2 | 6/2007 | Hunter et al. |
| 7,301,450 | B2 | 11/2007 | Carrino |
| 7,308,246 | B2 | 12/2007 | Yamazaki et al. |
| 7,348,882 | B2 | 3/2008 | Adamczyk et al. |
| 7,433,672 | B2 | 10/2008 | Wood |
| 7,558,558 | B2 | 7/2009 | Langsenkamp et al. |
| 7,593,740 | B2 | 9/2009 | Crowley et al. |
| 7,848,765 | B2 | 12/2010 | Phillips et al. |
| 7,920,679 | B1 | 4/2011 | Naim et al. |
| 7,924,149 | B2 | 4/2011 | Mendelson |
| 8,045,954 | B2 | 10/2011 | Barbeau et al. |
| 8,073,422 | B2 | 12/2011 | Langsenkamp et al. |
| 8,095,610 | B2 | 1/2012 | Gould et al. |
| 8,103,239 | B2 | 1/2012 | Yamazaki et al. |
| 8,126,479 | B2 | 2/2012 | Morrison |
| 8,126,480 | B2 | 2/2012 | Morrison |
| 8,145,183 | B2 | 3/2012 | Barbeau et al. |
| 8,190,118 | B2 | 5/2012 | Sennett et al. |
| 8,204,525 | B2 | 6/2012 | Sennett et al. |
| 8,301,112 | B2 | 10/2012 | Morrison |
| 8,312,112 | B2 | 11/2012 | Stremel et al. |
| 8,320,931 | B2 | 11/2012 | Ward et al. |
| 8,351,297 | B2 | 1/2013 | Lauder et al. |
| 8,385,956 | B2 | 2/2013 | Sennett et al. |
| 8,412,147 | B2 | 4/2013 | Hunter et al. |
| 8,442,482 | B2 | 5/2013 | Maier et al. |
| 8,442,807 | B2 | 5/2013 | Ramachandran |
| 8,458,067 | B2 | 6/2013 | Arguelles et al. |
| 8,531,293 | B2 | 9/2013 | Putz |
| 8,532,607 | B2 | 9/2013 | Sennett et al. |
| 8,542,599 | B1 | 9/2013 | Pons et al. |
| 8,548,423 | B2 | 10/2013 | Rao |
| 8,552,886 | B2 | 10/2013 | Bensoussan |
| 8,594,015 | B2 | 11/2013 | Dunn et al. |
| 8,594,707 | B2 | 11/2013 | Morrison |
| 8,612,278 | B1 | 12/2013 | Ashley, Jr. et al. |
| 8,614,631 | B2 | 12/2013 | Pinhanez |
| 8,624,727 | B2 | 1/2014 | Saigh et al. |
| 8,660,518 | B2 | 2/2014 | Sennett et al. |
| 8,660,520 | B2 | 2/2014 | Felt et al. |
| 8,665,089 | B2 | 3/2014 | Saigh et al. |
| 8,725,107 | B2 | 5/2014 | Brok den et al. |
| 9,247,408 | B2 | 1/2016 | South |
| 9,299,236 | B2 | 3/2016 | Evans |
| 9,572,002 | B2 | 2/2017 | South |
| 9,686,663 | B2 | 6/2017 | Cottle et al. |
| 9,794,755 | B1 | 10/2017 | South et al. |
| 10,257,663 | B2 | 4/2019 | South et al. |
| 2006/0158329 | A1* | 7/2006 | Burkley ................. H04W 4/90 340/539.13 |
| 2006/0223494 | A1 | 10/2006 | Chmaytelli et al. |
| 2007/0159322 | A1* | 7/2007 | Garratt Campbell ....................... G08B 25/016 340/539.13 |
| 2007/0202927 | A1 | 8/2007 | Pfleging et al. |
| 2007/0219420 | A1 | 9/2007 | Moore |
| 2007/0293240 | A1 | 12/2007 | Drennan |
| 2008/0139165 | A1 | 6/2008 | Gage et al. |
| 2008/0275308 | A1 | 11/2008 | Moore |
| 2009/0005019 | A1 | 1/2009 | Patel et al. |
| 2009/0042546 | A1 | 2/2009 | McClendon |
| 2009/0172131 | A1 | 7/2009 | Sullivan |
| 2009/0271101 | A1* | 10/2009 | Relyea ................... H04W 4/50 701/118 |
| 2009/0309742 | A1 | 12/2009 | Alexander et al. |
| 2010/0159871 | A1 | 6/2010 | Tester |
| 2010/0305806 | A1 | 12/2010 | Hawley |
| 2011/0063138 | A1 | 3/2011 | Berkobin et al. |
| 2011/0238300 | A1 | 9/2011 | Schenken |
| 2011/0319051 | A1 | 12/2011 | Reitnour |
| 2012/0002791 | A1 | 1/2012 | Kraus et al. |
| 2012/0071129 | A1 | 3/2012 | Haney |
| 2012/0092161 | A1 | 4/2012 | West |
| 2012/0130753 | A1 | 5/2012 | Lewis |
| 2012/0200411 | A1 | 8/2012 | Best |
| 2012/0253551 | A1 | 10/2012 | Halimi et al. |
| 2012/0258681 | A1 | 10/2012 | Hanover |
| 2012/0282887 | A1 | 11/2012 | Khoo et al. |
| 2012/0309409 | A1 | 12/2012 | Grosman et al. |
| 2012/0329420 | A1 | 12/2012 | Zotti et al. |
| 2013/0005363 | A1 | 1/2013 | Tester |
| 2013/0012154 | A1 | 1/2013 | Ramos |
| 2013/0040600 | A1 | 2/2013 | Reitnour et al. |
| 2013/0085668 | A1 | 4/2013 | Roberts, Sr. et al. |
| 2013/0091452 | A1 | 4/2013 | Sorden et al. |
| 2013/0099977 | A1 | 4/2013 | Sheshadri et al. |
| 2013/0231137 | A1 | 9/2013 | Hugie et al. |
| 2013/0237174 | A1 | 9/2013 | Gusikhin et al. |
| 2013/0241726 | A1 | 9/2013 | Hunter et al. |
| 2013/0246397 | A1 | 9/2013 | Farver et al. |
| 2013/0316751 | A1 | 11/2013 | Rao |
| 2013/0324166 | A1 | 12/2013 | Mian et al. |
| 2013/0332007 | A1 | 12/2013 | Louboutin |
| 2014/0011471 | A1 | 1/2014 | Khosla et al. |
| 2014/0031000 | A1 | 1/2014 | Hanover |
| 2014/0075493 | A1* | 3/2014 | Krishnan ................. G06F 21/31 726/1 |
| 2014/0132393 | A1 | 5/2014 | Evans |
| 2014/0143801 | A1 | 5/2014 | Russell et al. |
| 2014/0171146 | A1 | 6/2014 | Ma et al. |
| 2014/0172873 | A1 | 6/2014 | Varoglu et al. |
| 2015/0111524 | A1 | 4/2015 | South |
| 2015/0163626 | A1 | 6/2015 | Zimmer |
| 2016/0042767 | A1* | 2/2016 | Araya .................... G11B 19/02 386/201 |
| 2016/0183055 | A1 | 6/2016 | Mahajan |

FOREIGN PATENT DOCUMENTS

| | | |
|---|---|---|
| WO | WO 2014/062147 A1 | 4/2014 |
| WO | WO 2014/072910 A1 | 5/2014 |
| WO | WO 2014/075070 A2 | 5/2014 |
| WO | WO 2014/096920 A1 | 6/2014 |

(56) References Cited

FOREIGN PATENT DOCUMENTS

OTHER PUBLICATIONS

Roppolo, M., "What to expect at Google I/O 2014 developers conference," http://www.cbsnews.com/news/google-io-2014-rumor-roundup-what-to-expect/, Jun. 21, 2014, pp. 1-4.
"Livesafe/Safety-Related Mobile Technology," http://www.livesafemobile.com, Oct. 31, 2014.
"Business & Corporations—Personal Security App—EmergenSee," http://www.emergensee.com/be-emergensee-safe/business-corporations, Oct. 31, 2014.
WIPO, International Search Report for International Application No. PCT/US2014/061389, dated Feb. 5, 2015.
WIPO, Written Opinion for International Application No. PCT/US2014/061389, dated Feb. 5, 2015.
Intellectual Property Office of Singapore, Search Report and Written Opinion for Singapore Patent Application No. 11201603128Y, dated Oct. 5, 2016.
WIPO, International Search Report for International Application No. PCT/US2017/029191, dated Jul. 21, 2017.
WIPO, Written Opinion for International Application No. PCT/US2017/029191, dated Jul. 21, 2017.

* cited by examiner

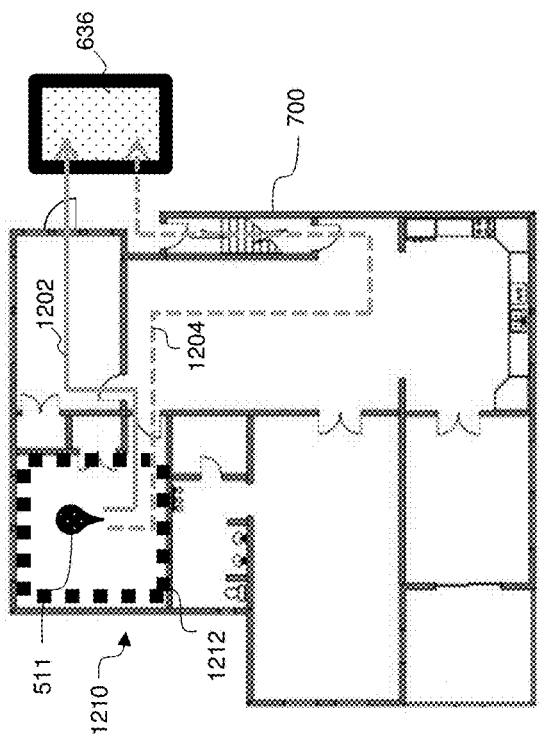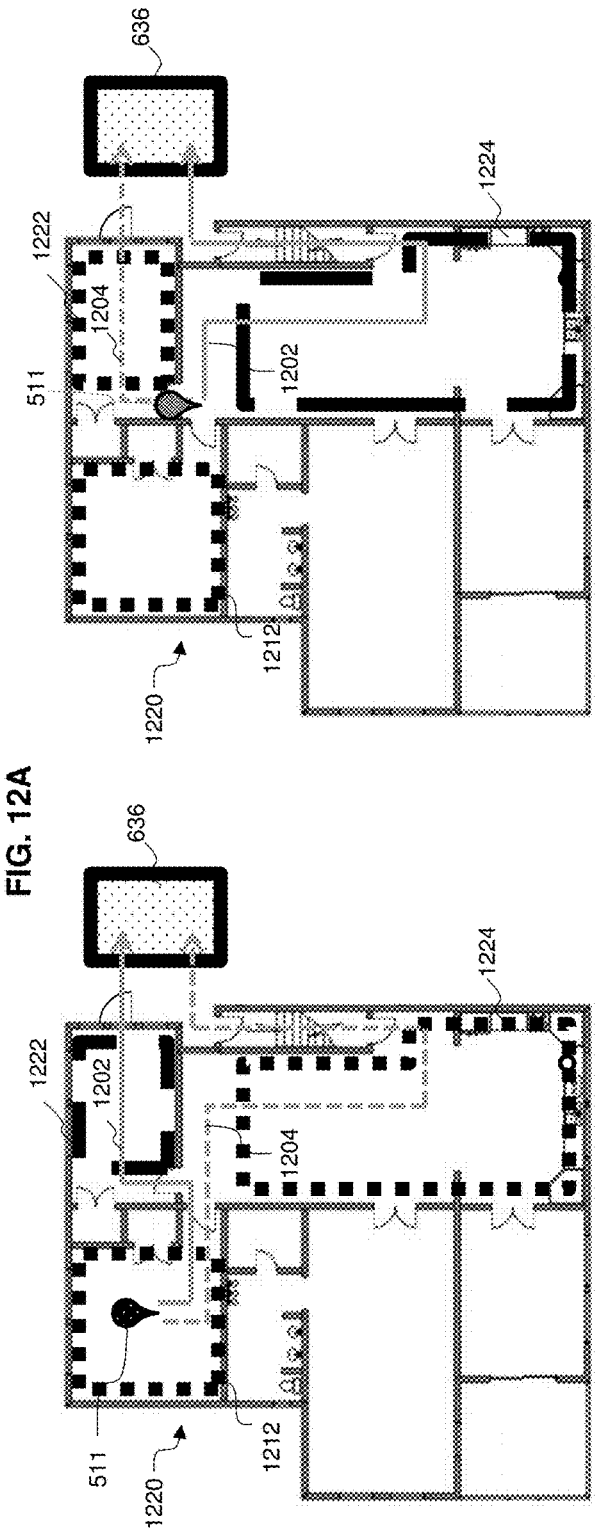

FIG. 13

User Device Permission Levels

Site Administrator (Top Tier – FEMA/DHS National Responder)

1. Map screen shows all perimeters and Admin panic button
2. Shows incident/user information and edit option (blue pencil)
3. Menu shows perimeters and users (so you can see users in space vs. using desktop)
4. Menu shows all perimeter names (active = blue triangle) w/panic button (for non active perimeter) and center crosshair zoom
5. Edit menu allows modification/status changes

- Can activate any/all perimeters under their organization (inside or outside a geo fence)
- Can modify perimeter details and change status (active/pending/inactive though mobile platform)
- Can see users and their statuses inside active perimeter(s) assigned to their organization

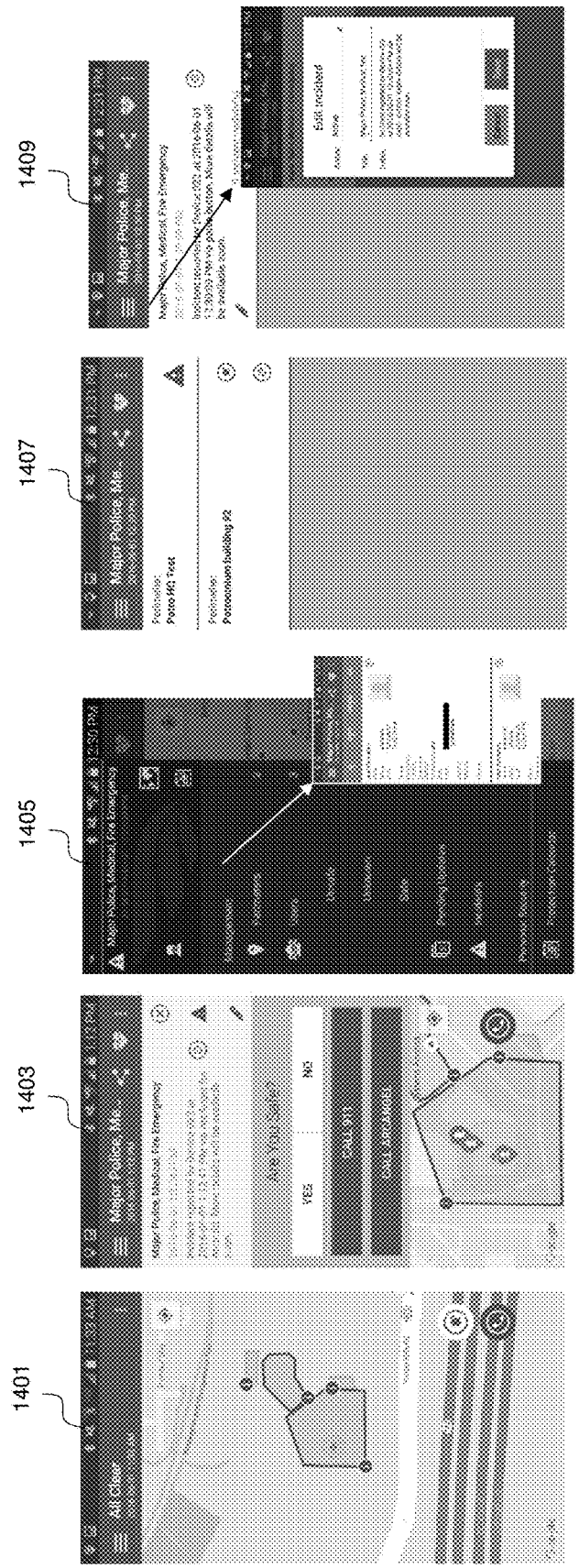

FIG. 14C

User Device Permission Levels

First Responder (Second Tier – Police/Fire)

1. Shows all authorized pending and active perimeters (not fixed perimeters) – so full access to any incident in the permissions (so a county, and permissions tied to the county and location)
2. Menu shows incident management details
3. Menu shows detail options and center crosshair zoom
4. Sees incidents (not perimeters), but is able to modify (details and status)

- Can ONLY activate current perimeter in which located (inside) – with ability to set off a current admin geo fence (police/fire in a unsafe zone – or already set up by 911 etc.)
- Can modify perimeter details or change status
- Can see users and their statuses inside active perimeter(s)

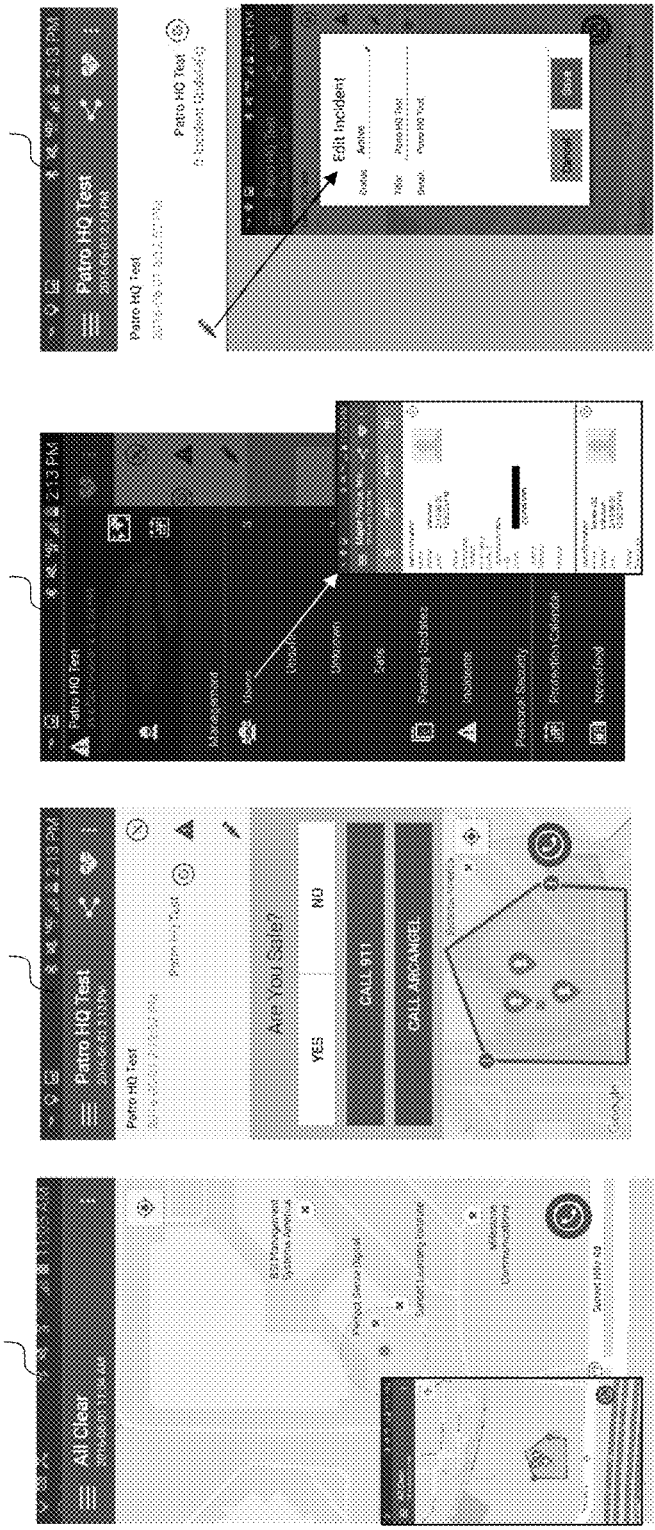

FIG. 14D

User Device Permission Levels
Security Guard (Third Tier – Guard – Local Responder)

1. Only shows authorized perimeter/panic button for perimeter in which Security Guard is physically located (panic button disabled if outside geo-fence – see inset – so has to be on sight)
2. Shows incident/user details only for active authorized perimeter (no edit option)
3. Menu shows detail options and center crosshair zoom
4. Shows active perimeter (no other authorized perimeters outside of current geo-fence)
5. Shows incident name & incident details only, cannot modify (no blue pencil) as with Admin permissions

- Can ONLY activate current perimeter in which located (inside)
- CANNOT modify incident details or change status (only Site Administrators/First Responders can modify)
- Can see users and their statuses inside active perimeter(s)
- No ArcAdmin access via web

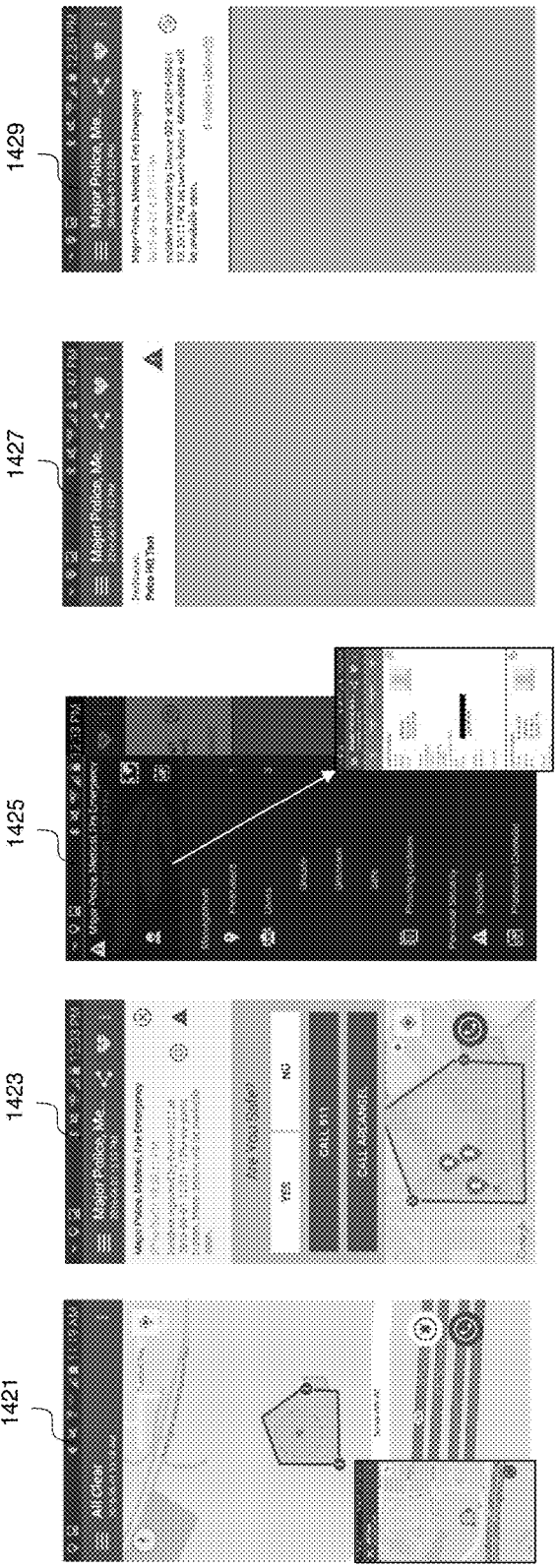

FIG. 14E

Logistics Management – Intelligent Geofencing

- Create multiple layers of geo-fences to communicate with vessels based on distance from the port and manage both the flow of vessels entering and leaving.

INTERACTIVE EMERGENCY VISUALIZATION METHODS

CROSS-REFERENCE TO RELATED APPLICATIONS

This application is a continuation of U.S. patent application Ser. No. 15/783,196, filed Oct. 13, 2017, now allowed, which is a continuation of U.S. patent application Ser. No. 15/495,497, filed Apr. 24, 2017, now U.S. Pat. No. 9,794,755, issued Oct. 17, 2017, which claims priority to U.S. Provisional Patent Application No. 62/326,921, filed Apr. 25, 2016, each of which is incorporated herein by express reference thereto in its entirety.

FIELD OF DISCLOSURE

This application relates generally to devices, systems, and methods for interactive emergency visualization systems.

BACKGROUND

During a catastrophic event, people rely on televisions, radios, and other media-consumption devices for up-to-the-minute information about all aspects of the event. Such information may include locations of events, people involved, responding agencies, and victims. Currently, with existing systems, there is no "immediate" flow of information about the event from people in the vicinity of the event to people in a position to provide help (e.g., first responders, police, firemen, security guards, etc.). Timely response in an emergency situation or incident, however, may depend on accurate and up-to-date information about the emergency situation itself, affected persons, and their state. Prompt acquisition and exchange of such data may be essential in such situations. Current audio-visual surveillance systems in the area of an emergency situation may provide information about the identity of affected persons, but the gathering and analysis of such information may be a time-consuming process. Additionally, the deployment of such surveillance systems may be costly and, generally, is negatively perceived by the public. Historically, during emergencies, state, local, and federal agencies use systems based on radio communications, such as mobile data terminals (MDTs) in emergency response vehicles. They also rely on after-the-fact witness accounts and calls to a 9-1-1 operations center to provide "approximate data" about an event that just occurred.

Moreover, conventional systems are unidirectional and cannot provide personalized information and guidelines to individuals affected by an emergency situation, or request and receive information related to the emergency situation from the individuals, particularly on a real-time or near-real-time basis. Conventional systems additionally cannot accurately locate and verify the identity of individuals affected by emergencies when the individuals are within multi-story structures. Further, conventional systems are susceptible to physical tampering leading to the unauthorized and/or erroneous distribution of potentially life-saving emergency information. Accordingly, needs exist for a real-time, efficient, interactive emergency visualization system.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided herein are systems and methods for interactive emergency visualization, including: receiving a notification concerning an incident associated with a multi-floor structure; establishing a geo-fence encompassing at least a portion of the multi-floor structure; determining which of a plurality of user devices were previously within a first distance from the incident based on stored location information received from the plurality of user devices, wherein each user device is associated with an individual; transmitting a request for current location information to each of the user devices determined to have previously been within the first distance; receiving, in response to the request, current location information from at least a subset of the user devices determined to have previously been within the first distance, wherein the current location information includes both geographical location information and beacon information associated with respective beacons disposed within the multi-floor structure; determining, based on the received current location information, which of the plurality of user devices are currently located within the geo-fence; and displaying a graphical map illustrating the multi-floor structure, the geo-fence, and the geographical locations of user devices determined to be within the geo-fence, wherein the displaying includes displaying information associating at least one of the user devices with a specific floor of the multi-floor structure based on the detected beacon information.

In some embodiments, establishing the geo-fence includes activating a geo-fence defined before the incident. In some embodiments, establishing the geo-fence includes defining a physical area associated with the multi-floor structure based on the incident. In some embodiments, the stored location information was received from the plurality of user devices prior to receiving the notification of the incident. In some embodiments, the stored location information is indicative of last known locations of the user devices.

In some embodiments, the displaying includes displaying a floor plan of the specific floor within the multi-floor structure along with a location of the at least one user device within the floor plan. In some embodiments, the displaying the floor plan is performed in response to receiving a user selection of the specific floor on the graphical map. In some embodiments, the above method may further comprise receiving a current safety status of an individual associated with the at least one user device, wherein the displaying includes displaying the current safety status of the individual.

In some embodiments, the current safety status of the individual is visually distinguished by a characteristic of an icon representing the individual in the graphical map. In some embodiments, the above method may include receiving, after receiving the current location information, further location information from the user devices determined to be within the geo-fence; and updating the graphical map based on the further location information.

Provided herein is a computer-implemented method for interactive emergency visualization, which may include: receiving a notification concerning an incident associated with a multi-floor structure; requesting location information from a user device geographically associated with the multi-floor structure; receiving, in response to the request, a beacon identifier from the user device, the beacon identifier being associated with a beacon disposed within the multi-floor structure; determining on which floor of the multi-floor structure the user device is located based on the beacon identifier and stored information indicating the location of the beacon; and displaying a graphical map of the multi-floor structure and information indicating the specific floor on which the user device is located.

In some embodiments, the displaying includes displaying a floor plan of the specific floor on which the user device is located and displaying, in association with the floor plan, an icon representing the user device and an icon representing the beacon. In some embodiments, the icon representing the user device additionally represents a plurality of user devices associated with the beacon. In some embodiments, the icon representing the user device visually indicates the number of user devices associated with the beacon. In some embodiments, the displaying the floor plan is performed in response to receiving a user selection of the specific floor on the graphical map.

In some embodiments, the beacon identifier comprises a first component representing the multi-floor structure and a second component representing a floor of the structure. In some embodiments, the determining on which floor of the multi-floor structure the user device is located includes comparing the received beacon identifier to a plurality of stored beacon identifiers, where each of the stored beacon identifiers are respectively associated with a location of a beacon.

In some embodiments, the above method may further include: receiving from the user device, in response to the request, a plurality of beacon identifiers associated with a plurality of beacons disposed in the multi-floor structure and receiving respective indications of proximity between the user device and plurality of beacons; and determining, based on the indications of proximity, which beacon in the plurality of beacons the user device is most near.

In some embodiments, the displaying includes displaying an icon representing the user device along with an icon representing the beacon in the plurality of beacons most near to the user device. In some embodiments, requesting location information from the user device includes determining whether the last known location of the user device is within a first distance from the multi-floor structure based on stored location information.

Provided herein is a computer-implemented method for interactive emergency visualization, which may include: receiving a notification concerning an incident associated with a multi-floor structure; requesting current location information from a plurality of user devices geographically associated with the multi-floor structure, each user device being associated with an individual; receiving, in response to the request, current location information from at least a subset of the user devices, wherein the current location information includes beacon information associated with respective beacons disposed within the multi-floor structure; determining, based on the received current location information, which of the plurality of user devices are currently located within the multi-floor structure and on which floors; receiving, from the user devices determined to be located within the multi-floor structure, safety status information about respective individuals associated with the user devices; and displaying a graphical map illustrating the multi-floor structure and information indicating, for each floor of the multi-floor structure, a number of the user devices determined to be on that floor along with the safety status information about the individuals associated with the user devices determined to be on that floor.

In some embodiments, displaying the graphical map includes displaying a three-dimensional image of the multi-floor structure with representations of each floor. In some embodiments, the representations of the floors visually reflect the safety status information of the individuals associated with the user devices determined to be the respective floors.

In some embodiments the above method may further include receiving a user selection of a representation of a specific floor and, in response, displaying a floor plan of the specific floor. In some embodiments, displaying the floor plan includes displaying icons representing the user devices determined to be on that specific floor overlaid on the floor plan.

In some embodiments, the icons visually indicate the respective safety status information of the individuals associated with the user devices represented by the icons.

In another aspect, provided herein are computer-implemented method for incident visualization, which includes: receiving sensor information from at least one sensor device in a reporting area, determining that an incident has occurred based on the received sensor information, defining a first geo-fence, wherein the first geo-fence has a two-dimensional shape representing a first geographical region, wherein the incident is located within the first geographical region, requesting current location information from at least one user device associated with an individual, receiving, in response to the request, current location information from the at least one user device, and displaying, with a display device, the received sensor information and a visual representation of the first geo-fence and the received current location information of the at least one user device in relation to the first geo-fence.

In another aspect, provided herein are computer-implemented methods for incident visualization, which include: receiving, with a processor, a first notification of an incident, defining, with the processor, a geo-fence representing a first geographical region including the incident, requesting, with the processor, current location information from at least one user device associated with an individual, receiving, in response to the request, current location information from the at least one user device, determining, with the processor, whether the at least one user device is within the geo-fence based on the received current location information, transmitting, from the processor to the at least one user device, a second notification comprising information regarding the incident if the at least one user device is determined to be within the geo-fence, and generating, with the processor, a report comprising the received current location information from the at least one user device and the information regarding the incident.

In a further aspect, provided herein are computer-implemented methods for incident visualization, which include: receiving, with a processor, a notification of an incident, defining, with the processor, a first geo-fence in proximity to the incident, the first geo-fence representing a first geographical region, requesting, with the processor, current location information from at least one user device associated with an individual, transmitting, from the user device to the processor, current location information based on the request, generating, with the processor, a visualization of the at least one user device and the geo-fence based on the current location information of the at least one user device, and transmitting, from the processor to a third party, aspects of the generated visualization based on an access level of the third party.

BRIEF DESCRIPTION OF DRAWINGS

Embodiments are illustrated by way of example and not limitation in the figures of the accompanying drawings, in which like references indicate similar elements and in which:

FIG. 12A illustrates a method of defining an emergency escape route for an individual during an emergency, in accordance with some exemplary embodiments.

FIG. 12B illustrates another method of defining an emergency escape route for an individual during an emergency, in accordance with some exemplary embodiments.

FIG. 12C illustrates another method of defining an emergency escape route for an individual during an emergency, in accordance with some exemplary embodiments.

FIG. 13 illustrates a display of the interactive emergency visualization, in accordance with some exemplary embodiments.

DETAILED DESCRIPTION OF PREFERRED EMBODIMENTS

Figure 1A:
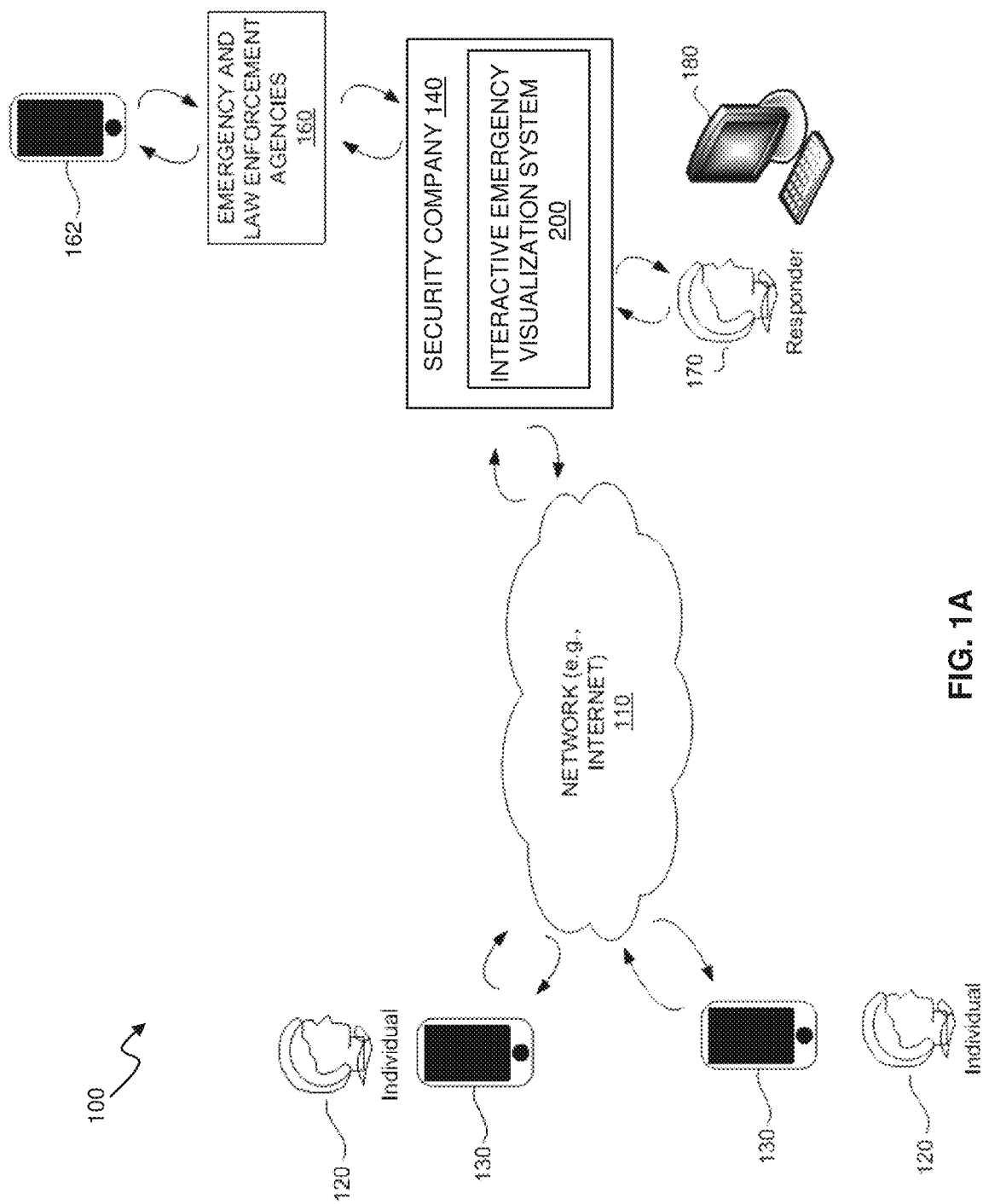
FIG. 1A illustrates an environment within which interactive emergency visualization systems and methods may be implemented, in accordance with some embodiments of the present disclosure.

Interactive emergency visualization systems and methods are described herein. In case of an emergency situation or incident, such as a shooting, a terrorist attack, and so forth, identities and locations of individuals in proximity to the location of the incident may be determined using the location services of user devices carried by the individuals (e.g., smart phones, tablet computers, etc.). In some embodiments, a multi-floor structure near the incident may be visualized by the system, and individuals may be visualized within the various floors of the structure. One or more geo-fences may be activated around the incident. The individuals within a certain distance from the location of the incident and/or within the geo-fences may be informed about the incident and requested to provide real-time feedback about the situation, such as their safety status and situational information as they perceive it. Civilian or commercial level users and/or state or local entities including first responders such as police or fire officials, or paramedics, may provide feedback. Civilian or commercial level users or individuals may provide information concerning their condition, safety, and/or whatever information they may have concerning the incident. Audio, video, and/or text data may be received from the individuals via their devices. For example, a photo of an active shooter or a video of a terrorist attack may be received. The received feedback may be forwarded to law enforcement or other appropriate agencies. The locations of incidents, buildings, geo-fences, individuals, and first responders may be included in a visualization generated by the interactive emergency visualization system.

Additionally, data from various sources, such as local Emergency Plan Actions or specific plans, e.g., those of the building management where the event occurred, may be retrieved and remotely provided to affected individuals. For example, emergency instructions relative to the incident may be extracted from the data and provided to affected individuals via a user interface of their devices. For example, emergency instructions may be provided in a graphical form as directions on a map displayed on the user device. At the same time, the current position of the individual may be displayed on the map.

In some embodiments, the interactive emergency visualization system may be used to request assistance during an incident. Thus, an individual may send an emergency notification and/or additional data related to the emergency via the user device. The individual's geographical position may be determined, and local emergency agencies may be informed about the incident affecting the individual. Depending on the nature of the emergency, notifications may additionally be provided concurrently to state emergency agencies or authorities, federal emergency agencies or authorities (e.g., FEMA, the FBI, military police, etc.), or both. Additionally, emergency instructions may be retrieved based on the geographical position of the individual, typically relative to the emergency, and provided to the individual such as via a graphical interface of the user device.

Referring now to the drawings, FIG. 1A illustrates an environment 100 within which the interactive emergency visualization systems and methods may be implemented. The environment 100 may include a network 110, an individual 120 (typically a civilian), a user device 130 associated with the individual 120, a security company 140, an interactive emergency visualization system 200 operated by the security company, local and federal emergency and law enforcement agencies 160 (e.g., rescue services, police departments, fire emergency services, the FBI, Homeland Security, etc.), a first responder user device 162, a responder 170, and a work station 180. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), LTE (Long-Term Evolution), LTE-Advanced, GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network 110 may further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication.

The user device 130 is a network-enabled computing device used by the individual 120 and may be a mobile telephone, a desktop computer, a laptop, netbook, a smart phone, a tablet computer (e.g., an iPad®, Galaxy® or Kindle®), an RFID capable device, a GPS device, a wearable device (such as an Apple watch, or other tethered accessory or clothing, etc.), or other computing device that is capable of sending and receiving data over a network. For example the user device 130 may include any number of communication transceivers such as a cellular radio, a WiFi radio, a Bluetooth radio, and any other transceiver capable of communicating with the network 110. The user device 130 further includes a Graphical User Interface (GUI) for displaying a user interface associated with the interactive emergency visualization system 200. In some embodiments, the user interface is part of a mobile application (or "app") that is provided by the system 200 and downloaded and installed on the user device 130, typically in advance of an emergency event. In other embodiments, the user interface may be web-based and viewable through a standard web browser. For the purposes of this disclosure, an emergency event may be referred to as an "incident" and may include one or more of a terrorist attack, a shooting event, a bombing event, an earthquake, a flood, a fire, a hurricane, tornado, an accident, collapsing building, and other natural or man-made disasters. A user device 130 may be equipped with an app by downloading the app from the Internet, an Intranet, or other network. User devices 130 may be equipped with the app as part of an enrollment or orientation. For example, if the individuals 120 are students associated with a university, the students may download an app to their smart phone and/or tablet as part of enrollment or orientation. In other instances, the app may be pre-installed on the user device or may be integrated into the operating system of the user device. Such an app may communicate with the interactive emergency visualization system 200 using any of the communication transceivers in the user device. For example, the app may receive and transmit emergency information via a cellular data connection and/or a WiFi data connection. In this manner, if cellular towers are overly congested during an incident, the app on the user device may switch to another communication means, such as WiFi, to transmit and receive data. Alternatively, the app may transmit using multiple concurrent communication means, such as cellular and WiFi, although battery life of the device must be considered when doing so. As explained in more detail below, each instance of a mobile app installed on a user device (e.g., an ARCANGEL® security app as shown in reference to FIGS. 16-21) may be individually identifiable via an app instance identifier. Each individual 120 may be associated with a particular app instance by the interactive emergency visualization system 200. In some embodiments, before an app instance is permitted to update information about an individual's geographical location in the system 200, the app instance may or must first be verified or validated by the system 200.

The user device 130 may also include hardware and/or software configured to determine a geographical location of the user device. For example the user device may determine its present location using a GPS receiver, the WiFi radio, the cellular radio, the Bluetooth radio, and/or any other transceiver configured to determine the current physical location of the user device, or any combination thereof.

The individual 120 may be a bearer or user of the user device 130 who may interact with the interactive emergency visualization system 200 and/or the responder 170 via a GUI. The responder 170 may communicate with the interactive emergency visualization system 200 via the work station 180 or otherwise.

The first responder user device 162 may be similar to the user device 130, but is used by individuals within emergency and law enforcement agencies. The first responder user device 162 may also include a user interface to facilitate communication with the interactive emergency visualization system 200, but this user interface may display additional information pertinent to responding to an incident, as will be discussed below. The user interface on the first responder user device 162 may be part of a mobile application (or "app") that is downloaded and installed. In other embodiments, the user interface may be web-based and viewable through a standard web browser.

The interactive emergency visualization system 200 may be operated by a security company 140 that is hired by an entity with a plurality of individuals (such as a university, city, corporation, building management, etc.) to provide information exchange and emergency response services during incidents involving the individuals associated with the entity. In general, the interactive emergency visualization system 200 tracks the locations and safety status of individuals and first responders during incidents and coordinates the flow of information between individuals and first responders, as well as providing emergency analysis and communication directly to individuals and first responders from the system 200. In that regard, the interactive emergency visualization system 200 may communicate with one or more local, state, and federal emergency and law enforcement agencies 160 (e.g., rescue or paramedic services, police departments, fire emergency services, the FBI, Homeland Security, etc.) during an incident. The interactive emergency visualization system 200 may receive one or more notifications associated with incidents, emergency action plans, and other data from the emergency and law enforcement agencies 160. Additionally, the interactive emergency visualization system 200 may transmit information about one or more individuals in proximity to the location of the incident as well as audio, video, and/or text data received from the individual 120 to the emergency and law enforcement agencies 160. In some embodiments, first responders may be able to access a level of information in the system 200 and contact one or more individuals or other first responders via the system 200.

Figure 1B:
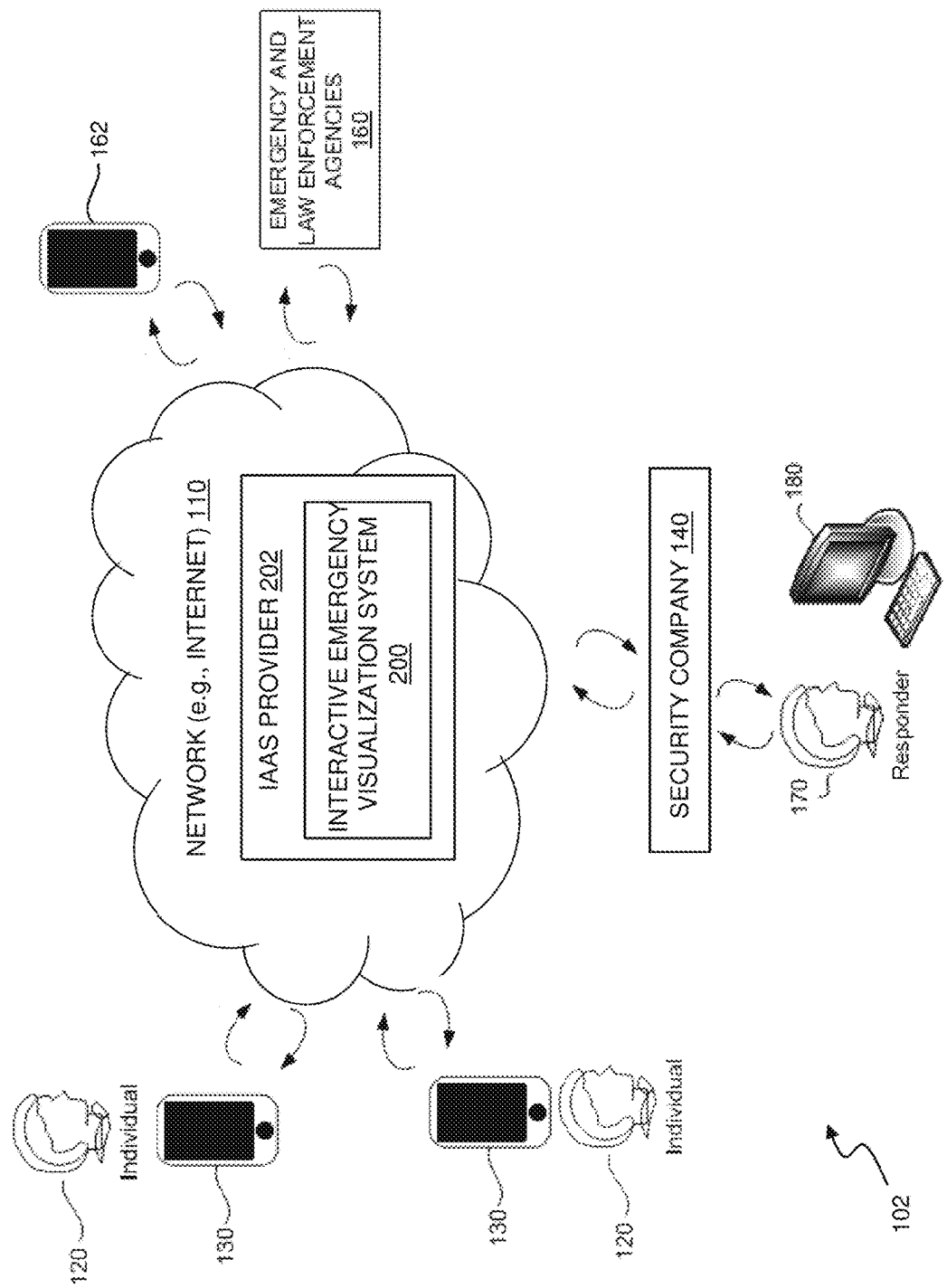
FIG. 1B illustrates another environment within which interactive emergency visualization systems and methods may be implemented, in accordance with other embodiments of the disclosure.

FIG. 1B illustrates another embodiment of the present disclosure with an environment 102 within which interactive emergency visualization systems and methods may be implemented. The environment 102 is similar to the environment 100 shown in FIG. 1A, but the interactive emergency visualization system 200 is hosted "in the cloud" on virtual hardware provided by an Infrastructure as a Service (IaaS) provider 202. Specifically, the interactive emergency visualization system 200 is designed, implemented, and controlled by the security company but executes as a hosted service accessed through the Internet. In one embodiment, the interactive emergency visualization system 200 may be accessed via a secure web-based application. For example, the responder 170 and operators associated with the law enforcement agencies 160 may connect to the interactive emergency visualization system 200 via a web browser and log-in to perform administrative tasks. In such an embodiment, any device with a web browser may connect to and interact with the interactive emergency visualization system 200. Additionally, mobile applications ("apps") installed on user devices 130 and first responder user devices 162 may natively connect to the interactive emergency visualization system 200 without the use of a browser.

Connections to the interactive emergency visualization system 200 may be secured with encryption protocols (e.g., Secure Sockets Layer (SSL), HTTPS, etc.) and access may be restricted to authorized users with an authentication and/or authorization layer (e.g., log-in credentials, electronic keys, etc.). Further, all data stored on devices and in databases in the environment 102 may be encrypted to protect sensitive location and profile information associated with individuals. For example, location and profile data stored by the interactive emergency visualization system 200 may be encrypted by the Advanced Encryption Standard (AES) or other encryption protocol.

Hosting the interactive emergency visualization system 200 on virtual hardware provided by the IaaS provider 202 allows the security company 140 to scale up and scale down the capabilities of the system depending on the amount of devices accessing the system. For example, if notification of a major incident is received, additional virtual instances of the interactive emergency visualization system 200 may be initiated by the IaaS provider 202 on a temporary basis to handle a larger than normal number of connections to the system and a larger volume of data being transferred between users.

Figure 2:
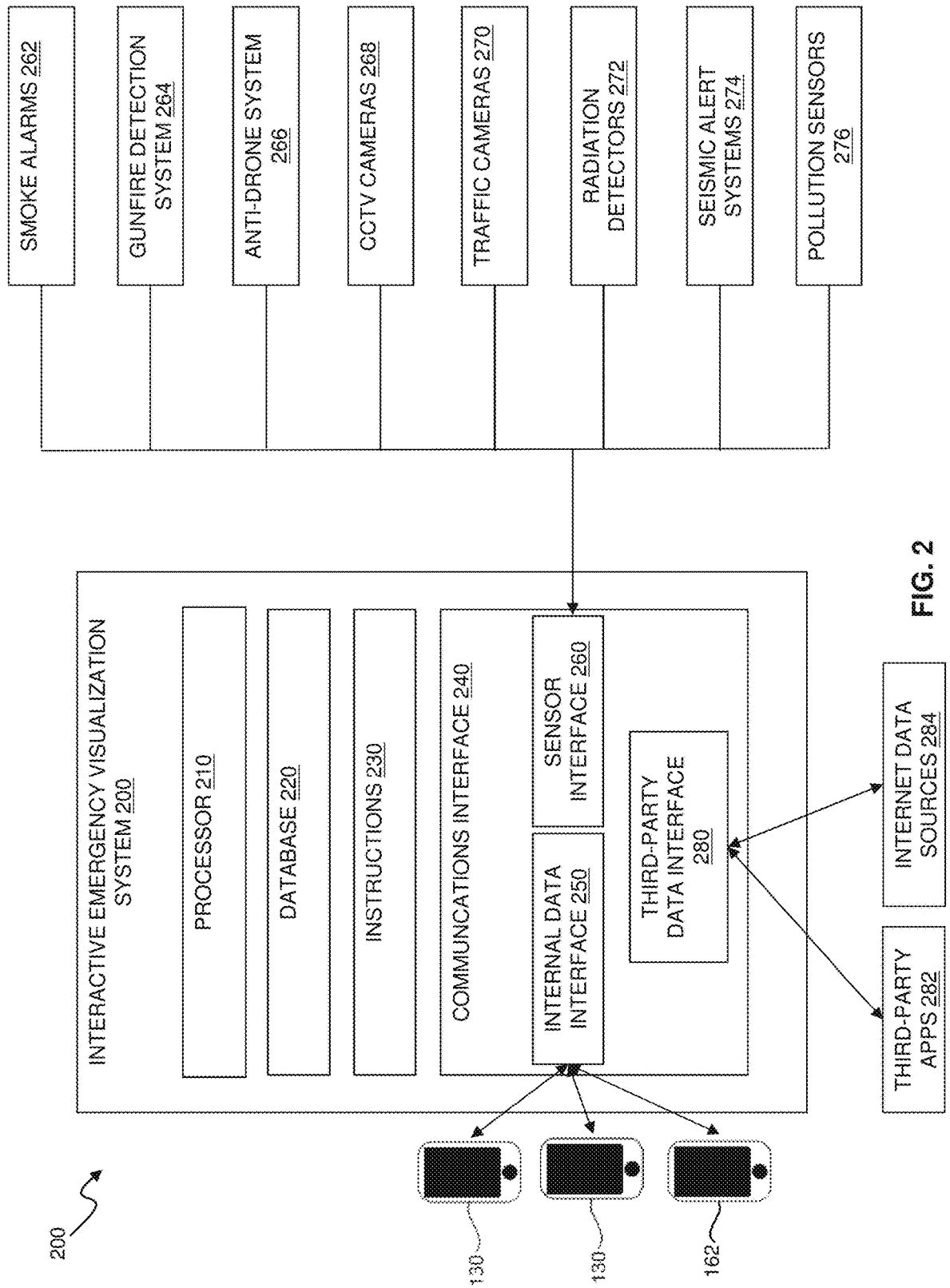
FIG. 2 is a block diagram showing various modules of the interactive emergency visualization system, in accordance with certain embodiments.

FIG. 2 is a block diagram showing various modules of the interactive emergency visualization system 200, in accordance with certain embodiments. The system 200 may be the server component in the above-described client-server information distribution. The system 200 may also be referred to as a controller or a server, and in particular, an emergency information server. Such a server may be comprised of a one or more physical computer servers with specialized hardware and software configured to implement the functionality of interactive emergency visualization system 200. In particular, the computer server(s) of system 200 may comprise a processor 210 and a database 220. The processor 210 may include a programmable processor, such as a microcontroller, central processing unit (CPU), an auxiliary processor among several processors associated with the system 200, a macroprocessor, and so forth. In other embodiments, the processor 210 may include an application-specific integrated circuit (ASIC) or programmable logic array (PLA), such as a field programmable gate array (FPGA), designed to implement the functions performed by the system 200. In other embodiments, the processor 210 may be comprised of a plurality of communicably-coupled processors in one or more computers, servers, mainframes, or other computing devices.

In some embodiments, the database 220 may be any type of reliable storage solution such as a RAID-based storage server, an array of hard disks, a storage area network of interconnected storage devices, an array of tape drives, or some other scalable storage solution located either within the system 200 or remotely located (e.g., in the cloud).

In some embodiments, the system 200 performs specific operations by the processor 210 executing one or more sequences of one or more instructions 230 provided by the database 220. The instructions 230 may include one or more algorithms for communication between different systems, registering users and individuals, identifying emergencies, integrating with Application Program Interfaces (APIs) and sensor systems, characterizing and generating one or more geo-fences, sending communications to users, individuals, law enforcement, and emergency response groups, or other functions. The instructions 230 may be stored on non-transitory, computer-readable medium. The term "non-transitory computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "non-transitory computer-readable medium" shall accordingly be taken to include, but not be limited to, solid-state memories, optical and magnetic media. Such media may also include, without limitation, hard disks, floppy disks, NAND or NOR flash memory, digital video disks (DVDs), RAM, ROM, and the like.

In some embodiments, the processor 210 is operable to send and receive notifications. For example, the processor 210 may receive a notification concerning an incident. The notification may be based on information generated or received by information from user devices 130, one or more sensor systems, or third-party information platforms that interface with the system 200 via APIs. The notification may include a location of the incident and may be received from an emergency or law enforcement agency, one or more users of the system 200, and so forth. In one embodiment, user interfaces on the user device 130 and first responder user device 162 may provide a button or other control element through which an individual may submit a report of an incident. Such a report may automatically include the location of user devices 130 and any description input by individuals.

Based on the information received about the incident, the processor 210 may define a geo-fence (or geo-net) representing a physical area surrounding the location of the incident. In one embodiment, the geo-fence may be a physical area defined by a circle, rectangle, polygon, or other shape, having a specific area around the location of the incident. The size and shape of the geo-fence may be manually defined by a user, an operator of the system 200, and/or an emergency or law enforcement agency. For example, the system 200 may define a geo-fence on each floor of a multi-floor structure, as shown if FIGS. 4C and 4D. The system 200 may also define additional geo-fences on various rooms of the floors. In other embodiments, the size and shape of the geo-fence may be automatically determined based on characteristics (e.g., type, severity, etc.) of the incident. For example, an incident may be triggered by a bomb blast. The shape and size of the geo-fence may be adjusted depending on the size and characteristics of the bomb. In other embodiments, the geo-fence may be defined by other shapes depending on the nature of the incident. For example, the geo-fence may be defined by another geometric shape, or it may be defined by the shape of a physical landmark such as a university campus, a city block, or a specific building.

Additionally, the geo-fence may include one or more proximity zones that represent physical areas of different distances from the location of the incident. In the case of a circular geo-fence, the proximity zones may be defined by concentric circles of varying radii extending from the location of the emergency. In the case of a rectangular geo-fence, the proximity zones may be defined by nested rectangles around the location of the emergency. The system 200 may dynamically alter the size and/or shape of the geo-fence during an incident based on incoming information from first responders, law enforcement agencies, individuals with user devices, news outlets, etc.

In some embodiments, two-dimensional and three-dimensional (3D) geo-fences may be defined by the processor 210. For example, a number of geo-fences may be defined within a single building. In particular, each floor of the building may include a 3D geo-fence associated with the system 200. In the event of an emergency, the processor 210 may be operable to display the status of each of the geo-fences. This status information, as well as a visualization of the location and physical attributes of the geo-fences may be provided in one or more visualizations which are shown in reference to FIGS. 4A-4D, 6, 7, 8. In particular, three-dimensional geo-fences are discussed in more detail in reference to FIGS. 6, 7, and 8.

The processor 210 may receive location information describing the locations of the user devices 130. The location information may be received directly from the devices based on location information gathered by the devices (such as GPS). The location information for the user devices 130 may also be based on the defined geo-fence. Since the user devices may be associated with individuals, the processor 210 may determine a position of an individual within the geo-fence based on the location information. The position may include a proximity zone associated with the position of the individual. Furthermore, the geo-fence may include one or more beacons that may assist in gathering location information about the devices. The beacons may utilize Bluetooth, WiFi, or other wireless technology and may help to locate and cluster devices 130 as discussed below.

The processor 210 may inform individuals inside and outside of the geo-fence about the incident via a user interface of the user device 130. Additionally, the user interface may provide individuals with the ability to upload feedback related to the incident to the system 200. The feedback may be received by the processor 210 and may include a request for help, a statement that no help is required, an assessment of the incident, audio information, video information, text information associated with the emergency situation, and so forth. In one embodiment, the system 200 may dynamically alter the size and/or shape of the geo-fence based on the feedback received from the user devices. For instance, an individual may report that a shooter has moved to a second location. The system 200 may then move the center point of the geo-fence to the second location. In some embodiments, two or more of reports of such a change might be required to help ensure the geo-fence is not moved prematurely or erroneously. Such a movement of the geo-fence may trigger the transmission of a new round of emergency information messages to individuals now within the newly-located geo-fence. Such a movement of the center point of the geo-fence may be performed automatically by the system 200 based on incoming information, or may be performed manually by an administrator with appropriate access to the system (based on login credentials, entered passwords, codes, etc.). Individuals that are determined by the system 200 to be outside the geo-fence may also be sent notifications to inform them that they are not in danger.

The database 220 may be configured to store a list of individuals that may need to be alerted in the case of an emergency. For example, if the environment 100 includes a university campus, such a list may include students, professors, staff, administrators, security guards, and others who need to be alerted in the event of an incident on or near the university campus. In some embodiments, the system 200 is configured to send a request for location information to each device in the system near the incident. Each individual in the database 220 may be associated with at least one user device 130 that is used to track their location and provide emergency information. The system 200 may store location information about devices. For example, if an incident is detected, the system may access the last known locations of user devices to determine which devices are located near the incident. In some embodiments, each individual is associated with a user device 130 by way of an app instance identifier representing a particular mobile application instance installed on a user device. Further, identifying information (pictures, descriptions, contact information, etc.) and third-party emergency contact information may be associated with each individual in the database 220. In some embodiments, the database 220 additionally stores information used to validate mobile app instances and to also validate location information received from the app instances. Validation of users, as well as systems and methods for securely determining the location of a user device through the use of beacons are discussed more detail in U.S. Provisional Patent Application No. 62/266,451 (Attorney Docket No. 51425.13PV01), which is hereby incorporated in its entirety by reference.

Notifications about the incident, locations of other incidents, individuals located in proximity to the incident, safety status information for individuals, and feedback received from individuals 120 via user devices 130 may be stored in the database 220. The data in the database 220 may be accessible by an operator of the system 200, one or more first responders, representatives of emergency or law enforcement agencies, and so forth.

In some embodiments, the system 200 includes a communications interface 240 that may facilitate the reception and processing of communications for the system. The communications interface 240 is operable to send and receive communications via the Internet and local networks. The communications interface 240 includes a number of interfaces configured to receive information about potential emergencies from any number of sources. For example, an internal data interface 250 is configured to receive data from one or more user devices 130, the first responder user device 162, and other data sources within the internal network of the interactive emergency visualization system 200. The data received by the internal data interface 250 may include incident reports, safety status information for individuals, audio/video associated with an incident, descriptive information about the incident such as location and severity information, etc. The data collected by the internal data interface 250 may be utilized by the processor 210 to determine that that an incident has occurred.

A sensor interface 260 may be configured to gather sensor data from a number of data sources. For example, in one embodiment, the sensor interface 260 may be a collection of APIs configured to interface with a variety of different sensors and data sources controlled and/or operated by third-parties. The sensor data may be processed at the sensor interface 260 before communication to the processor 210. In one embodiment, such processing may include normalization of the sensor data to make it amenable to analysis and display within the system 200. The sensor interface 260 may be in communication with any number of sensor systems and other data gathering devices. For example, sensor systems may include smoke alarms 262, gunfire detection systems 264, anti-drone systems 266, CCTV cameras 268, traffic cameras 270, radiation detectors 272, seismic alert systems 274, pollution sensors 276, and any number of other sensor systems. The sensor data collected by the sensor interface 260 may be utilized by the processor 210 to determine that that an incident has occurred. The sensor data collected by the sensor interface 260 may also be utilized by the processor 210 to update the status of an on-going incident (e.g., determine current severity and location).

In some embodiments, third-party sensors and data sources may include incident detection abilities. In this case, the third party sensor system may identify an incident and communicate incident information to the system 200 via the sensor interface 260. In some embodiments, beacons 574, such as those referred to in FIG. 3, may include features operable to detect an incident. For example, beacons 574 may be Bluetooth beacons that include barometric pressure sensors or thermometers. If one or more beacons 574 detect a temperature over, e.g., 100 degrees Fahrenheit, the beacon (s) 574 may automatically send a notification to the sensor interface 260 reporting an incident (such as a fire).

A third-party data interface 280 is configured to collect information from any number of third-party data sources such as social media platforms and the Internet. For example, the third-party data interface 280 may include a collection of APIs to interface with third-party applications (apps) 282 such as Twitter, Facebook, Instagram, Snapchat, Flickr, LiveJournal, Tumblr, YouTube, Vimeo, LiveLeak, and any other social media or public information feed. The third-party data interface 280 may collect information related to an incident and/or related to a specific location or person of interest from these third-party data sources. As another example, the third-party data interface 280 may include a collection of APIs to interface with Internet data sources 284 such as news feeds (AP, CNN, etc.), records databases, airline tracking information, webcams, and any number of other Internet-based information sources. The data collected by the third-party data interface 280 may be utilized by the processor 210 to determine that that an incident has occurred. The data collected by the third-party data interface 280 may also be utilized by the processor 210 to update the status of an on-going incident (e.g., determine current severity and location).

Figure 3:
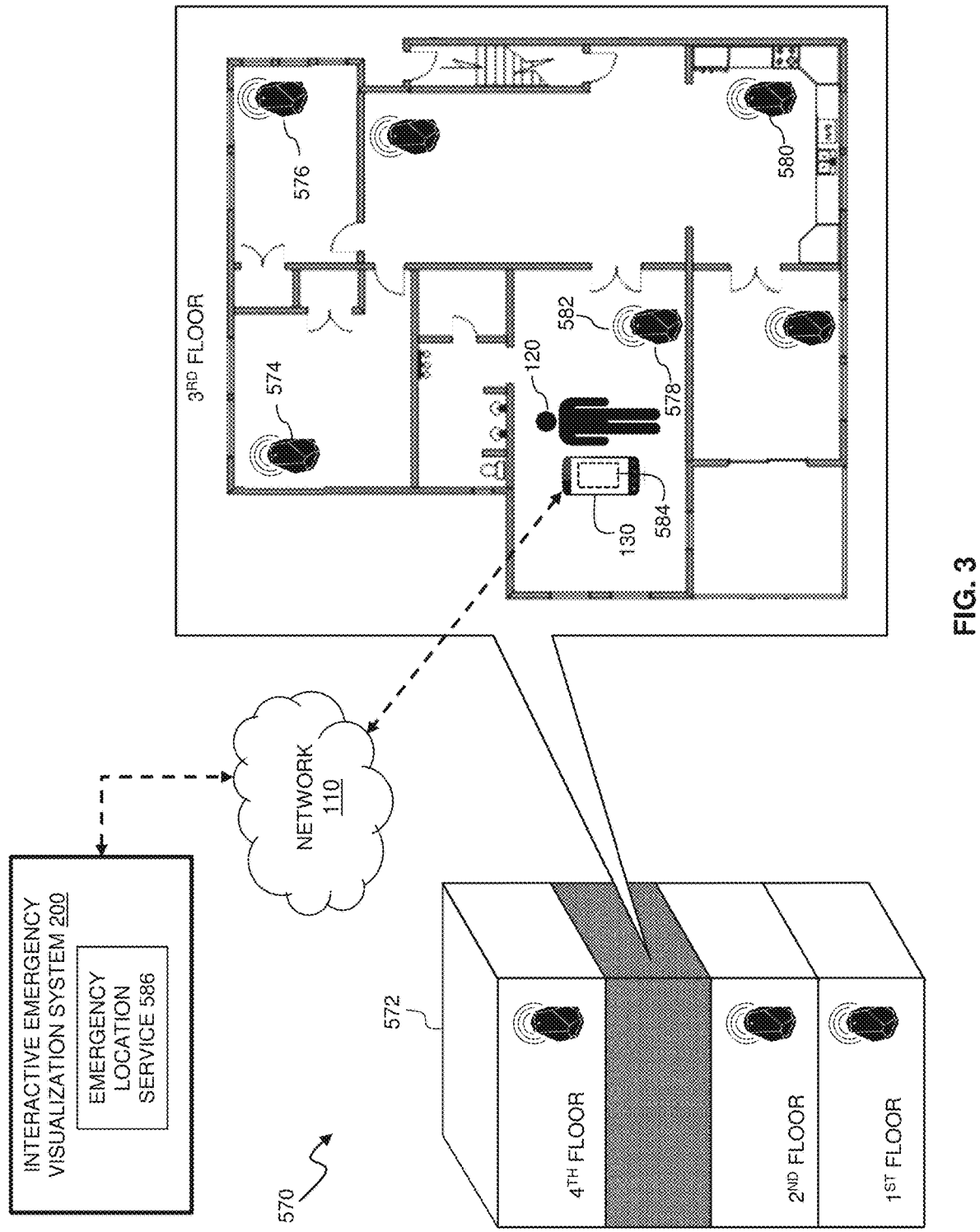
FIG. 3 illustrates an environment within which interactive emergency visualization systems and methods may be implemented, in accordance with various embodiments.

FIG. 3 illustrates an environment 570 within which secure, beacon-based location systems and methods may be implemented, in accordance with various embodiments. Specifically, the environment 570 includes a geographical location 572, which represents any location in which an individual 120 with a user device 130 may be located. In the example of FIG. 3, the location 572 is a multi-story structure such as a building. In some embodiments, the location 572 may be an indoor location—such as a single-story or multi-story residence, a single-story or multi-story commercial building, a subway, or any other indoor location—or may be an outdoor location either urban such as a university campus or rural such as a local, state, or national park. In one embodiment, the location 572 may be a combined indoor-outdoor location, such as a subway or airport with underground and above-ground locations, or a building with a courtyard. One or more beacons may be disposed in the location 572. As used herein, a "beacon" is a communication device having a known temporary or fixed location that broadcasts a signal that may be detected by user devices 130 within certain proximity of the beacon. The signal typically contains identification, location, or verification information, or a combination thereof. Because a beacon's location is known, when a user device detects the beacon's signal, the location of the user device is also known by proxy. Examples of suitable beacons for use according to the present disclosure include any available to those of ordinary skill in the art, including without limitation radio frequency (RF) beacons, Bluetooth Low Energy (BLE) beacons (also known as Bluetooth Smart beacons), Wi-Fi beacons, infrared beacons, Near Field Communication (NFC) beacons, and radio frequency identifier (RFID) tags, and any one, two, or combination of additional types of beacons may be used separately or in a single beacon device to help ensure continuity of signals to and from a given beacon or network of beacons.

As described above, the interactive emergency visualization system 200 is the emergency information server component in the client-server architecture of the emergency information dissemination scheme described herein. As will be described in more detail, the beacons are utilized by the system 200 to aid in determining the geographical location of the user device 130 and, by association, the individual 120. Such location information may be used by the system 200 to transmit location-based emergency information to the user device in the event of an emergency in the vicinity of the location 572. In addition, the beacon-based location system illustrated in FIG. 3 is secure in that location information reported by user device 130 is validated to inhibit or prevent malicious users or attackers from spoofing user locations and preventing, hindering, or otherwise misdirecting the flow of accurate emergency information.

In the illustrated example, beacons 574, 576, 578, 580 are permanently or temporarily disposed on the third floor of a multi-floor building. Other beacons may be disposed on various other floors of the location 572. The beacons may also be disposed in various rooms of each floor. As shown in the illustration of FIG. 3, beacons 574, 576, 578, 580 are disposed within different rooms on the third floor to aid in precisely locating devices within a building. A particular shape of the location 572 is not required, nor is a particular placement of the beacons 574, 576, 578, 580 within the location. Placement of the beacons 574, 576, 578, 580, including, but not limited to, spacing between the beacons, may be regular, irregular, or random. In various embodiments, the beacons 574, 576, 578, 580 may have the ability to transmit, receive, or both transmit and receive information. Typically, sufficient beacons each with sufficient range are used to permit determination of the location of an individual within a floor. In particular, the beacons 574, 576, 578, 580 may allow the system 200 to determine the locations of devices 130 and individuals 120 within the location 572, for example to determine the floor and room in which the device 130 and individual 120 are located.

In one embodiment, the beacons in location 572 are maintained and/or placed in specific geographic locations by the administrators of the interactive emergency visualization system 200. In other embodiments, the beacons are maintained and/or placed by third parties who report the locations of the beacons to the system 200.

The beacons 574, 576, 578, 580 transmit data wirelessly over broadcast signals 582 that may be detected by user device 130 when the user device is within the broadcast transmission range of the beacons 574, 576, 578, 580 (i.e., proximate to a beacon). The broadcast transmission range of the beacons 574, 576, 578, 580 may be as little as a few inches or as great as 500 feet or more depending on the configuration of the beacons 574, 576, 578, 580, as well as other known factors such as interference, type of signal, etc. In some instances, the broadcast signal 582 may be referred to as an advertisement or ping, and is broadcast intermittently at configurable advertisement intervals. Further, the broadcast signal 582 may be a short-distance wireless signal (e.g., a Bluetooth Low Energy signal), a medium distance wireless signal (e.g., a Wi-Fi signal), and/or any other suitable electro, magnetic, and/or electro-magnetic broadcast signal type. In some embodiments, the beacons 574, 576, 578, 580 may be configured to communicate using more than one type of wireless communications. For instance, the beacons may broadcast the signal 582 using one type of wireless signal, such as Bluetooth Low Energy, but use another type of wireless signal to engage in point-to-point communications with the user device 130. Power and/or directionality of the broadcast signal 582 on the beacons 574, 576, 578, 580 may be adjusted to communicate only within a desired range and/or direction in various embodiments.

The broadcast signal 582, in various embodiments, includes a beacon identifier (beacon ID), which uniquely identifies a beacon and allows it to be associated with a specific geographical location. For instance, the database 220 in the interactive emergency visualization system 200 (shown in FIG. 2) may store a list of beacon identifiers that respectively represent beacons deployed in locations, such as location 572. In database 220, each beacon identifier may be associated with specific geographic location information such as street address, latitude and longitude, elevation, building floor, building room, map sector, geographical landmark, a combination of the foregoing, or any other location information helpful in identifying a geographical location of a beacon. In some embodiments, the beacon identifier comprises three components—a Universally Unique Identifier (UUID), a major number, and a minor number—which are hierarchical in nature with the major and minor numbers allowing for refinement of location information. For instance, if location 572 is a multi-story building, the UUID may denote the building itself (such that all the beacons in the building are assigned the same UUID), the major number may denote a particular floor, and the minor number may denote a particular room. The known beacon locations are utilized by the system 200 to help determine the location of a user device. In some embodiments, the beacon location information may be utilized in conjunction with other location information, such as GPS information, cellular information, and/or Wi-Fi information, to pinpoint a user device's location. In particular, the UUID may allow the system 200 to pinpoint the location of a user device 130 within a multi-floor structure, for example on the third floor, in room two.

In the illustrated embodiment, the beacons 574, 576, 578, 580 do not contain long-range communication capabilities and rely on the user devices 130 to pass the beacon identifier and beacon verification information to the interactive emergency visualization system 200. In other embodiments, however, the beacons 574, 576, 578, 580 may additionally contain long-range communication (e.g., wide-area network) capabilities, such as Wi-Fi communication capabilities, cellular communication capabilities, satellite communication capabilities, etc., such that the beacons themselves communicate with the interactive emergency visualization system 200, either in addition to or in place of the user devices 130 passing such information back to the interactive emergency visualization system 200.

The broadcast signal 582 of the beacons 574, 576 578, 580, in some embodiments, also includes broadcast power information that indicates how strong the signal should be at a known distance (sometimes called transmitter power or measured power). A user device receiving the broadcast signal may use the reference broadcasting power information to estimate the range (proximity) of the user device 130 from the beacon by comparing it to the actual strength of the signal received at the device 130. In some embodiments, the distance between the user device 130 and a beacon may be used by the interactive emergency visualization system 200 to further refine location information describing the user device's 130 geographical location.

According to various embodiments, beacons 574, 576 578, 580 include various hardware and/or software components to effect communication with the user device 130. In general the beacons 574, 576 578, 580 include a processing component such as a microprocessor with working memory, non-transitory static memory, one or more wireless communications transceivers such as a BLE and/or a Wi-Fi transceiver, an antenna, a real-time clock, a battery, and various physical buttons or switches to control power and operational mode. In various embodiments, the beacons 574, 576 578, 580 may include various other components such as sensors (e.g., accelerometers, proximity detectors, motion detectors), additional wireless transceivers such as cellular-based transceivers, wired transceivers such as an Ethernet transceiver, one or more physical communication ports (such as a USB port or other port configured to facilitate a local communication connection for management or data transfer purposes), voltage monitors, speakers, microphones, lights, cameras, and other components that would aid in the distribution of location based emergency information to individuals.

Executing on the user device 130 is a mobile application ("app") instance 584 configured to communicate with the interactive emergency visualization system 200. In one embodiment, the mobile app is provided by the system 200 and an app instance 584 of the mobile app is downloaded and installed on the user device 130, typically in advance of an incident. For example, if the individuals 120 are students associated with a university, the students may install an instance of the app instances 584 on their smart phone, laptop, and/or tablet (or other suitable network-enabled computing device as disclosed herein) as part of or in association with enrollment or orientation. In the illustrated embodiment, each app instance 584 installed on a user device 130 includes an app instance identifier, which uniquely identifies the particular app instance 584 and allows it to be associated with a specific individual. For instance, the database 220 in the interactive emergency visualization system 200 may store a list of app instance identifiers that respectively represent unique installations of the mobile application on user devices 130. In database 220, each app instance identifier may be associated with a specific individual and other relevant information useful during an emergency, such as emergency contact information for the individual. In some embodiments, the mobile app is a standalone mobile application, but in other embodiments, the app is executable through a web browser application or is an integrated part of the operating system of the user device 130. The app instance 584 may communicate with the interactive emergency visualization system 200 via network 110 using any of the communication transceivers in the user device 130. For example, the app instance 584 may receive and transmit emergency information via any available route, including a cellular data connection, Bluetooth, and/or a Wi-Fi data connection.

The interactive emergency visualization system 200 may further include one or more services executing on the processor 210 that are accessible via the network 110. Such services may provide the interface through which the user devices 130 communicate with the system 200. For example, the system 200 may expose an emergency location service 586 that the plurality of deployed app instances 584 interact with to affect the emergency services describes herein. In one embodiment, the app instance 584 transmits beacon-based location information to the emergency location service 586, which verifies the location information and, if verified, uses it to update the recorded location of the individual 120. In some embodiments, the emergency location service 586 is a specialized web service configured to expose a machine-to-machine interface with which the app instances 584 exchange emergency and location data. In other embodiments, the emergency location service 586 is a hardware-based, specialized server system operating within the interactive emergency visualization system 200 with which the mobile application ("app") instances 584 are configured to communicate. In either scenario, the hardware and/or software on which the emergency location service 586 executes is scalable to accommodate a large amount of concurrent interactions with a large number of app instances 584 during an emergency event.

The user device 130 is configured to detect the broadcast signal 582 from beacons 574, 576 578, 580 when the user device 130 is located within the transmission range of a beacon. In the illustrated embodiment, the app instance 584 executing on the user device 130 is configured to scan for broadcast signals emanating from nearby beacons. Such scanning techniques may, in various embodiments, be carried out by hardware, software, or a combination of hardware and software in the user device 130. As will be described in greater detail below, the app instance 584 is configured to detect a broadcast signal 582 from one or more of the beacons 574, 576 578, and 580, capture the information—such as the beacon identifier and proximity indication—in the signal, and provide it to the system 200 to report that it is physically near the detected beacon. The system 200 utilizes the known location of the beacon to determine that the user device 130 is near such known location, or even the approximated or actual distance.

Figure 4A:
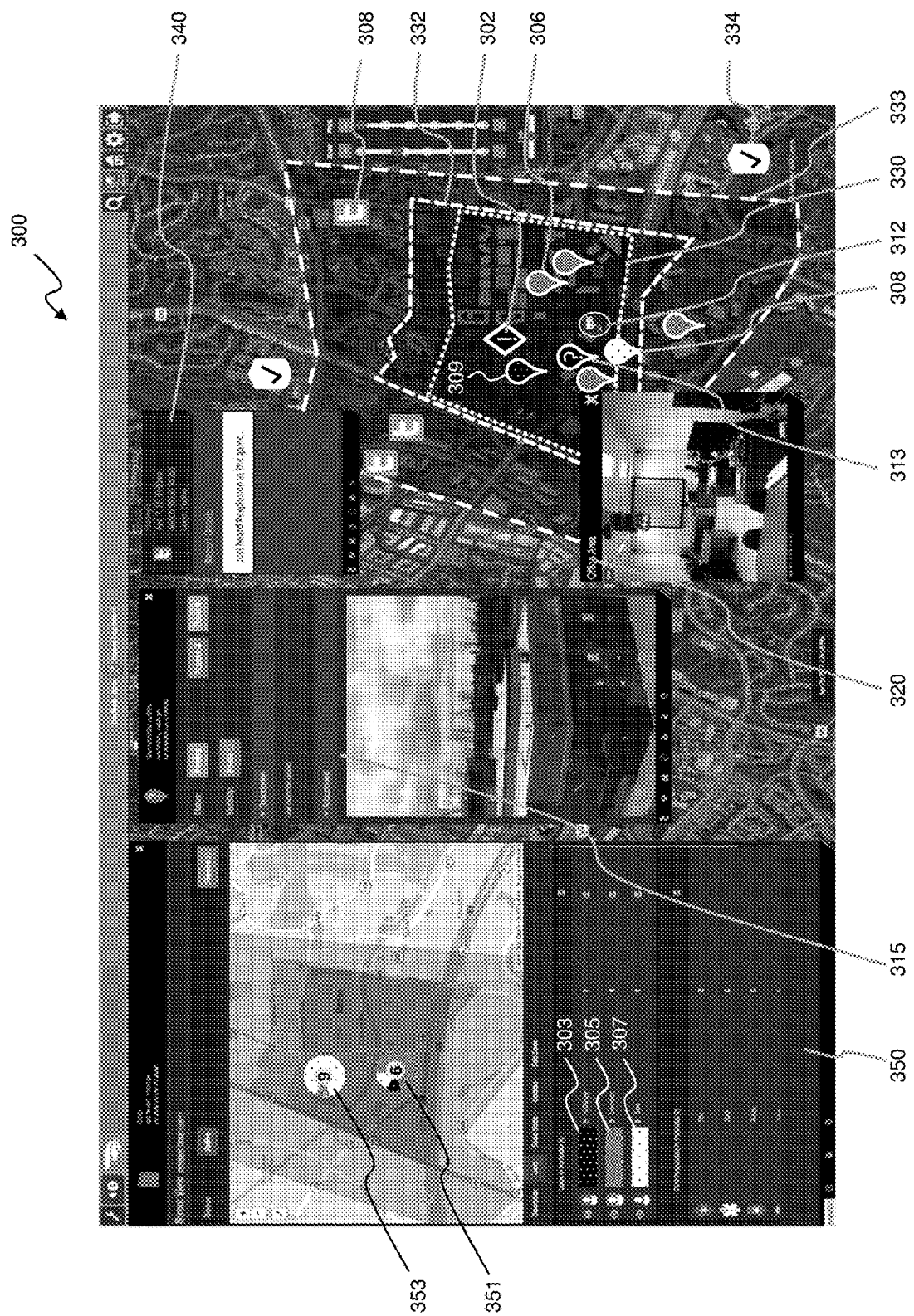
FIG. 4A illustrates an interactive emergency visualization system, in accordance with some exemplary embodiments.

FIG. 4A shows an exemplary visualization 300 that may be generated by the interactive emergency visualization system 200. In some embodiments, the visualization 300 may be configured to track the progression of an incident or emergency. The visualization 300 may be displayed on an administrator user interface utilized by a first responder, emergency management coordinator, 9-1-1 operator, or the like. The visualization 300 may also be displayed on a display device such as computer screen, tablet, smartphone for use by any such administrator, first responder, emergency management coordinator, 9-1-1 operator, or on a first responder user device 162, a work station 180, etc. or more typically a combination thereof. In some embodiments, the visualization is may displayed in a web browser connected to the Internet and/or a local area network (LAN). In some embodiments, the visualization 300 may allow a user to identify incidents, respond to incident conditions, and communicate to individuals and first responders regarding the incident. In some embodiments, one or more processors or servers may be used to generate any of the visualizations 300, 400, 460, and 470 shown in FIGS. 4A-4D.

The visualization 300 may include graphical map data relating to an area of interest, such as a city or building complex. This map data may be overlaid with a number of images, symbols, view screens, status bars, and other visual data to track the incident. In the example of FIG. 3, the visualization 300 may include a number of markers 302, 306, 308, 312. In particular, the visualization 300 may include an incident marker 302 to show where an incident has occurred. The placement of the incident may be measured by a number of sensors and other data gathering devices including cameras, alarm systems, and mesh networks. In some embodiments, the size of the incident marker 302 may be varied based on the size of the incident. The visualization may include an estimation of an area affected by the incident. For example, the location and size of a fire may be estimated by the system 200 and appear on the visualization 300 as an incident marker 302 with a size and shape corresponding to the fire.

In some embodiments, the visualization 300 may include patterns and/or colors that represent various risk and status levels. In the example of FIG. 4A, patterns 303, 305, 307 represent safety status levels. In particular, dark pattern 303 may correspond to a safety status of "in danger." In other embodiments, a dark pattern 303 may correspond with a red color. This pattern 303 may also be incorporated in to individual markers such as individual marker 309, which represents an individual who is "in danger." A medium pattern 305 may represent a safety status of "unknown." In other embodiments, medium pattern 305 may be represented by a yellow color. FIG. 4A shows an individual marker 306 representing an individual with an unknown status. A light pattern 307 may correspond with a safety status of "safe." In other embodiments, light pattern 307 may be represented by a green color. FIG. 4A shows an individual marker 308 representing a "safe" individual. The patterns 303, 305, 307 may also be used to represent these respective safety status levels in cluster markers 351, 353. Other patterns, colors, and images may be used to represent safety status levels as well as risk areas. The safety statuses of individuals displayed in the visualization 300, in one embodiment, are received from the user devices 130 associated with the individuals.

The visualization 300 may include one or more geo-fences 330, 332, 333. In some embodiments, the size and shape of the geo-fences 330, 332, 333 may be determined before information about an incident is received by the system 200. For example, a pre-defined geo-fence may correspond to the perimeter of a building. In other embodiments, the size, shape, and safety level of each geo-fence 330, 332, 333 may be determined in relation to an incident. The safety level of each geo-fence 330, 332, 333 may be represented by a pattern or color. In the example of FIG. 4A, the geo-fence 330 has been placed around a complex where an incident marker 302 has been placed. The small dashes of the geo-fence 330 may represent that the area within the geo-fence may place individuals in danger. In other embodiments, the geo-fence 330 may be represented with a red color or with red shading. The geo-fence 332 may represent a region in which individuals are at risk or near danger, and may have medium size dashes (longer than the dashes of geo-fence 330). In other embodiments, the geo-fence 332 may be represented with an orange color or orange shading. The geo-fence 333 may represent a region in which individuals may be affected by the danger, and may have long dashes (longer than the dashes of geo-fence 332). In other embodiments, the geo-fence 332 may be represented with a yellow color or yellow shading. The small icon 334 may represent a safe zone. In some embodiments, icons 334 representing safe zones may have a light pattern (or a green color in other embodiments). In some embodiments, the different geo-fences 330, 332, 333 may correspond with proximity zones that that represent physical areas of different distances from the location of the incident. In other embodiments, geo-fences may be established based on other location criteria, such as buildings, roads, city blocks, landmarks, or other criteria. The spacing of the dots of the geo-fences 330, 332, 333 may vary depending on the information displayed on the visualization 300. For example, areas with higher risk may be represented with dotted lines where the dots are closer together. In other embodiments, various risk levels may be shown by colors (such as red, orange, yellow, and green). Geo-fences may also be displayed with shaded regions, patterned regions, regions labelled with text, or other visual indicators of various risk levels such as "in danger", "some risk", "safe", or "unknown."

Still referring to FIG. 4A, individual markers (or icons) 306, 308 may represent the location and safety status of individuals. An individual may be any person with a user device that is registered or tracked by the system 200. In some embodiments, each individual is associated with a device for purposes of the visualization 300. In some embodiments, the pattern of the individual marker 306 may be configured to show the safety status of the individual. For example, an individual marker 306 that displays the dark pattern 303 (which may correspond to the color red in some implementations) may represent that an individual is in danger, a medium pattern 305 (which may correspond with the color yellow in some implementations) may represent that the status of the individual is unknown, and a light pattern 307 (which may correspond with the color green in some implementations) may represent that the individual is safe. Other patterns, colors, and safety statuses may be included in the visualization 300. As another example, a color scheme may be used with red representing unsafe, yellow representing unknown, and green representing safe. In some embodiments, the safety status of the individual may be determined by communications from an individual, such as voluntary status updates or responses to queries sent by the system 200. In other embodiments, the safety status of the individual is determined by the danger level of the incident and the proximity of the individual. For example, the visualization 300 may receive information about a bomb incident. The radius of the bomb may be calculated by comparing data received by several sensors. This radius may be shown on the visualization 300 and the individuals within the radius may have their statuses updated to "in danger."

In some embodiments, the safety status of each individual does not necessary correspond to the safety level of the geo-fence 330 in which the individual is located. For example, the visualization 300 includes a number of individual markers 306 with medium and light patterns 305, 307 within the geo-fence 330 with a dark pattern 303. This difference in status may be show that not all individuals within the geo-fence 330 have been affected in the same way by the incident. For example, an isolated shooting may affect some of the individuals, such as the individual markers 306 with the dark pattern 303 around the incident marker 302, while other individuals further away are not affected. In FIG. 4A, an individual marker 308 with a light pattern (indicating a "safe" status) is located within the geo-fence 332 where individuals may be at risk or near danger.

Individuals may also be represented in clusters. For example, cluster markers 351 and 353 are shown on the visualization 300 of FIG. 4A. The cluster markers 351 and 353 may represent a clustered number of individuals as well as the safety statuses of the users in the cluster. In some embodiments, a number in the center of the cluster marker 351, 353 may show the number of users within the cluster, while the pattern of the cluster marker 351, 353 may correspond to the safety status of the users within the cluster. For example, cluster marker 351 includes six individuals and has a predominantly medium pattern, indicating that a majority of the users have a safety status of "unknown." A small percentage of the users within the cluster of cluster marker 351 have a safety status of "safe" (shown by the small lightly patterned portion) and another small percentage of the users have a safety status of "unsafe" (shown by the dark pattern). In another example, cluster marker 353 represents a group of nine individuals with mostly "safe" safety statuses shown by the large area of the light pattern. In other embodiments, cluster markers may include a single safety status for all individuals within a cluster. The cluster markers may also include a single safety status of the majority of the individuals or the highest safety status level of an individual within the cluster. The clustering of individuals and the displayed cluster markers 351, 353 may be configured to simplify the visualization of many individuals while still representing their locations and statuses.

In some embodiments, the clusters may allow a user of the visualization 300 to quickly assess the location and safety status of individuals without having to view each individual separately. The clusters may also simplify the visualization 300. The clustering of individuals may vary according to the needs of the user of the visualization 300. For example, in the event of an incident involving a large number of people, such as an incident during a large concert, the visualization 300 may be configured to represent large numbers of people with each cluster marker. In the event of an incident involving a smaller number of people, such as incident in a house or small commercial building, the visualization 300 may be configured to represent smaller number of people in clusters or even individual markers 306 without clustering.

In some embodiments, the size of each cluster makers may scale based on the view level of the visualization 300. For example, a user may zoom into a region of the map which includes one or more clusters. As the map becomes more detailed, the clusters may split into smaller clusters and finally into individual markers 306. This scalability may allow a user to view the safety statuses of many individuals while representing their general locations. Furthermore, a user of the visualization 300 may be able to "zoom into" areas of interest to view more granular data on individuals.

In some embodiments, the system 200 may assign individuals to clusters based on proximity to a beacon. For example, when an incident is detected, the system 200 may request location information from the user devices 130. The user devices 130 may in turn receive beacon information from nearby beacons, including one or more of a Universally Unique Identifier (UUID), a major number, a minor number, a proximity measurement (as determined by the signal strength of the beacons), and a Received Signal Strength Indicator (RSSI) transmitted by the one or more beacons. This information is sent from the user devices 130 to the system 200 where is it analyzed to determine the closest beacon to each user device 130. After this determination, the system 200 checks the status of the beacon to see if the devices are part of an incident. The system 200 compares the beacon information received from the device 130 to stored beacon information in a database. If the beacon information matches, the system determines the user device is near a specific beacon and the device is clustered to that beacon on the visualization.

In other embodiments, the system 200 may generate clusters based on criteria such as proximity and status. For example, the system 200 may cluster determine that a number of individuals are located in close proximity to each other. The system 200 may assign these individuals to the same cluster. The system 200 may make this determination based on a maximum distance between individuals or a minimum radius of a circular area in which individuals are located. In the case of a multi-floor structure, such as an office building, users may be clustered together based on the floor on which they are located.

The system 200 may also assign individuals to clusters based on similar status. For example, the system 200 may cluster a number of individuals with a "safe" status in a single cluster. Combinations of the above clustering methods may also be used. For example, the system 200 may determine that all individuals with a "in danger" status that are less than 200 feet from a beacon will be clustered to that beacon.

In some embodiments, the shape, pattern, or color of an individual marker 306 may represent a type of individual. For example, an individual marker 306 with a light, medium, or dark pattern (or a green, yellow, or red color) may represent a civilian, employee, or passer-by, while an individual marker 306 with a different shape, pattern, or color (such as a shield for law enforcement or a cross for a paramedic) may represent a first responder. Furthermore, various types of first responders may be individually displayed on the visualization 300. For example, first responders may be identified as "Fire", "EMS", "Police", "Other", or have other custom designations (such as "mall security"). The separation of individuals by type may allow a user of the visualization 300 to quickly assess the location and number of first responders near an incident. The various types of individuals may be tracked independently on the visualization, such as being included on different individual safety status lists 350 for each type, or by being clustered according to type. For example, a first cluster may include only law enforcement individuals, a second cluster may include only medical professionals, and a third cluster may include only civilians. Furthermore, a user may be able to select the type of individuals displayed on the visualization 300. For example, the visualization 300 may display only law enforcement individuals in one window while all individuals are displayed in another window.

Individuals may be clustered together according to type and location, as discussed previously, as well as other criteria. For example, clusters may be formed on the visualization to represent individuals with the same safety status. Clusters may also be formed around certain important locations, such as checkpoints, safe zones, areas adjacent to an incident. Clusters may also be formed around beacons. For example, beacons may be located on floors throughout a building. Individuals may be clustered throughout the building based on their location relative to the closest beacon.

Additionally, the visualization 300 may display representations of data received via the sensor interface 260 and the third-party data interface 280. As discussed above, the sensor interface 260 may receive incident-related data from any number of sensors such as closed-circuit televisions, shot-detectors, etc. The third-party data interface 280 may receive incident-related data from social media platforms such as Twitter and Facebook. The incident-related data elements received from each source typically include both content and location information describing where the content originated. For example a "tweet" from a Twitter user will include the content of the tweet and a location associated with the tweet (typically the location of the user device at the instant the tweet was submitted). As another example, an incident-related data element may contain a CCTV live video stream and the location of the CCTV camera. During and incident, users may submit information from their device which may include video, images and/or text. The information submitted by users may include the present location of the user or the location where the information was captured. This feature may help to add context to the submitted information. In some embodiments, the use and visualization of relevant social media in the visualization 300 may provide for focused intelligence related to the incident.

As shown in FIG. 4A, the visualization 300 includes user-selectable graphical representations 308, 312, and 313 of incident-related data elements received by the system 200. In some embodiments, the user-selectable graphical representations on the displayed on the visualization may correspond to the source of the information. For example, the user-selectable graphical representation 308 includes the Twitter icon indicating that the underlying incident-related data element originated from a Twitter user. As another example, the user-selectable graphical representation 312 includes a camera icon indicating that the underlying incident-related data element originated from a camera. As another example, the user-selectable graphical representation 313 includes a pin icon with a question mark which may indicate that the information has been received from a user device but has not been approved manually by a system administrator or automatically by an algorithm. When the information is approved, the icon may be updated to a pin with an exclamation point and the information may be shared with first responders and/or users near the incident.

Each of the user-selectable graphical representations 308, 312, and 313 is displayed on the visualization 300 at a location on the map corresponding with the geographical location from which the underlying incident-related data element originated. Further, as shown in FIG. 4A, a user may select the user-selectable graphical representations 308, 312, 313 to view the content portion of the underlying incident-related data element. For example, when a user selects the Twitter-related user-selectable graphical representation 308, the content of the Tweet is displayed in box 340, along with specific location and timestamp information. As another example, when a user selects the user-selectable graphical representation 312, the image content (e.g., still pictures, video, CCTV, etc.) is displayed in the box 320. As another example, when a user selects the user-selectable graphical representation 313, the image content and options for approving, rejecting and sharing the content is displayed in box 315. The boxes 315, 320, 340 may be hidden or displayed individually or as a group on the visualization 300. Furthermore, the size and position of the boxes 315, 320, 340 may be changed by a user so that important information may be prioritized and easily seen, depending of the incident.

In some embodiments, the interactive emergency visualization system 200 may be operable with control third party sensors such as the CCTV system displayed in box 320. In this case, the operator may be able to access data from third party sensors that are located near an incident. For example, the operator may recognize that the CCTV system includes a camera (shown by the graphical representation 312) that is close to the incident marker 302. The operator may click on the graphical representation 312 to pull up the current or past feeds from the camera, and may even be able to control the camera to change the view angle. Local sensors, such as those in a CCTV or a gun-shot detection device, may be able to process incident information locally before that information is provided to the interactive emergency visualization system 200, and/or concurrently to first responders and/or to building security and management.

In some embodiments, the visualization 300 may display only a subset of user-selectable graphical representations according to the input from a user. For example, different types of user-selectable graphical representations may correspond to different graphical layers, and the visualization 300 may display any combination of layers. In one embodiment, the layers may be based on the content type of the incident-related data elements underlying the user-selectable graphical representations. For example, a user may choose to display on the visualization only the user-selectable graphical representations that are based on video content, or Twitter content, or audio content, etc. In another example, the visualization may display a subset of user-selectable graphical representations based on the timestamp or the location associated with the underlying incident-related data elements.

Figure 4B:
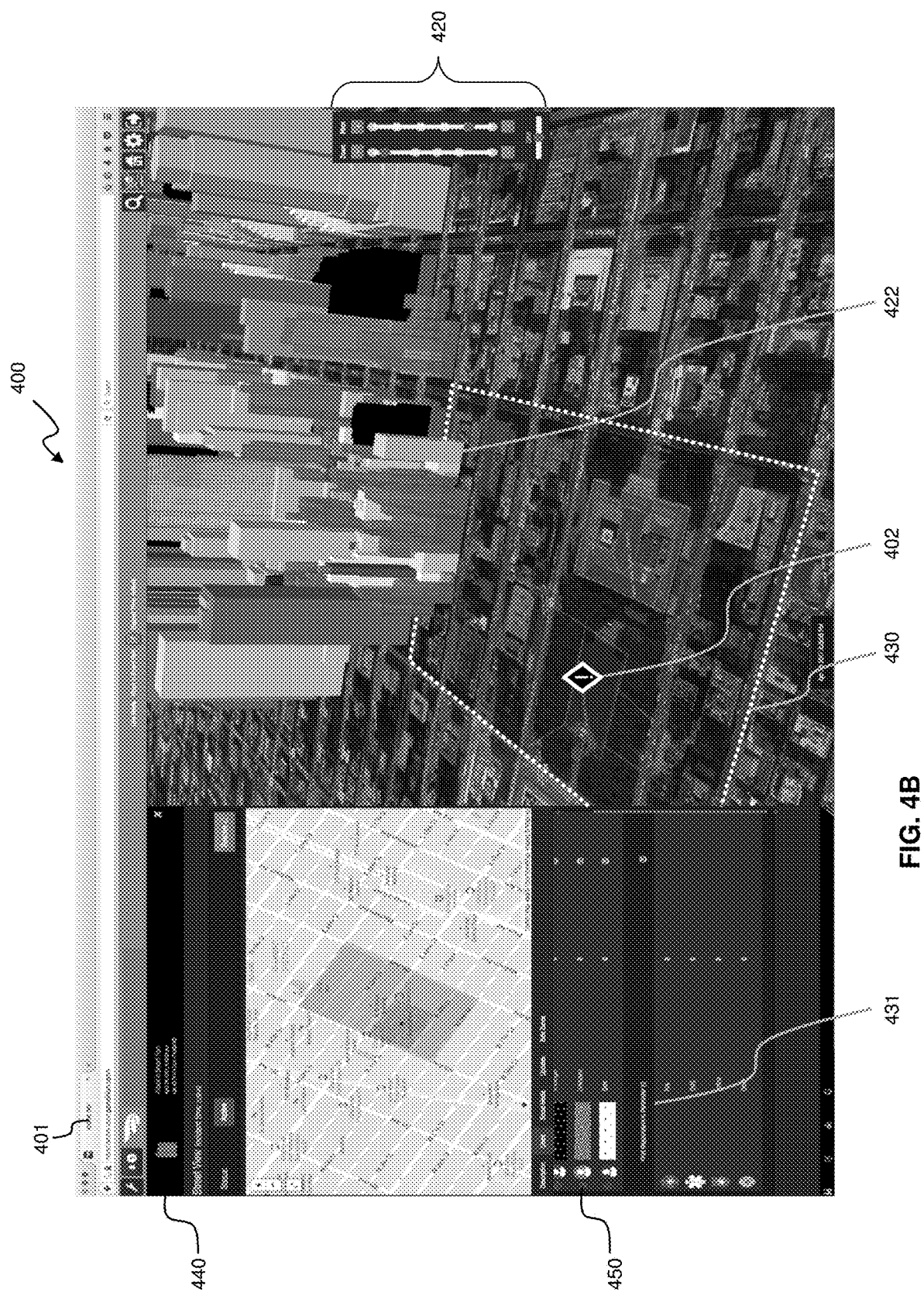
FIG. 4B illustrates another embodiment of the interactive emergency visualization system, in accordance with some exemplary embodiments.

In some embodiments, the visualization 300 may include an individual safety status list 350. This safety status list may include a list of individuals within various areas of the visualization 300. In some embodiments, the safety status list may group individuals by their location within different geo-fences. In other embodiments, the safety status list may group individuals by safety status level. In the example of FIG. 4A, the individual safety status list 350 shows one individual in danger, four individuals whose status is unknown, and one individual that is safe. FIG. 4B shows another example of a three-dimensional (3D) visualization 400. In this example, the 3D visualization 400 is displayed on a web browser 401 that is connected to the Internet-. Although the web browser is shown as connected to the Internet in FIG. 4A, the web browser may also connect to an Intranet or any other type of network to retrieve the data associated with the visualization 400. Also the visualization 400 may additionally be displayed with a stand-alone or proprietary software program. In the example of FIG. 4B, a section of a city is shown on the 3D visualization 400. A geo-fence 430 is represented on the visualization 400 as an area outlined with a dotted line. In other embodiments, geo-fences 430 may be represented with other graphical elements, such as different colors, patterns, or shaded areas. An incident marker 402 is shown within the geo-fence 430. The incident marker 402 may be placed inside a building 422 represented on the visualization in a three-dimensional manner. In some embodiments, the visualization may include other geo-fences 430 that are included within the building 422, such as one or more geo-fences 430 on every floor. Examples of three-dimensional placement of geo-fences 430 are shown in reference to FIGS. 7 and 8. The visualization 400 may also include zoom, pitch, and orbit functions 420 that may allow an operator to visually move about the visualization 400 in a three-dimensional manner.

An incident description box 440 may be included in the visualization 400. The incident description box 440 may include a title for the incident, as well as background information. In the example of FIG. 4B, the incident description box 440 has the title, "Attack in Bryant Park" to describe the incident shown by the incident marker 402. The incident description box 440 may include selectable regions representing information such as descriptions of the incident, users, social media related to the incident, updates, and safe zones. The description region of the description box 440 may include information such as the time, location, type of incident, and risk information. The incident description box 440 may also include other views of the area around the incident, such as zoomed in map views or overhead map views. In the example of FIG. 4B, the incident description box displays a street view of the streets around the incident.

In some embodiments, the visualization 400 may include a safety status list 450. In some embodiments, each incident may include a separate safety status list 450. In some embodiments, each geo-fence may include a separate safety status list 450. The safety status list 450 may include a list of individuals within various areas of the visualization 400. In some embodiments, the safety status list 450 may group individuals by safety status level. The safety status list 450 may also include one or more selectable icons for each safety level. In the example of FIG. 4B, the safety status list includes a "contact" icon which may allow a user to send a notification to all of the individuals in a safety status level. For example, a user could send an "all clear" message to all individuals with a "safe" safety status.

The visualization 400 may also include a box 431 displaying the type and number of first responders near an incident. In the example of FIG. 4B, the box 431 includes separate fields for "Fire", "EMS", "Police", and "Other." First responders and their safety statuses may be tracked independently of other individuals in the system.

Figure 4C:
FIG. 4C illustrates another embodiment of the interactive emergency visualization system.

FIG. 4C shows another example of a three-dimensional visualization 460. In this example, a building 422 is shown in a three-dimensional manner such that individual floors of the building 422 may be viewed as layers. A geo-fence 332 is displayed around the building 422. Individual markers 306 may be visualized by the system within the building 422 and outside the building 422 in a three-dimensional manner. This three-dimensional visualization is further discussed in reference to FIG. 6. In some embodiments, the visualization 460 may include three-dimensional viewing capabilities, such as those provided by the COLLADA file format. In particular, the structures of the visualization 460 may be viewed from any angle.

In some embodiments, the visualization 460 may include various modes configured to display different layers of information. For example, the visualization 460 may include a "Monitor Mode" which allows a user to view all new alerts that are received by the visualization 460. This may allow a user to view the most updated information regarding an incident. The visualization 460 may also include a "Live Mode" which is configured for a user actually responding to an incident. In some embodiments, the "Live Mode" may allow a user to view updates as well as interact with users in the visualization 460, (i.e., to message users, add incident updates, modify existing incident updates, add, modify, and/or delete safe zones or perimeters). To streamline efforts and avoid confusion among first responders, the "Live Mode" may include a setting to restrict access of the visualization 460 to a certain number of viewers. In some embodiments, access is restricted to a single user. In other embodiments, the number may be five or less users, ten or less users, or other numbers of users. Access to the visualization 460 may require a user to enter a code or PIN number. In some embodiments, the visualization 460 may include a "Playback Mode" which allows an operator to view the timeline of an incident. For example, an operator may be able to view when the incident occurred, which it was reported, the actions of individuals near the incident, the activation of geo-fences, and the actions of first responders. In some embodiments, this information may be displayed in the context of a visual timeline such as timeline 310 shown in FIG. 4E. The visualization 460 may also include modes specific to various types of users. For example, a "Law Enforcement" mode may allow law enforcement personnel to view include limited information on individuals in danger as well as the location and status of other law enforcement personnel. Other modes may be possible that grant limited access to a user to view a single region, such as only viewing the individuals and safety statuses of individuals within a single building. This mode may be used by a building security group, for example. The different modes may be represented by colors or patterns on the top of the display. For example, the bar above the visualization 300 of FIG. 4A and the visualization 400 of FIG. 4B may correspond to the "Live Mode" while the blue bar above the visualization 460 of FIG. 4C and the visualization 470 of FIG. 4D may correspond to the "Monitor Mode."

Figure 4D:
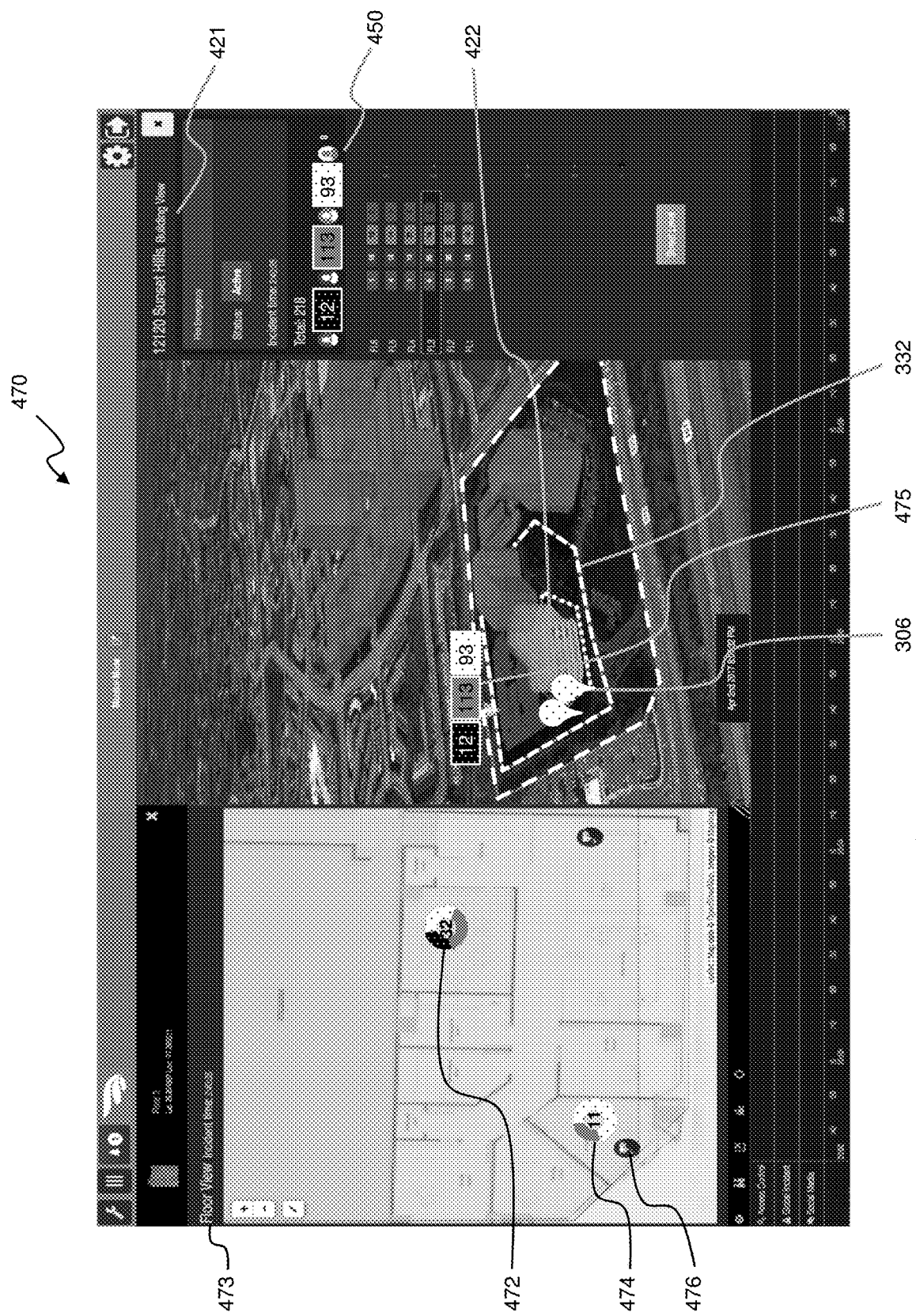
FIG. 4D illustrates another embodiment of the interactive emergency visualization system.

FIG. 4D shows another example of a three-dimensional visualization 470. In this case, a building 422 may be seen in a three-dimensional view. Individual markers 306 may be seen through the walls of the building 422, as well as outside the building 422 and within a geo-fence 332. In some embodiments, the visualization 470 may include selectable graphics representing each floor of the building 422. Each floor may be represented by a status pattern, color, a line, or a box, for example. In the example of FIG. 4D, each floor appears in a 3D view of the building 422. A user may be able to select one or more floors to view a floor plan of each floor in a two dimensional window. For example, the third floor has been selected in the example of FIG. 4D, opening a floor view window 473 showing a two dimensional floor plan of the third floor.

In some embodiments, each floor of the building may be visualized individually by selecting the desired floor in a building view window 421. The building view window 421 may include a title of the building 422, information about each floor, and information about individuals on each floor, including safety status information. For example, the number of users on each floor that are in each safety status category ("safe," "in danger," "unknown," etc.) may be displayed in a visually distinguishable manner. In some embodiments, individuals may be clustered together and represented by cluster markers 472, 474 according to their location on a floor. Although the cluster markers 472, 474 are shown in the floor view window 473, cluster markers 472, 474 may also be displayed in other areas of the visualization 470. The clustering of individuals may allow for simplification of visualizations with many individuals while still representing their locations and statuses. Furthermore, individuals on floors with beacons may be clustered around the beacons. As individuals move throughout the floors of the building 422, they may be clustered in different clusters according to their proximity to a beacon. The cluster markers 472, 474 may include a number of individuals represented by the cluster, as well as the safety status information for each individual in the cluster. Furthermore, cluster markers 472, 474 may include information about the beacon around which they are clustered. For example, the cluster markers 472, 474 may contain a label with the beacon title.

Still referring to FIG. 4D, a total number of individuals within the building 422 may be represented in a status bar 475 for the building 422. In the example of visualization 470, the status bar 475 breaks the individuals into groups according to safety status. For example, 12 individuals have a status of "in danger," 113 individuals have a status of "safe," and 93 individuals have a status of "unknown." The number and safety status of the individuals may also be shown in the building view window 421. For example, the visualization 470 includes 218 individuals according to the building view window 421. The safety status of individuals may further be broken down by floor in the building view window 421. For example, the third floor of the building 422 includes four individuals with a status of "in danger," 25 individuals with a status of "safe," and 14 individuals with a status of "unknown."

In another similar embodiment (not shown), a two-dimensional visualization may be used. For example, for certain types of incidents in a low-lying building with only a few floors it may be simpler to use a two-dimensional visualization, optionally using color coding or shapes to represent individuals and the different floors on which they are located.

The visualization 470 may also include one or more user-selectable graphical representations 312 (FIG. 4A) which may be selected by a user to display media such as still pictures, video, CCTV, user-uploaded images, etc. The user-selectable graphical representations 312 may be selected, viewed, opened, and edited by a user.

Figure 4E:
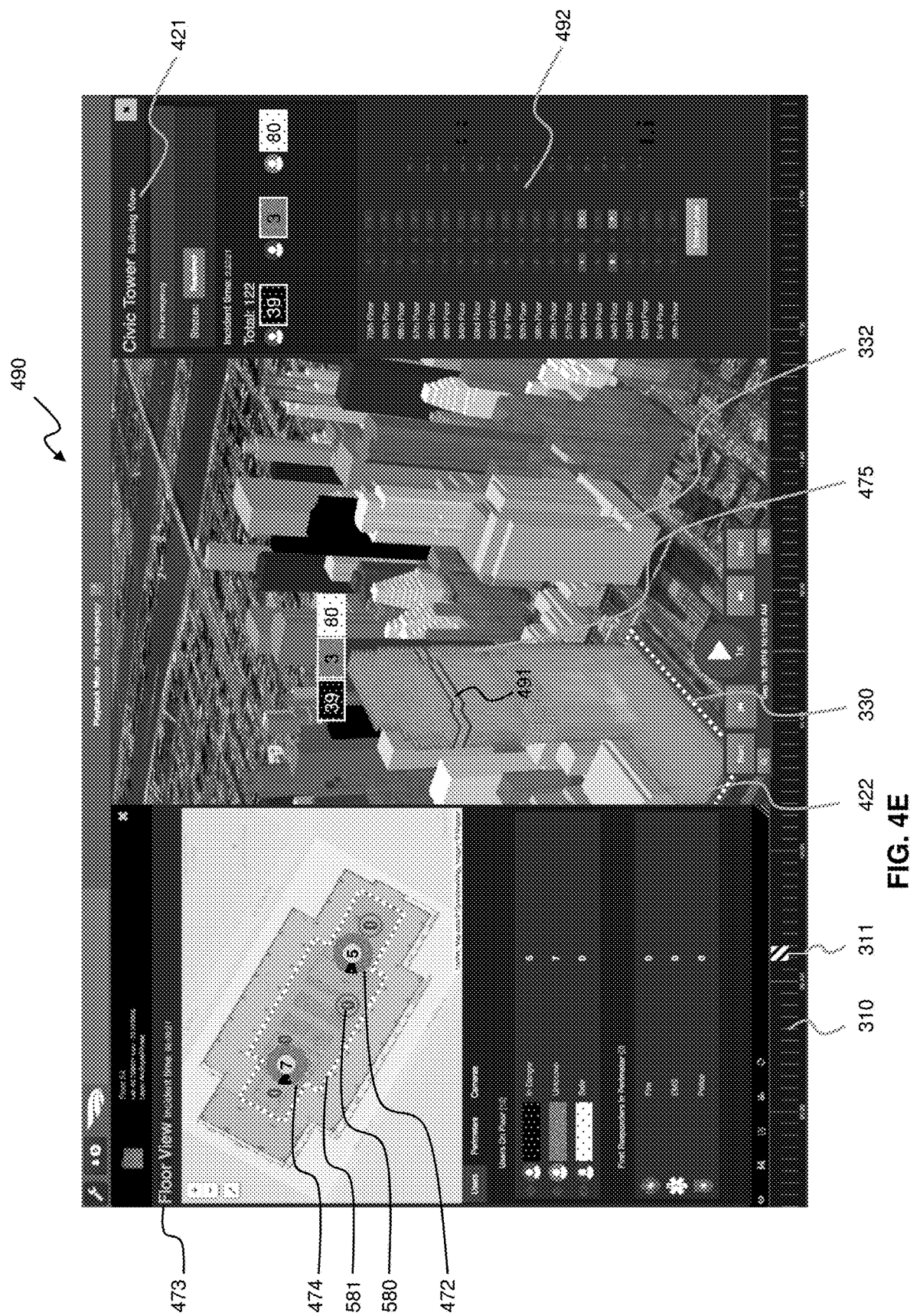
FIG. 4E illustrates another embodiment of the interactive emergency visualization system.

FIG. 4E shows another example of a three-dimensional visualization 490. The visualization 490 shows a 3D depiction of a building 422 with a number of floors. The floors of the building 422 are shown individually. In some embodiments, each floor of the building 422 is shown in a different matter such that the emergency status of each floor may be seen individually. In that regard, in one embodiment, the visual characteristics of a floor in the visualization may correspond to the safety status of the individuals on that floor. For example, a floor depicted in red may indicate that the floor contains individuals who reported a safety status of "in danger." In some embodiments, a geo-fence may be assigned to each floor or groups of floors and activated by a user of the system 200 or first responder. The status of each geo-fence is shown by the visualization 490. For example, a floor list 492 may include information about the safety status of individuals on each floor, or the status of each floor itself. In the example of FIG. 4E, five individuals with a safety status of "in danger" and seven individuals with a safety status of "unknown" are located on the 54th floor, while one individual with a safety status of "in danger" and one individual with a safety status of "unknown" are located on the 56th floor. Floors which contain individuals with safety statuses may be marked 491 on the building. For example, the 54th and 56th floors are marked 491 on the visualization 490 with dark shading to show that individuals with a safety status of "in danger" are located on them. The floors may be marked 491 with other colors, patterns, or images to show status levels of the floor or the present of individuals with safety status levels. In some embodiments, a user may select any of the marked 491 floors or any of the floors of the floor list 492 to open a floor view window 473 showing a 2D top down view of the floor. In the example of FIG. 4E, the floor view window 473 shows a geo-fence 581 which has been activated on the floor and clusters 474 and 472 of individuals which are clustered around beacons 580 within the geo-fence 581.

In the example of FIG. 4E, the bottom of the building 422 is shaded darkly and includes a geo-fence around the base of the building 422. In some embodiments, the perimeter of the building 422 is represented by a geo-fence 330. The visualization 490 may show shading or patterns around the base of the building 422 if the geo-fence 330 is activated. In some embodiments, the base of building 422 may be colored or shaded if other geo-fences are activated within the building 422, such as those activated on the 54th and 56th floors. When a notification of an incident occurring in association with the building 442 is received by the system 200, the pre-defined geo-fence 330 may be activated either manually or automatically. Additionally, depending on the details of the incident, geo-fences corresponding to specific floors may be activated rather than the entire building geo-fence.

In some embodiments, the visualization 490 may include a timeline 310. In some embodiments, the addition of the timeline 310 creates a "four-dimensional" visualization which allows the operator to view aspects of an event in relation to time. In some embodiments, the timeline 310 related to an incident may be accessed via a "Playback Mode." Different sources of information may contribute to this timeline, including a selection of data relating to user devices as well as from local networks and the Internet, and the various types of information described in this disclosure. In some embodiments, time-stamped data is received by the system 200 and is placed in the visualization 490 according to time received. Time-stamped data may be collected for individuals, geo-fences, social media feeds, safety status lists, and other features. A user of the visualization 490 may be able to move back and forth across the timeline by pressing the timeline tools, such as rewind, fast-forward, play, stop, skip forward and backward, and slow to see temporal aspects of the visualization 490. By moving the timeline 310 back and forth, the visualization 490 may display only the events occurring during the corresponding time frame. In some cases, this may allow the operator to analyze an incident forensically.

In some embodiments, the timeline 310 may include events 311 such as the detection an incident or the activation of a geo-fence. The events 311 may also correspond with alerts generated by the system 200. For example, a user of the visualization 490 may receive an alert that an incident is detected within an assigned geo-fence. The user may be prompted to contact first responders, notify individuals, activate geo-fences, etc. via the visualization 490. The alerts may be selectable, allowing a user to see more details of selected alerts. The alerts may also include "accept" or "reject" options, and may allow a user to assign an alert to a task list. In some embodiments, the alerts are listed by type and source (such as a fire that was reported on Twitter).

Figure 5A:
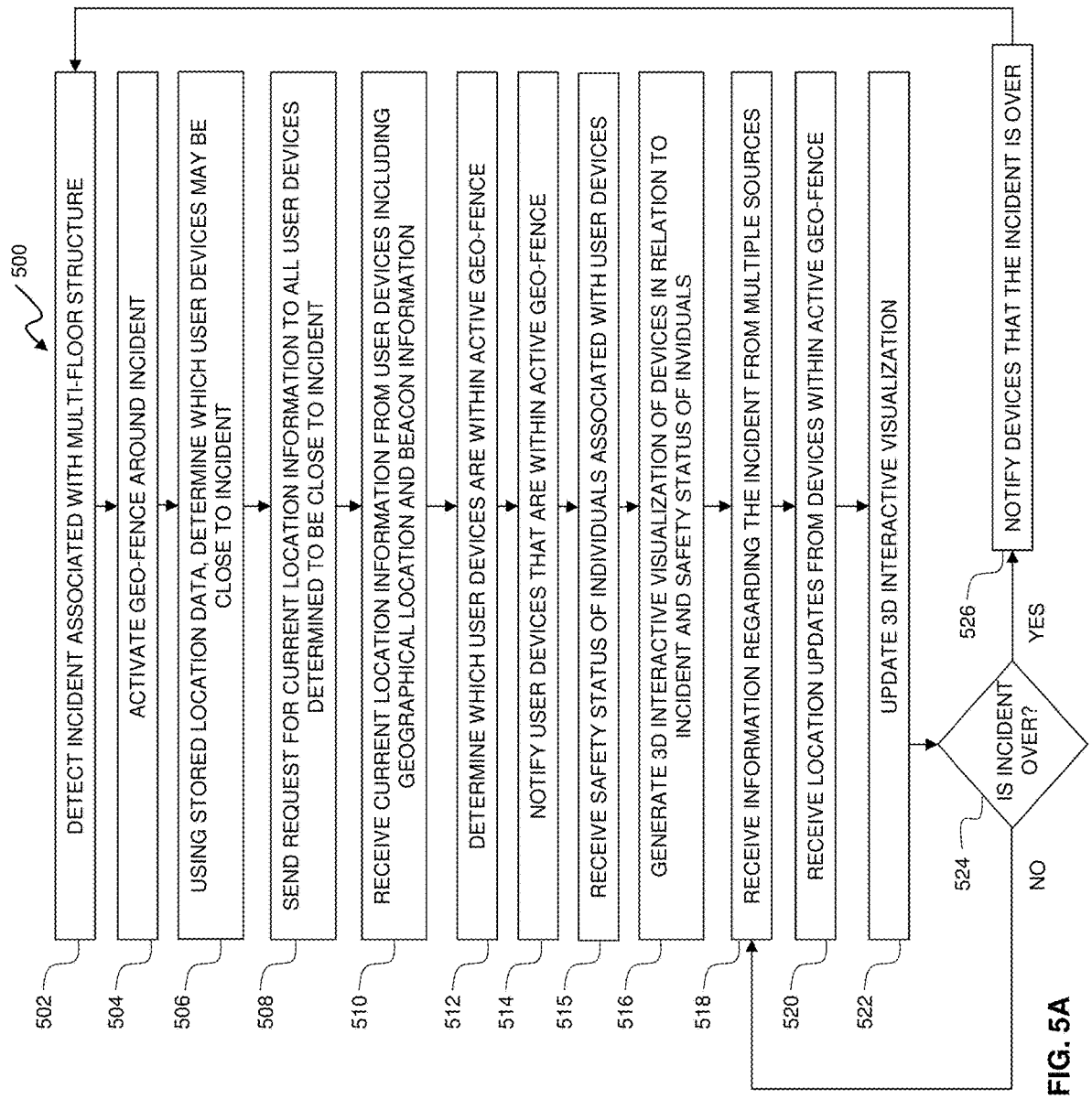
FIG. 5A is a flow chart illustrating a method of using an interactive emergency visualization system to notify users and generate a visualization of user devices, in accordance with some exemplary embodiments.

FIG. 5A is a flow chart illustrating a method 500 carried out by the interactive emergency visualization system 200 to locate and notify users of an incident and generate a visualization of the location and safety status of user devices, in accordance with some exemplary embodiments. The method 500 may be performed by logic that may comprise hardware (e.g., dedicated logic, programmable logic, and microcode), software (such as software run on a general-purpose computer system or a dedicated machine), or a combination of both. In one exemplary embodiment, the processing logic resides at the interactive emergency visualization system 200, and the various elements of the system 200 may perform the method 500. It will be appreciated by one of ordinary skill that examples of the foregoing modules may be virtual, and instructions said to be executed by a module may, in fact, be retrieved and executed by software.

Although various elements may be configured to perform some or all of the various operations described herein, fewer or more elements may be provided and still fall within the scope of various embodiments.

At step 502, the method 500 may include detecting an incident associated with a multi-floor structure. In some embodiments, the incident may include a terrorist attack, a shooting event, a bombing event, an earthquake, a flood, a fire, a hurricane, tornado, an accident, collapsing building, and other natural or man-made disasters. In some embodiments, the interactive emergency visualization system 200 receives information regarding the incident from one or more sensors, such as a smoke alarm, radiation detector, seismic alert system, other sensor systems shown in FIG. 2, etc. For example, a seismic sensor placed near a fault line may detect seismic activity and transmit a message to the system 200. As another example, a tsunami sensor positioned off shore may detect when water levels are lower or higher than a predetermined threshold for a specific amount of time, or both, and transmit a notification to the system 200. In other embodiments, the interactive emergency visualization system 200 is notified of the incident by an outside source, such as social media, news outlets, or law enforcement. For example, an incident report may be received by the system 200 from a user device 130 or first responder device 162 in communication with the system 200 via an app or otherwise. The location of the incident may be described with GPS coordinates, a street address, a street intersection, a landmark, or other information identifying a physical location. The size and nature of the incident may also be determined at this step.

In some embodiments where the incident is reported by a mobile device (such as user device 130 or first responder device 162), the device is configured to display a selectable incident report button. The incident report button may be any type of selectable area on the device, such as a button, icon, marker, or image. The incident report button may appear on a screen of the device when an incident is detected by the device. In other embodiments, the incident report button is activated by a user upon receiving word of an incident. The incident report button may be an alarm or panic button. Upon activation of the report button, the device may be configured to automatically send a notification to the interactive emergency visualization system 200. In some embodiments, the incident report button may include a phone call to an emergency response line (such as 9-1-1 or a police department) and/or a phone call directly to the interactive emergency visualization system 200. This phone call may help to verify the incident and provide emergency services to the user of the device.

At step 504, the method 500 may include activating or defining a two-dimensional or three-dimensional (3D) geo-fence around the incident with the interactive emergency visualization system 200. The geo-fence may be configured to represent areas with various risk levels. In some embodiments, the geo-fence is a high geometry geo-fence, meaning that the geo-fence is activated in close proximity to the incident. For example, a high geometry geo-fence may be activated around the perimeter of a building where an incident has been detected. In other embodiments, medium or low geometry geo-fences are used. For example, a medium geometry geo-fence may include a city block where an incident is detected. A low geometry geo-fence may be a 5 mile radius around an incident. Each of the high, medium, and low geometry geo-fences may have a different pattern or color. For example, high geometry geo-fences may be red, while medium geometry geo-fences are orange, and low geometry geo-fences are yellow. Other colors, as well as patterns or shapes may be used to represent various geo-fences.

More than one geo-fence may be activated or established at this step. For example, a small 3D geo-fence may be activated around a particular floor or set of floors of the structure where the incident is occurring. This geo-fence may represent an area with a high risk. Larger geo-fences may be activated around the perimeter of the structure and around the city block of the structure, representing areas of lesser risk. In some embodiments, 3D geo-fences are activated on each floor of the multi-floor structure, such that the geo-fences form a stacked formation. In other embodiments, a 3D geo-fence may be activated around the entire structure, around a multi-block area with the structure at the center, on a number of specific floors, etc. The 3D geo-fence may assist first responders in quickly assessing not only the geographical location of individuals within the building, but also which floor they are on. Examples of two-dimensional and three-dimensional geo-fences that may be activated or established in step 504 are illustrated in FIGS. 4A-4E and 6-8.

In some embodiments, one or more geo-fences may be pre-defined in the system 200 based on some static physical feature such as a building, university campus, harbor, etc. For example, the system 200 may assign a geo-fence to each floor of the multi-floor structure. The safety level of the pre-determined geo-fences may be updated according to the proximity and danger level of an incident. In other embodiments, geo-fences may be generated by the system 200 according to the magnitude and nature of the emergency. In particular, geo-fences may be defined in real-time in response to an incident. For example, geo-fences may be defined automatically (at least initially) based on the description, classification, and/or type of the incident. For example, a large fire in a commercial area may be recognized as an incident by the system 200. In this case, the system 200 may generate a geo-fence that includes a number of buildings and conforms to the shape and size of the fire. The formation of geo-fences is further explained in U.S. Pat. No. 9,247,408 and its continuation, U.S. Pat. No. 9,572,002, both of which are hereby incorporated in their entirety by reference.

At step 506, the method 500 may include using stored location data to determine which devices may be close to the incident and/or associated with the multi-floor structure. In that regard, a user device's last known location may be used to geographically associate the device with the multi-floor structure for the purposes of determining whether the user device may be near the incident. In some embodiments, the system 200 is configured to store location information about devices registered with the system 200 or otherwise associated with the system 200 (such as user devices 130 and first responder user devices 162 shown in FIG. 2). In some embodiments, the system 200 is configured to periodically receive location updates from the devices. These location updates may also be based on the locations of devices during previous incidents. In some embodiments, the stored locations are based on the locations of devices before the current incident was detected. The locations may be stored in the system 200 in a separate storage module such as a database 220. After an incident is detected, the system may reference the user devices stored locations (e.g., last known locations) to determine which of the devices may be located near the incident. In some embodiments, the system 200 compares the stored locations to the location of the incident and determines which devices may be within a certain distance of the incident. In other embodiments, the system 200 determines which devices are located within a certain distance from the geo-fence or the multi-floor structure. In some embodiments, the system 200 determines which devices were previously-known to be within a radius of 50 miles from the incident. In other embodiments, the system 200 determines which devices were previously-known to be within a radius of 50 miles from the geo-fence. In other embodiments, system 200 uses a radius of 100 miles, 25 miles, 10 miles, 1 mile, or other distances, as measured from the incident, geo-fence, or multi-floor structure.

Figure 16:
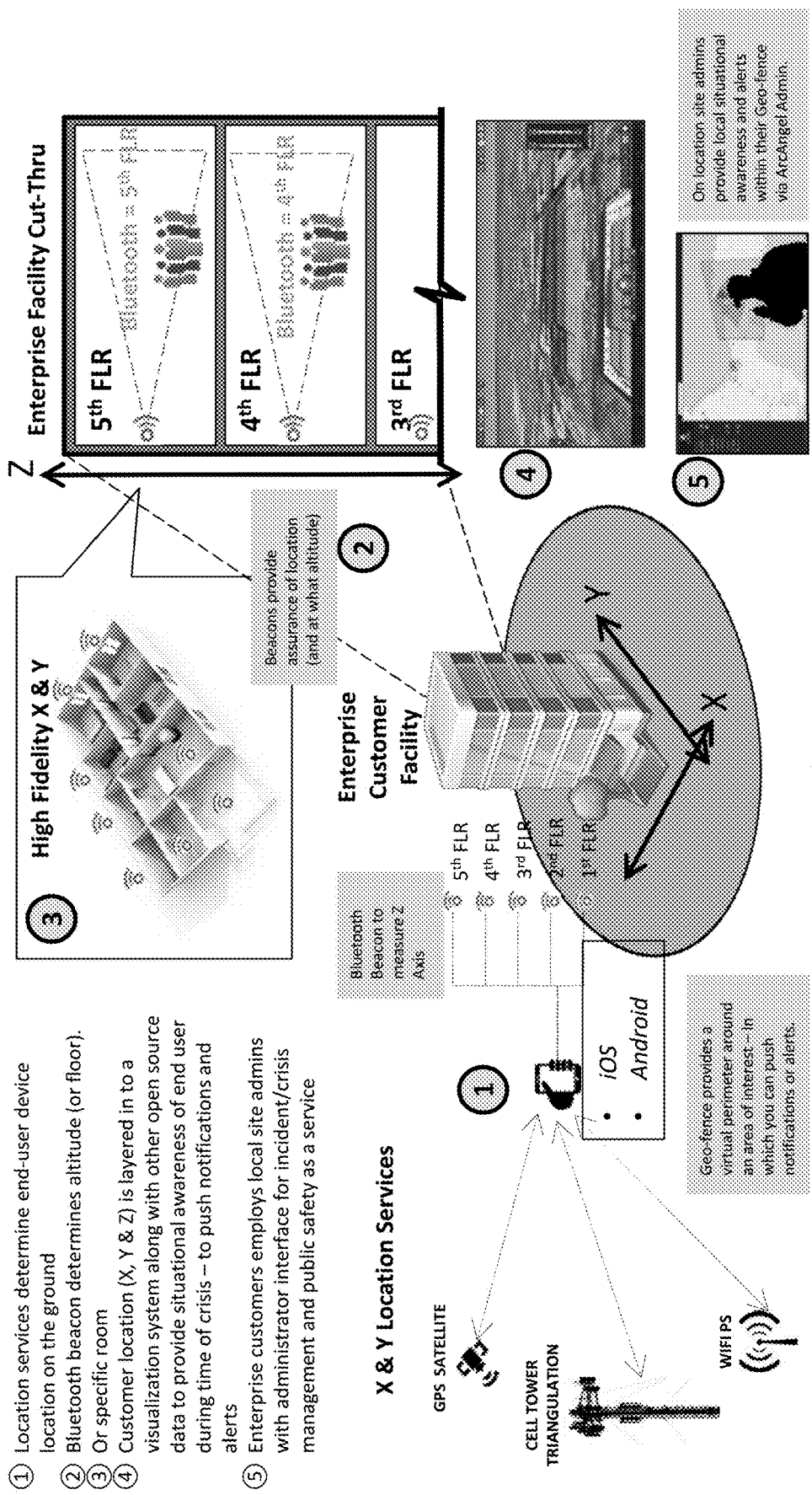
FIG. 16 illustrates location services and methods provided by the interactive emergency visualization system, in accordance with some exemplary embodiments.

At step 508, the method 500 may include sending a request for current location information to all user devices determined to have been previously close to the incident (i.e., the user devices with last known locations within a specific distance from the incident, as discussed above). In some embodiments, this includes the system 200 sending a "silent request" to all devices whose last known location is within the radius determined in step 506. In one embodiment, a silent request means that a user of the device is not aware of the request. In response to the request, the devices may determine their geographical location based on location services such as GPS, Wi-Fi, cellular triangular, etc. Additionally, in response to the request, the devices may scan for signals broadcast by nearby beacons associated with the system 200 (such as beacons 574, 576, 578, 580 discussed in reference to FIG. 3). For example, a device may detect one or more beacon signals that include a beacon identifier (comprising, for example, a Universally Unique Identifier (UUID), a major number, and a minor number) and information that allows the device or system to calculate proximity, such as reference broadcast power information. In some instances, when the user device receives the request for current location information, the device enables location services (if not already enabled) to gather geographical location data via, for example, GPS techniques, etc and enables short-range radios, such as a Bluetooth radio, (if not already enabled) to scan for nearby beacons. In other instances, the request triggers the phone to retrieve previously gathered geographical and beacon-based location data. FIG. 16 shows additional information related to location services.

At step 510, the method 500 may include receiving current location information from devices including geographical information (such as GPS location data) and beacon information in response to the request sent by the system 200. In some embodiments, the location information is received via a wireless communication system forming part of the system 200. At this point, the system 200 may determine both a specific current geographical location and beacon-based location for each device. For example, the system may utilize GPS location data to determine a latitude and longitude of the user device (a "horizontal" location) and may utilize the beacon-based location data to determine on which floor (or a particular location on a floor) of a building a user device is located (a "vertical" location). In one embodiment, the beacon-based information may include a beacon identifier comprising a Universally Unique Identifier (UUID), a major number, and a minor number associated with a multi-floor structure, a particular floor of the multi-floor structure, or even a particular location on the floor, such as a certain room. The system 200 may compare the received beacon identifier with a database of known beacon identifiers, where each beacon identifier is associated with the known location of a beacon. If the received beacon identifier matches a known beacon identifier, the system determines that the user device is physically near the known location of the beacon associated with the known beacon identifier. Further, in some embodiments, when a user device is near multiple beacons, the system may receive a plurality of beacon identifiers and associated proximity indication information from the user device. In such an embodiment, the system may utilize the proximity indication information to determine the beacon to which the user device is physically nearest. In other embodiments, the system may utilize the proximity indication information to more accurately pinpoint the location of a user device at a position between multiple beacons. These locations may be stored within the system 200 and updated periodically.

At step 512, the method 500 may include determining which devices are within the active geo-fence. In some embodiments, the system 200 compares the current locations of the devices received in step 510 with the boundaries of the geo-fence activated in step 504 to determine which devices are within the geo-fence. This comparison may include utilizing both the geographical location information and the beacon-based location information. For example, if the geo-fence encompasses a two-dimensional geographical area, for example, a city block or a defined geometric shape surrounding an incident, the system may utilize the geographical location information to determine if the user device is within the geo-fence. In another example, if the geo-fence encompasses a three-dimensional area such as a multi-floor structure or a portion of a multi-floor structure, then the system may utilize the geographical location information in combination with the beacon-based location information or just the beacon-based location information to determine if the user device is within the geo-fence At step, 514, the method 500 may include transmitting notifications to user devices determined to be within the active geo-fence in order to notify the individuals associated with the user devices of the incident. In some embodiments, the device is notified via a prompt, a text message, an alarm, a sound, emergency action plans, data from emergency and law enforcement agencies, or other notifications. Notifications sent by the system 200 to the devices may be push messages, for example, messages received by the devices without the device requesting them. In one embodiment, the app instance 584 on a user device 120 (FIG. 3) receives the notification from the system 200 and displays information about the incident to alert the individual of the incident. As part of this, the app instance 584 may present a user interface with selectable areas with which the user of the device may interact to receive more information about the incident or transmit information about the incident to the system 200. Depending on the nature of the emergency, notification may additionally be provided concurrently to state emergency agencies or authorities, federal emergency agencies or authorities (e.g., FEMA, the FBI, military police, etc.), or both. In some embodiments, the system 200 sends devices within the geo-fence status updates on the incident. For example, if a shooter is detected within a building, the system 200 may send notifications to all devices in the building if the shooter has moved. The system 200 may send notifications to the devices whenever a status of the incident changes. In some embodiments, a user of the system 200 with administrator rights (for example, as determined by login credentials) may send out emergency notifications directly from an app running on a smart phone, tablet computer, laptop, or other mobile device. In some embodiments, the notification may depend on the nature of the incident. For example, the system 200 may send a notification causing the user device to emit a loud warning sound during and after an earthquake to aid in search and rescue efforts. During a terrorist event, on the other hand, the notification may not direct the user device to emit any audio warnings in an effort to protect the user (unless, for example, a visually-impaired user has set an override that requires audio).

At step 515, the method 500 includes receiving safety status information from at least some of the user devices notified of the incident in step 514. The safety status information corresponds to the current level of danger perceived by the individual associated with the user device. In one embodiment, the app instance 584 prompts the individual to input his or her current safety status via a user interface displayed on the user device. For example, the individual may be prompted to select from options such as "I'm in danger," "I need help," or "I'm OK." and the like. The collection of individual safety status information via user devices is further explained in U.S. Pat. No. 9,247,408 and its continuation, U.S. Pat. No. 9,572,002, both of which are hereby incorporated in their entirety by reference.

At step 516, the method 500 may include generating a 3D interactive visualization of the locations of user devices in relation to the incident and in relation to structures, landmarks, and the like. The visualization may include any of the visualizations 300, 400, 460, 470, 600, 700 of FIGS. 4A-4D and 6-8 or a combination of elements contained in the visualizations. For example, in step 516, the system may generate and display a visualization that graphically depicts a multi-story structure, a floor plan of one or more floors of the structure, geo-fences surrounding and including the structure, the floors of the structure, the location of the incident, the location of user devices, and safety status information about individuals associated with the user devices. The visualization may be generated on any display device including computer screens, monitors, device screens, etc. The visualization may include various depictions of the devices, including individual markers 306 that show the location and safety status of individuals and first responders. In particular, the visualization may show the location of individuals and first responders within the multi-floor structure. In some embodiments, the location of individuals may be represented by the location of their devices. The location and status of geo-fences (such as geo-fences 702, 704, 706, 708 shown in FIG. 4A) may be displayed on the visualization. In particular, the visualization may allow a user to select one or more floors of a multi-floor structure and view each selected floor in a 2D window. This feature is shown in reference to FIG. 7. The visualization may allow a user to select and view other types of information in separate windows, such as personal information of individuals, clusters of individuals, media associated with the incident (such as photos or video), safety status information, and other types of information.

The visualization may also include the safety status of individuals. This safety status may include one of several safety status levels, such as "in danger", "at risk", "unknown", and "safe." The safety status of the individuals may be determined by feedback from the individuals themselves, as well as their proximity to the incident. The locations and safety status of each individual may be updated on the display as time passes and the conditions of the incident change. The display may include a user interface which may display all or part of the information gathered by the system.

In some embodiments, individuals are clustered in various ways within the visualization, as shown in FIGS. 4A and 4D. This clustering may be based on beacons within the multi-floor structure, may be based on the status of individuals, or may be based on other factors. Individuals that are not located near a beacon may be represented individually on the visualization or clustered in non-beacon clusters. The visualization may include selectable regions where a user may access additional information about individuals. The display may also allow a user to communicate with individuals and first responders represented in the display.

At step 518, the method 500 may include receiving information regarding the incident from multiple sources. For example, the system 200 may receive information about the incident from any of the sensor systems shown in FIG. 2, including smoke alarms 262, gunfire detection systems 264, anti-drone systems 266, CCTV cameras 268, traffic cameras 270, radiation detectors 272, seismic alert system 274, pollution sensors 276, etc. The system 200 may also receive information from outside sources, such as social media, news feeds, first responders, etc. The system 200 may also receive information from the devices regarding the incident. This information may include responses to requests and user-initiated responses. In some embodiments, an app instance running on the devices may allow individuals to send photos, video, and/or commentary on the incident to the system 200. For example, an individual may send a photo of a shooter in a shooting event, information on suspicious activity noticed by the individual, and so forth. Feedback from individuals may be actively solicited by the system 200, such as sending "Are You Safe?" messages. This information may be analyzed by the system 200 and used to update the visualization, alert first responders, send notifications to devices, and to perform other functions. Additional details about the collection of data by the system 200 are shown in reference to FIG. 17.

At step 520, the method 500 may include receiving location updates from the devices within the active geo-fence. These location updates may be requested by the system 200 similarly to step 508. The location updates may be requested and received by the system 200 periodically, or with varying frequency. In other embodiments, the user devices transmit location updates automatically without further prompting once they receive a notification of an incident. In some embodiments, the frequency at which the location updates are received may vary depending on how close the device is to the incident. For example, the system 200 may receive location updates every minute for a device that is located within the multi-floor structure where the incident is occurring, while the system 200 may receive location update every 15 minutes for a device located a mile from the incident. The frequency may also be varied based on the safety status of an individual corresponding to the device, the remaining battery life of the device, and other factors. The variation in frequency may minimize the information received by the system and avoid oversaturating communication lines.

At step 522, the method 500 may include updating the 3D interactive visualization. In some embodiments, the visualization is updated with location information from the devices, information regarding the incident received from the devices, safety status information for individuals, information received from sensor systems, first responder reports, information from the Internet including social media information, news feeds, official reports on the incident, status updates on the incident, and information from other sources.

At step 524, the method 500 may include determining if the incident is over. In some embodiments, the incident is considered to be over when first responders send a notification to that effect to the system 200. In other embodiments, the system 200 determines that the incident is over when the various sensors systems stop detecting the conditions of an incident. If the system 200 determines that the incident is not over, it continues to receive information from multiple sources in step 518 including safety status information from user devices. If the system 200 determines that the incident is over, the system 200 may notify the devices that the incident is over in step 526. This step 526 may include the system 200 sending an "all clear" notification to the devices. After step 526, the method 500 may repeat, such as when the system 200 detects another incident in step 502.

Figure 5B:
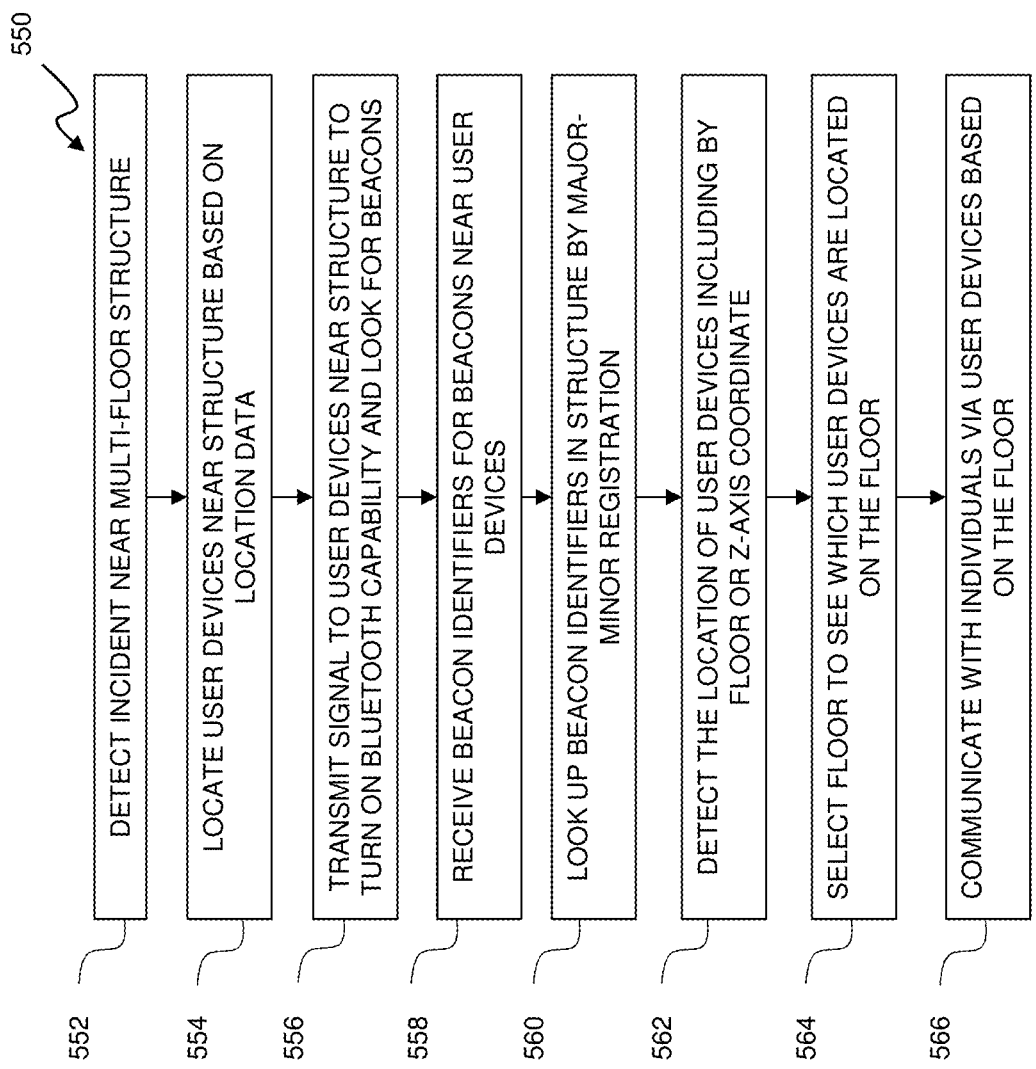
FIG. 5B is a flow chart illustrating a method of generating a three-dimensional visualization of user devices using beacons, in accordance with some exemplary embodiments.

FIG. 5B is a flow chart illustrating a method 550 of generating a three-dimensional visualization of user devices using Bluetooth beacons, in accordance with some exemplary embodiments. The method 550 may be carried out by the interactive emergency visualization system 200 according to various embodiments.

At step 552, the method 550 may include detecting an incident near or in a multi-floor structure. In some embodiments, the structure is a building like those shown in FIGS. 4A-4E.

At step 554, the method 550 may include locating user devices near the structure (or within, or affixed to) based on location data as described above. Location data may include GPS or wireless communication signals.

At step 556, the method 550 may include transmitting signals to the user devices near the structure to scan for signals broadcast by beacons, such as Low Energy Bluetooth beacons. In one embodiment, the user devices are instructed to turn on their respective Bluetooth radios in order to detect the signals from Bluetooth beacons. In other embodiments, the beacons may broadcast signals using other short-range radio technology.

At step 558, the method 550 may include receiving, from the user devices, beacon identifiers broadcast by the beacons near the user devices. These identifiers may include any of a Universally Unique Identifier (UUID), a major number, and a minor number.

At step 560, the method 550 may include looking up beacon identifiers of the beacons detected to be within the structure by major-minor registration. In some embodiments, the particular registration of each beacon is tied to tiered geo-fences which are tied to the processing capability of the system 200. In some embodiments, the beacons are coded according to varying degrees of granularity. During an incident, the beacon allows communication with the individual through the user device, which may be tied to the geo-fence. This may allow the user device to communicate a registered beacon identification signal to the system 200 and provide for real time temporal data.

At step 562, the method 550 may include detecting the location of user devices, including by floor or z-axis coordinate. It should be understood that the x- and y-coordinates may also be used for horizontal location detection as well.

At step 564, the method 550 may include selecting a floor to see which user devices are located on the floor. In this way, visualizations of the system may be able to track users easily, including in a three-dimensional manner.

At step 566, the method 550 may include communicating with individuals via user devices based on the floor. In this way, the visualization may alert individuals to an incident and gather feedback. In some embodiments, each user device may activate multimodal communications during an incident. This may allow immediate registration of the user device on the floor on which is located, further helping to track users in a three-dimensional manner.

Figure 5C:
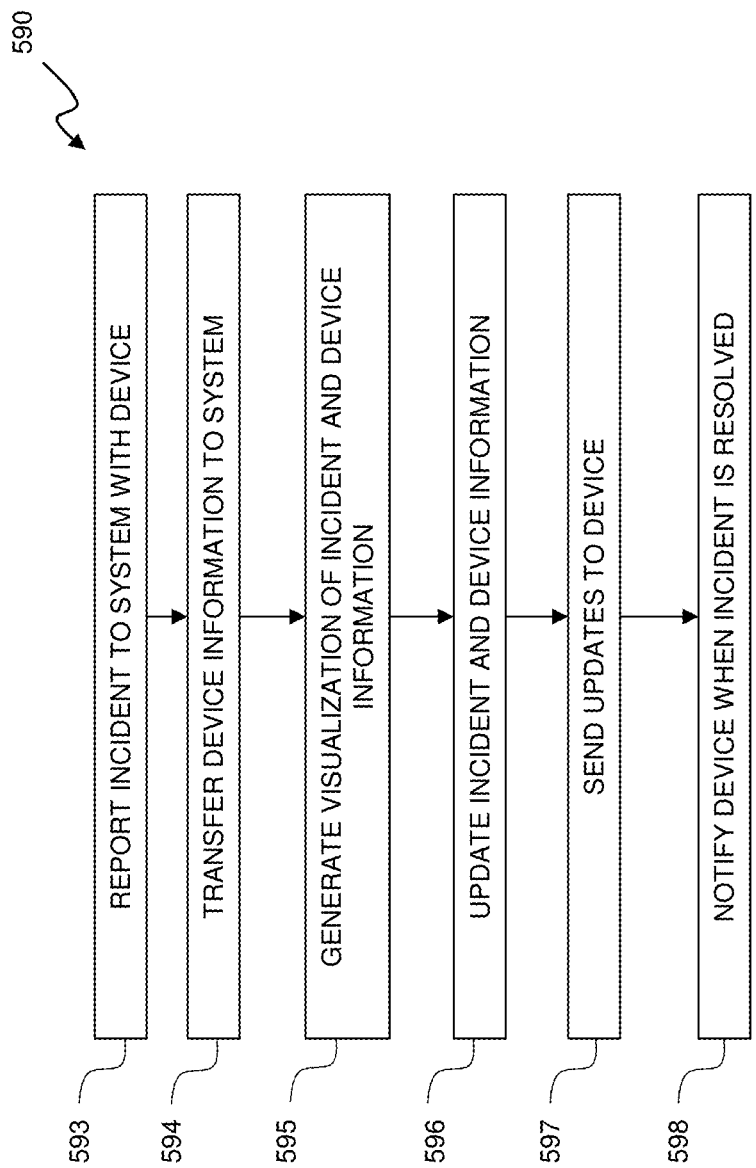
FIG. 5C is a flow chart illustrating a method of using a device to report an incident to an interactive emergency visualization system and generate a visualization of an incident, in accordance with some exemplary embodiments.

FIG. 5C is a flow chart illustrating a method 590 of using a device to report an incident to an interactive emergency visualization system 200 and generate a visualization of an incident. The method 550 may be carried out by one or more devices 130 and the interactive emergency visualization system 200 as shown in FIGS. 1A, 1B, 2, and 3, according to various embodiments.

At step 593, the method 590 may include reporting an incident to the interactive emergency visualization system 200 with a device such as user device 130. In some embodiments, the user device 130 is configured to display a selectable incident report button. The incident report button may be any type of selectable area on the device, such as a button, icon, marker, or image. The incident report button may appear on a screen of the device when an incident is detected by the device. In other embodiments, the incident report button is activated by a user upon receiving word of an incident. The incident report button may be an alarm or panic button. Upon activation of the report button, the device may be configured to automatically send a notification to the interactive emergency visualization system. In some embodiments, the incident report button may include a phone call to an emergency response line (such as 9-1-1 or a police department) and/or a phone call directly to the interactive emergency visualization system 200. This phone call may help to verify the incident and provide emergency services to the user of the device.

At step 594, the method 590 may include transferring device information from the device to the interactive emergency visualization system 200. In some embodiments, the device information may include a location and safety status of the device. The location information may include information from location services as well as data from nearby beacons, as discussed in step 510 of method 500. In some embodiments, safety status information for the device may be based on feedback from the device. For example, an individual may select a button on an app running on the device to report that he or she is "in danger" or "safe." If no information is received from the device, the system may record the safety status of the device as "unknown." In other embodiments, the safety status of the individual associated with the device is based on the received location information from the device in relation to the incident. For example, if the device is located on a floor of a multi-floor structure where the incident is occurring, the system 200 may determine that the individual associated with the device is "in danger."

At step 595, the method 590 may include generating a visualization of the incident and device information. In some embodiments, geo-fences in the visualization may be selected and activated by certain users (such as security guards). These geo-fences may be selected using an app on the device, and may require certain credentials. The visualization may include the location of the incident, relative location of the device, one or more geo-fences, the safety status of the device user, and the safety status and location of other individuals near the device.

At step 596, the method 590 may include updating incident and device information. This step may involve updating the visualization as more information about the incident is received by the interactive emergency visualization system. The location and safety status of the device and individual associated with the device may also be updated.

At step 597, the method 590 may include sending updates to the device with the interactive emergency visualization system. These updates may include changing information about the incident, queries about the status of the user of the device, suggestions to the user, etc. The frequency of the updates sent to the device may vary according to distance from the device to the incident. For example, a device that is very close to the incident may receive constant updates whereas a device that is far from the incident may receive updates at longer intervals. Information may be sent from the device to the system at this step, such as location information, messages, and/or media (such as still photos, video, etc.). This information may be visualized by the system in selectable areas.

At step 598, the method 590 may include notifying a device when the incident is resolved. At this step, the device may stop sending location information to the system.

Figure 6:
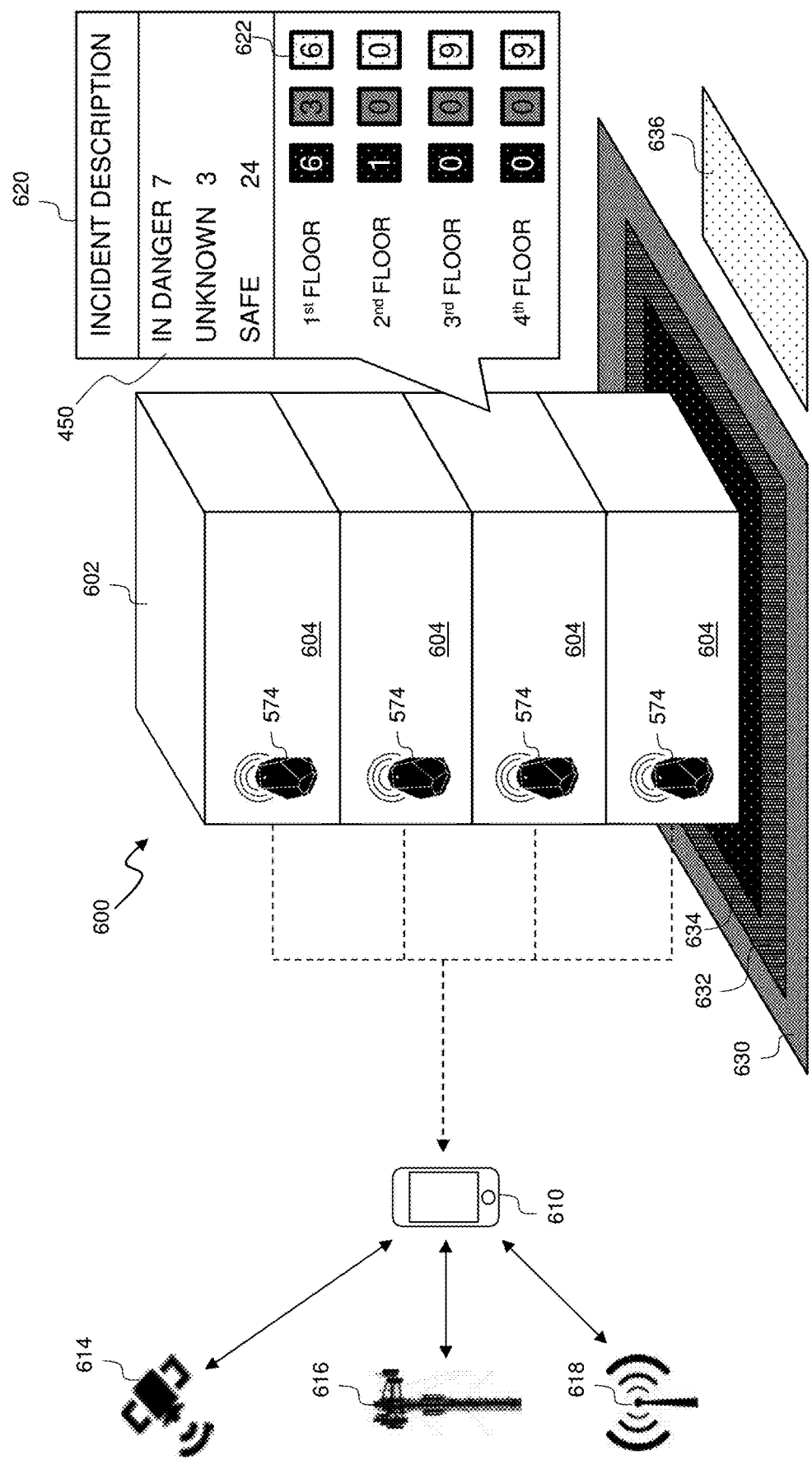
FIG. 6 illustrates an exemplary visualization of an aspect of the interactive emergency visualization, in accordance with some exemplary embodiments.

FIG. 6 illustrates another embodiment of a three-dimensional visualization 600 including a building 602 that is being monitored by the system 200. In some embodiments, the visualization 600 is generated by the interactive emergency visualization system 200. The building 602 may include a number of floors 604 which may be individually monitored. In some embodiments, the building 602 may be the building 422 as shown in FIG. 4A. In some embodiments, each floor of the building 602 may include an individual geo-fence. In other embodiments, more than one geo-fence may be included on each floor. This example is further shown in reference to FIG. 7. The safety status list 450 of individuals within each floor (or floor-based geo-fence) may be generated by the system 200 and displayed in an incident description 620.

In the example of FIG. 6, the first floor geo-fence includes six individuals in danger, three individual whose status is unknown, and six individuals that are safe.

In some embodiments, in order to determine which individuals are located on each floor, one or more beacons 574 may be deployed on each floor. In that regard, the user devices 610 detect their proximity to a beacon on a specific floor and report the beacon detection to the system 200. The system 200 includes a database of beacon locations and, thus, may determine the floor-based location of the user devices 610 based on the location of the detected beacons. Examples of beacons are radio frequency (RF) beacons, Bluetooth Low Energy (BLE) beacons (also known as Bluetooth Smart beacons), Wi-Fi beacons, infrared beacons, Near Field Communication (NFC) beacons, and radio frequency identifier (RFID) tags, and any one, two, or combination of additional types of beacons may be used separately or in a single beacon device to help ensure continuity of signals to and from the beacon. The beacons may communicate with a user device to enable determination of the location of individuals within the geo-fences. In addition to the beacons, user device 610 may utilize data associated with GPS satellites 614, cell tower triangulation 616, and/or WiFi signal origination 618 to determine location.

The visualization 600 may also include one or more one or more proximity zones 630, 632, 634 that represent physical areas of different distances from the location of the incident. These proximity zones 630, 632, 634 may be color-coded in the visualization to represent various danger levels. For example, the dark patterned (or red) proximity zone 634 may represent a dangerous area, the medium-dark patterned (or orange) proximity zone 632 may represent an area at risk, and the medium patterned (or yellow) proximity zone 630 may represent an area with an unknown status. The proximity zones may be updated over time with information about the nature and size of the incident. In the case of a circular geo-fence, the proximity zones may be defined by concentric circles of varying radii extending from the location of the emergency. The visualization 600 may also include a safe zone 636 which may be used as a gathering place for individuals.

Figure 7:
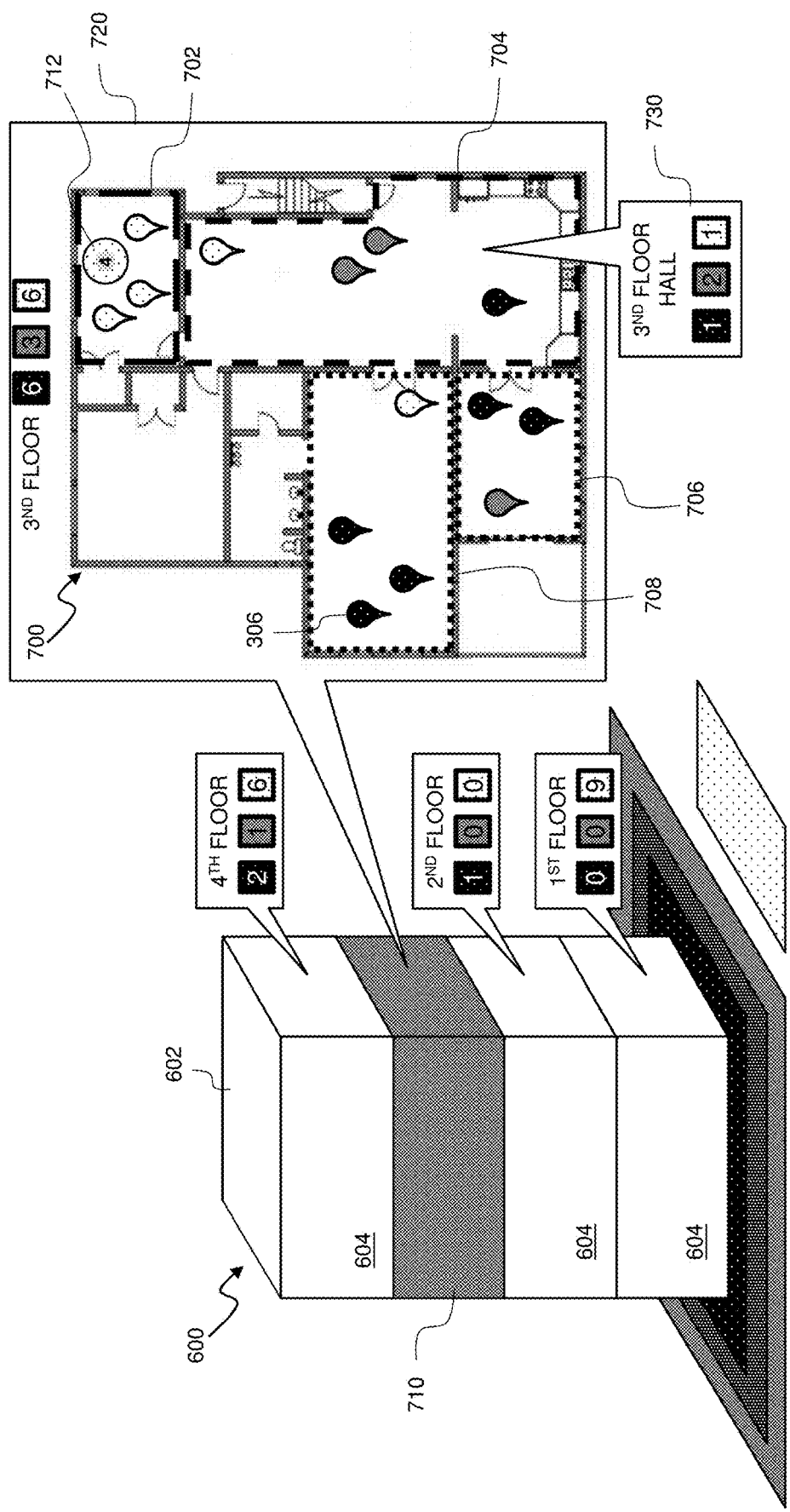
FIG. 7 illustrates an exemplary interactive emergency visualization with an expanded portion, in accordance with some exemplary embodiments.

FIG. 7 shows an exemplary view of three-dimensional visualization 600 with an expanded view 720. The expanded view 720 may allow an operator to view the geo-fences on each floor 604 individually. In some embodiments, the expanded view 720 is displayed when the operator clicks on a specific floor 604 of the building 602. The floor being expanded may be shaded 710 for reference. In the example of FIG. 7, the expanded view 720 includes a two-dimensional floor plan 700 of the third floor of the building 602. However, the visualization 600 may include other environments with multiple geo-fences, such as construction sites, natural formations, city blocks, parks, stadiums, etc. Each floor of the visualization 600 may include one or more geo-fences. In particular, the third floor includes four geo-fences 702, 704, 706, and 708, each with various dotted patterns indicating the safety level of the particular geo-fence. In particular, the smaller dotted patterns may represent higher areas of risk. In some embodiments, the geo-fences 702, 704, 706, 708 are superimposed over the floor plan to give the operator an easily understandable view of the floor. The expanded view 720 may also include individual markers 306 that show the location and safety status of individuals within the geo-fences 702, 704, 706, 708. In some embodiments, the visualization 600 may include cluster markers 712 representing clusters or groups of individuals. For example, the geo-fence 702 may represent a safe room on the floor 604. Four individuals with the same safety status may be clustered together and represented by the cluster marker 712. In some embodiments, the cluster marker 712 may represent a common safety status for all individuals in the group. In other embodiments, the safety status of the cluster marker 712 may represent the safety status of the majority of individuals in the cluster or the highest safety status level on individual in the cluster. As shown in more detail in FIG. 4A, the cluster markers 351, 353 may also show the safety status of all individuals in the cluster proportionally. The grouping or clustering of individuals may allow for simplification of visualizations with many individuals while still representing their locations and statuses.

The operator may be able to click on the various geo-fences to view a geo-fence status window. For example, a user may click on geo-fence 704 and the geo-fence status window 730 may be displayed, which may include a name for the geo-fence 704, the number of individuals located within the geo-fence 704, and the safety statuses of each individual. In the example of FIG. 7, the geo-fence status window 730 shows the third floor hall, which includes four individuals with various safety statuses.

Figure 8:
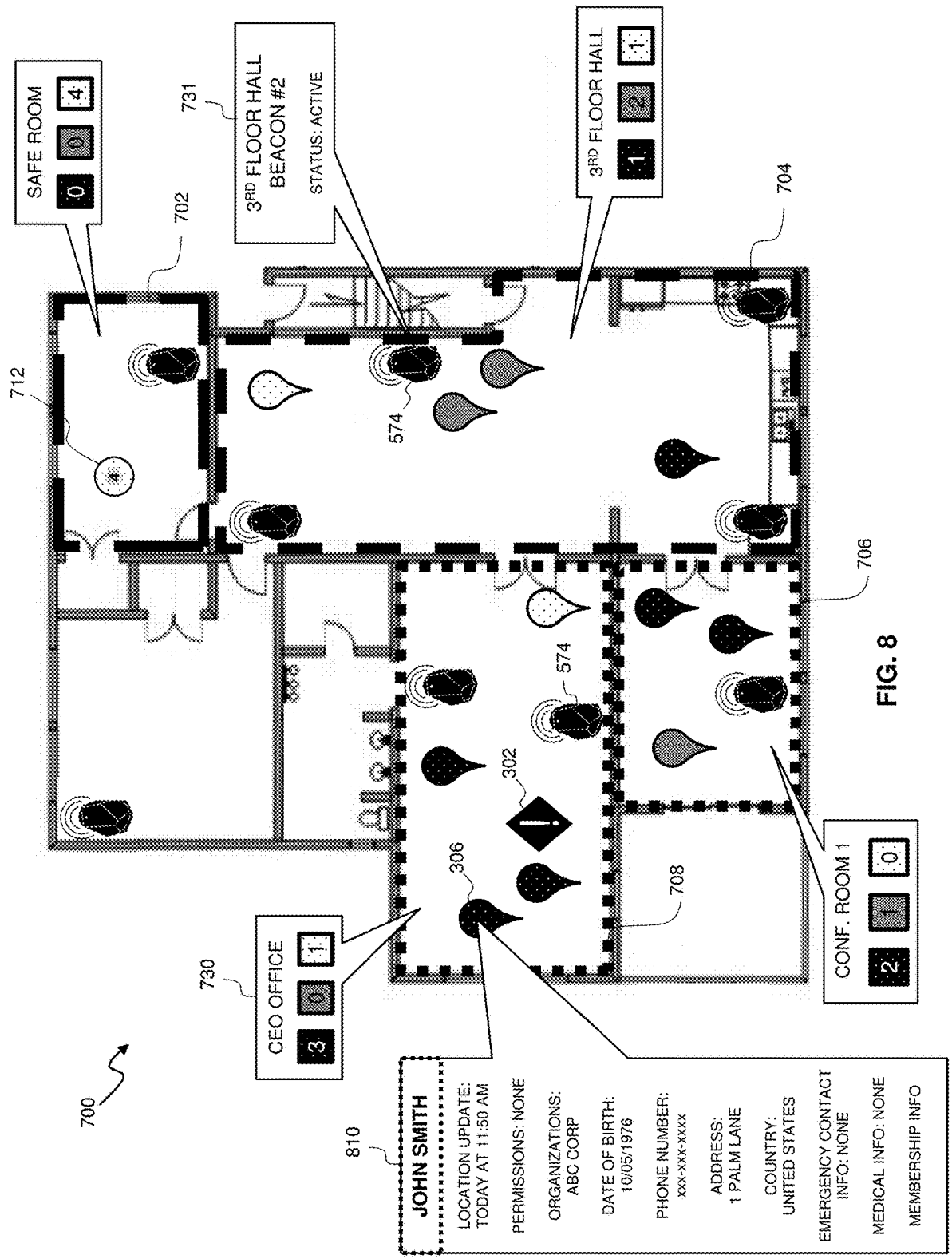
FIG. 8 illustrates an exemplary interactive emergency visualization with several geo-fences, in accordance with some exemplary embodiments.

FIG. 8 shows an expanded view of the floor plan 700. In some embodiments, the operator is able to open the expanded view of the two-dimensional floor plan 700 by clicking on the floor plan 700 in the expanded view 720. In the example of FIG. 8, geo-fence status windows 730 are visible for each geo-fence 702, 704, 706, 708. In some embodiments, the individual markers 306 are also expandable. For example, the operator may click on the individual marker 306 in the "CEO Office" geo-fence to open an individual window 810 which may include biographical data of the individual, including: location update information; permissions; organizations that he or she belongs to; date of birth; contact information such as phone numbers, email addresses, and addresses; emergency contact information; medical information; and membership information. Other biographical details may be included in the individual window 810. The individual window 810 may allow the operator to quickly check biographical information about various individuals, which may help to protect vulnerable individuals and mitigate threats during an emergency. In some embodiments, the window 810 may include a mechanism for the administrator to directly contact the individual, for example, via a text message, push alert, phone call, etc. The floor plan 700 may also include an incident marker 302 to indicate the location of an incident. In some embodiments, the floor plan 700 also includes one or more beacons 574. The beacons 574 may be selected by the operator to open a beacon window 731. The beacon window 731 may give detailed information about each beacon 574, including location, status, recent activity, and other information.

In some embodiments, the proximity of a user device 130 to the incident may increase the speed of communication between various components. In some embodiments, a user device 130 that is closer to the incident than another device may communicate with a beacon 574 with increased data transmission speed. In some embodiments, a closer user device 130 may communicate more frequently with a beacon 574 than user devices 130 that are further away. The system 200 may also prioritize data transmissions to and from user devices 130 and beacons 574 that are located closer to an incident.

In some embodiment, the data transfer of various user devices is prioritized according to safety status level. For example, the system 200 may communicate to and from user devices in danger at the highest data transfer rate and frequency for accuracy and better visualization. This may allow the system 200 to triage the information and/or may provide critical information faster for users in greater danger or potential danger.

Figure 9:
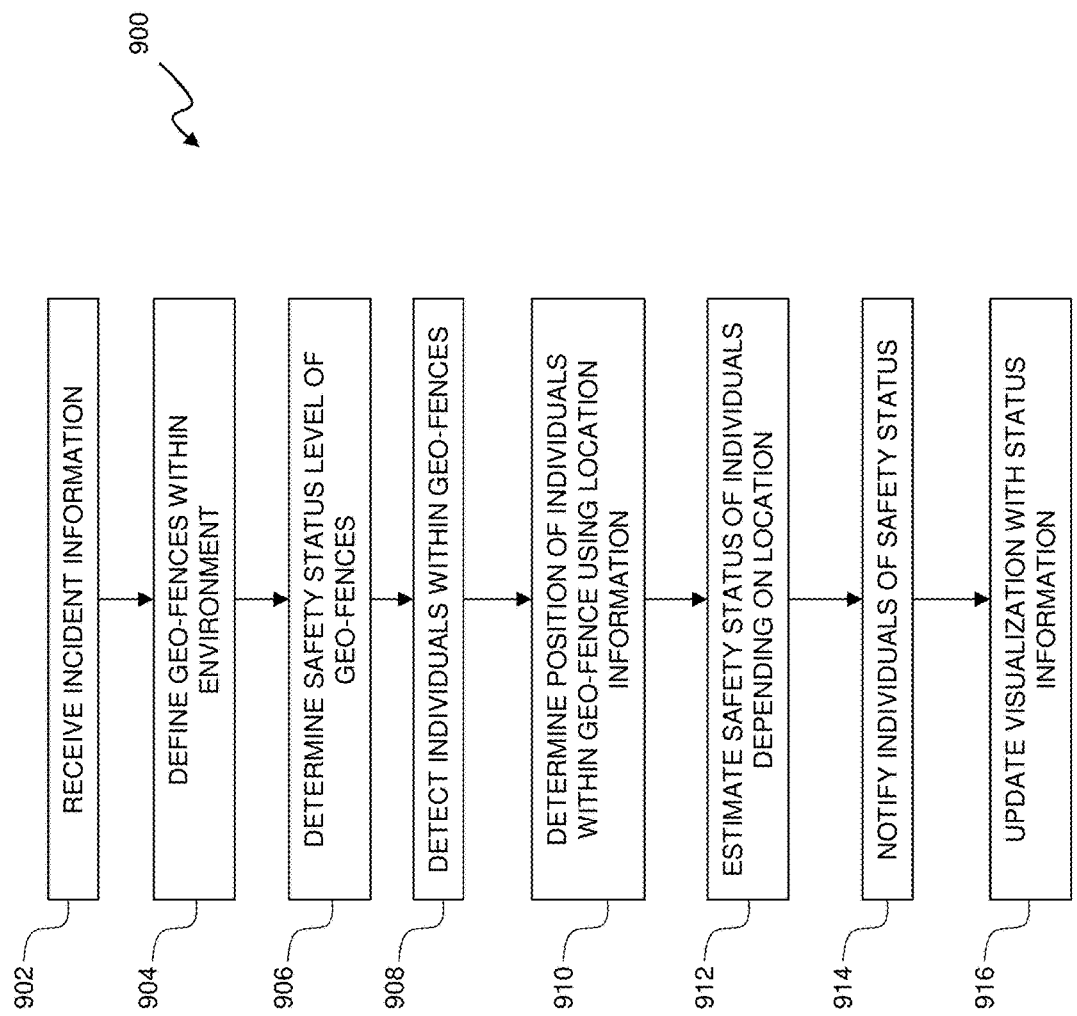
FIG. 9 is a flow chart illustrating a method of tracking individuals within geo-fences, in accordance with some exemplary embodiments.

FIG. 9 is a flow chart illustrating a method 900 for defining geo-fences within an environment and detecting individuals within the geo-fences, in accordance with exemplary embodiments. The method 900 may be carried out by the interactive emergency visualization system 200 and may include the creation of one or more visualizations to assist emergency management professionals, law enforcement, and individuals near an incident.

At step 902, the method 900 may include receiving incident information about an incident. This information may come from a number of sensors such as those discussed in relation to FIG. 2.

At step 904, the method 900 may include defining geo-fences with an environment. In some embodiments, the environment includes natural or man-made features and may include building layouts or floor plans. In particular, geo-fences may be defined on a per-room basis within a building. These geo-fences may be pre-defined based on a known floor plan, or they may be generated dynamically after the detection of an incident or emergency. In this case, each room of a building may be monitored individually by the system 200.

At step 906, the method may include determining safety status levels for each of the geo-fences. The safety status levels may be determined based on proximity to and nature of an incident. Additionally, the safety status levels for each geo-fence may be determined by the status of individuals within the geo-fence. For example, a geo-fence may be defined around a hallway in a building. An incident may occur in the hallway, such as a fire near one of the exits. As the system 200 receives updates from the individuals calling for help, the system 200 may determine that may of the individuals are in danger. Accordingly, the geo-fence around the hallway may be assigned a safety status level of "in danger."

At step 908, the method 900 may include detecting individuals within the geo-fences. This step may include tracking the location of individuals as they cross over the edges of the various geo-fences. For example, the system 200 may track the number of individuals entering and exiting the lobby of the building and maintain a tally of the number of individuals inside during a time period.

At step 910, the method 900 may include determining the position of individuals within the geo-fences using location information. In some embodiments, this location information is gathered from beacons located around each geo-fence. For example, the location of an individual in a room may be determined by measuring the distances between the individual and various beacons, and then determining the location of in the individual by triangulation. In other embodiments, the location of individuals within the geo-fences may be determined by other systems, such as WiFi triangulation or Bluetooth signal triangulation.

At step 912, the method 900 may include estimating the safety status of individuals depending on the location of each individual. This step may include estimating the distance of each individual from an incident, as well as determining the size and nature of the incident. In some cases, biographical information may also be used in this calculation. For example, although a young child may be located a distance from a danger area around an incident such as a fire, the system 200 may assign the child a status of "in danger" due to the age of the child and the risk of harm. Similarly, individuals with health problems may be assigned more serious safety statuses than other individuals located at the same distance away from an incident. Individuals may be distinguished by other criteria, including job positions, skill sets, medical knowledge, etc. In some cases, individuals with a certain criteria may be represented differently than other individuals in a visualization. For example, all doctors may appear with a blue color, in the event a doctor on-site may be routed to help another user or first responders in need of medical assistance. In some embodiments, multiple individuals may be connected to or associated with a single user device. For example, a user device may be assigned to a child as well as his or her parent. When an incident is detected, both the parent and child may be notified.

At step 914, the method 900 may include notifying the individuals of their safety status. This notification may be communicated on a mobile device, such as on a view screen. Additionally, the notification may be communicated to individuals on over an intercom, computer screens, advertisement screens, or other methods.

At step 916, the method 900 may include updating visualizations with the status information. These visualizations may include overall visualizations of the incident and surrounding environments, as well as visualizations sent to the individuals affected by the incident. For example, an individual may be inside a building during a fire. The individual may be sent a notification and a visualization showing that the individual is in danger. As the individual leaves the building, his or her visualization may be updated to show that he or she is not in danger after leaving the premises.

Figure 10:
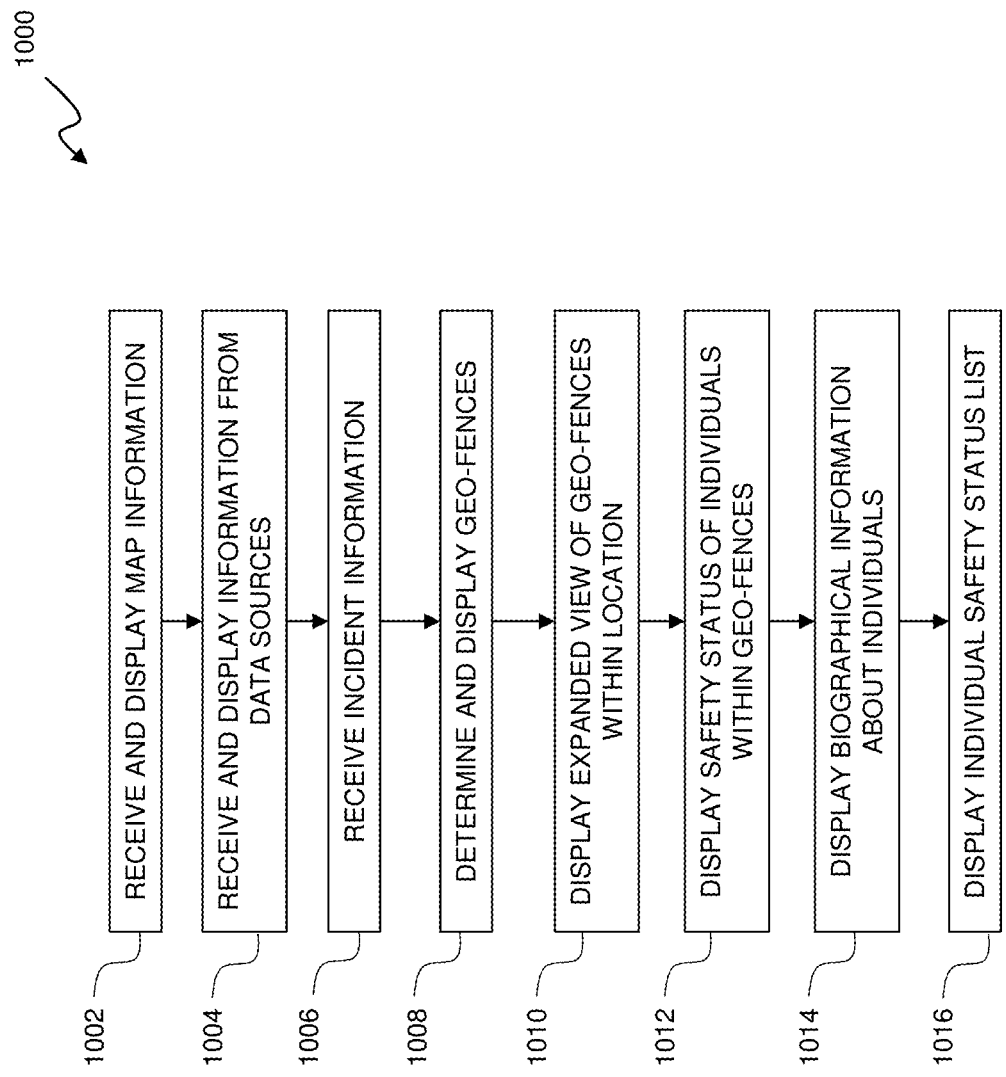
FIG. 10 is a flow chart illustrating a method of displaying various aspects of an interactive emergency visualization, in accordance with some exemplary embodiments.

FIG. 10 is a flow chart illustrating a method 1000 for viewing aspects of an incident visualization, in accordance with exemplary embodiments. The method 1000 may be carried out by the interactive emergency visualization system 200. In some embodiments, the incident visualization may include various levels of detail which may be accessed by an operator.

At step 1002, the method 1000 may include receiving and displaying map information. In some embodiments, the map information may be used as a basis for the visualization. In particular, satellite photographs or map programs such as Google Earth may be used as a base level of the visualization. In some embodiments, other layers are added to the visualization, which may be viewed together or individually by the operator. The visualization may include any of the visualizations 300, 400, 460, 470, 600, 700 of FIGS. 4A-4D and 6-8 or a combination of elements contained in the visualizations At step 1004, the method 1000 may include receiving and displaying information from data sources. These data sources may include floor plans, building diagrams, sensor feeds (such as the sensors shown in FIG. 2), etc. The data sources may provide updated information which may appear in the visualization. Step 1004 may also include displaying a visualization having a three-dimensional depiction of a multi-floor building, where each floor is independently selectable by a user.

At step 1006, the method 1000 may include receiving incident information. In some embodiments, the incident information may include a time and a location of the incident or emergency. This information may be displayed on the visualization in the form of a symbol or marker such as the incident marker 302 shown in FIG. 4A. The incident symbol or marker may be expanded by the operator, such as by clicking it, to display more detailed information about the incident.

At step 1008, the method 1000 may include determining and displaying geo-fences. These geo-fences may be determined according to their proximity to the incident or around important features such as buildings or parks. In some embodiments, geo-fences may be grouped in the visualization, such as shown in FIG. 7 where one or more geo-fences are included on each floor of a building. In some embodiments, geo-fences may be assigned based on three-dimensional coordinates. For example, geo-fences may be defined one on top of another within a multi-story building. In some embodiments, geo-fences may overlap. Geo-fences may be displayed individually or in groups, and may be selected by an operator to view more detailed information. The detailed information for a single geo-fence may be displayed in a separate window, for example.

At step 1010, the method 1000 may include displaying an expanded view of geo-fences within a certain location. This step may involve the operator selecting a building or other feature on the visualization and zooming into to see more details about it. The geo-fences within the building or other feature may be displayed overlaid on a two-dimensional floor plan. The expanded view may include symbols representing individuals within the geo-fences, such as the individual markers 306 shown in FIG. 4A. The safety status levels of the geo-fences may be seen at this step. In another example, geo-fences may be defined in different sections of a building. The operator may zoom into a certain area of the building to see the geo-fences and their respective safety status levels.

At step 1012, the method 1000 may include displaying the safety status of individuals within the geo-fences. In some embodiments, the safety status of the individuals is displayed as a pattern, color, shape, or texture on individual symbols. In other embodiments, the safety status of individuals is displayed textually or by one or more symbols.

At step 1014, the method 1000 may include displaying biographical information about individuals. This information may be accessed by the operator clicking the individual marker which may automatically display a window (such as window 810 in FIG. 8) with detailed information about the individual. In some embodiments, the window may include Internet links or other interactive aspects which allow the operator to quickly send and receive communications from the individual.

At step 1016, the method 1000 may include displaying an individual safety status list. In some embodiments, this list is similar to the safety status lists 450 of FIGS. 4A-4D and may be generated individually for each geo-fence. In other embodiments, safety status lists may include individuals from multiple geo-fences, an entire building, an entire city block, or the entire visualization, for example. The safety status list may include symbols, patterns, or colors that quickly convey the status of each individual to the operator.

Figure 11A:
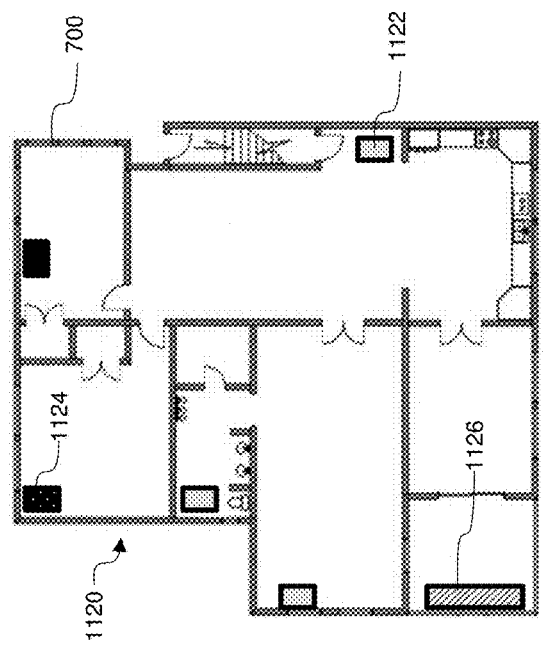
FIG. 11A illustrates an exemplary layer of an interactive emergency visualization, in accordance with some exemplary embodiments.

FIGS. 11A-11D show exemplary layers that may be added to a visualization, such as the expanded view 720 shown in FIG. 7. The layers may be generated by the interactive emergency visualization system 200. In some embodiments, the layers may be individually selected and viewed by an operator. FIG. 11A shows layer 1110 which includes a floor plan 700 with a number of geo-fences 304. In some embodiments, the geo-fences are defined relative to the placement of markers 1112. These markers 1112 may be specifically placed to define geo-fences. In other embodiments, the markers 1112 formed by the dimensions of the room or floor, such as the corners of the room, stair cases, or doorways. In other embodiments, the markers 1112 are beacons, such as Bluetooth beacons. The geo-fences 304 may be formed in any shape, including triangles, rectangles, and polygons, as shown. Furthermore, the geo-fences 304 may be formed in three-dimensions, such that each geo-fence 304 may be defined by an x, y, and z coordinate. For example, a geo-fence 304 may be formed around one, two, or three entire floors, or even parts of multiple floors.

Figure 11B:
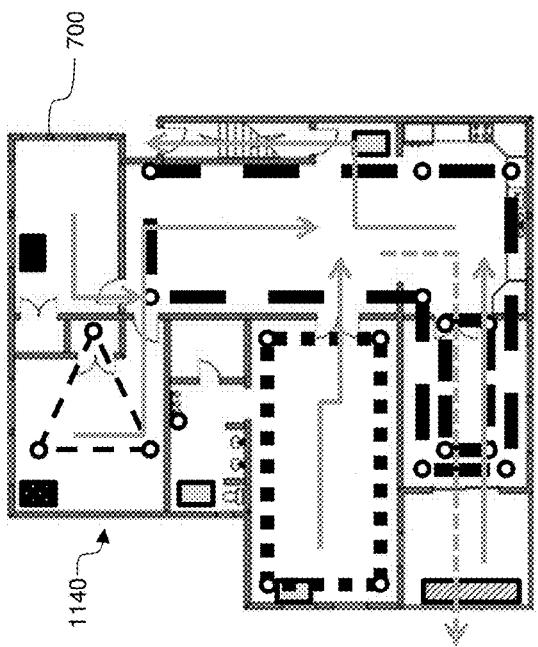
FIG. 11B illustrates another exemplary layer of an interactive emergency visualization, in accordance with some exemplary embodiments.

FIG. 11B shows layer 1120 which includes a two-dimensional floor plan 700 with a number of sensor markers. The sensor markers may represent the location, type, and status of various sensors. For example, the sensor marker 1124 may represent a smoke alarm that is in an alarm state, while the long, striped marker 1126 may represent a control display that is active. In some embodiments, the sensors markers 1122 may be included in individual layers. For example, all of the smoke alarms may be included in a single layer that is individually viewable by the operator. The sensor makers may include other types of networks, including existing mesh networks that are used for security purposes.

Figure 11C:
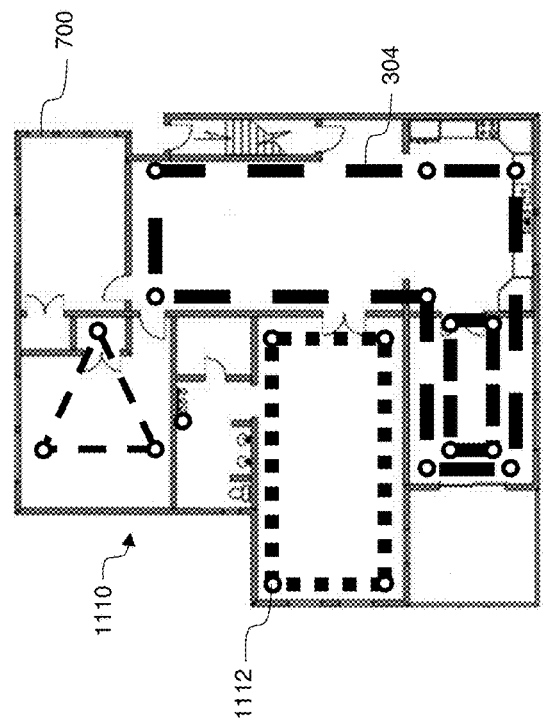
FIG. 11C illustrates another exemplary layer of an interactive emergency visualization, in accordance with some exemplary embodiments.

FIG. 11C shows layer 1130 which include a floor plan with an Emergency Access Plan (EAP) superimposed thereon. EAPs may be required in some buildings and generally show escape routes to be used in an emergency. EAPs may include optional routes, which may be represented by dashed lines. EAPs may be digitized and placed into the system 200 as separate layers. EAP layers may be shown in relation to the rest of the layers in the visualizations and may be used during an incident to show individuals the best way to escape. In one embodiment, when an incident in a particular building is detected by the system 200, the system will automatically transmit an EAP to all user devices located within the building—as determined by the location techniques discussed herein. In one example, the EAP will automatically be displayed on the user devices without any user input.

Figure 11D:
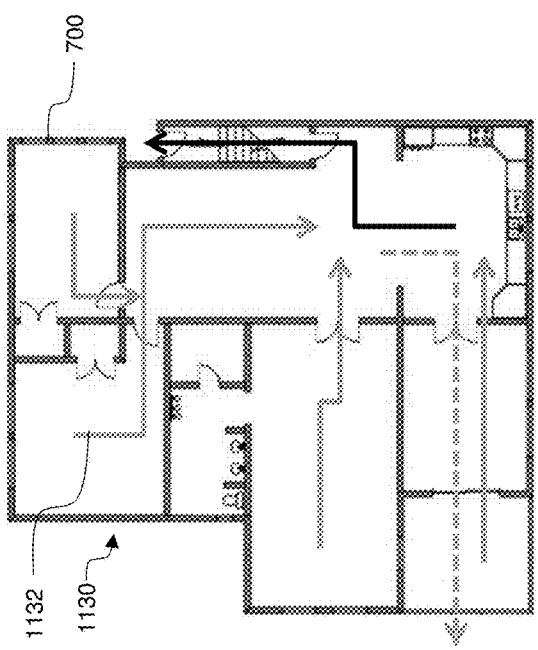
FIG. 11D illustrates another exemplary layer of an interactive emergency visualization, in accordance with some exemplary embodiments.

FIG. 11D shows layer 1140 which may include the other layers 1110, 1120, and 1130. Different combinations of layers may be visible by the operator.

FIGS. 12A-12C illustrate a method of defining a dynamic emergency escape route for an individual in a building during an incident or emergency, in accordance with some exemplary embodiments. In particular, individuals may be directed to take certain escape routes depending on the safety status of geo-fences in the building. In FIG. 12A, a visualization 1210 is shown with a floor plan, several escape routes 1202, 1204, and a safe zone 636. In some embodiments, an individual may located within a building during an incident. The individual may receive a visualization from the system 200, such as on a mobile device, directing the individual to the best escape route. In particular, the system 200 may transmit an emergency escape route visualization to user devices determined to be within a certain distance to an incident, where the distance may be defined by a geo-fence. Upon receipt of the visualization the app instance 584 executing the user device may display the visualization to the user upon demand or unprompted. In some embodiments, a geo-fence may be shown in the visualization 1210 with a safety status level. In the example of FIG. 12A, the individual is located within the geo-fence 1212, and both the geo-fence 1212 and the individual marker 511 show a safety status of "in danger." The individual is therefore directed to exit the building using a primary escape route 1202 or an alternate escape route 1204 that lead to a safe zone 636. In this case, the safe zone 636 is located outside the building. In some embodiments, the primary escape route 1202 may be determined as the shortest distance to get outside the building. In some embodiments, rule-based routing is used to generate the escape routes for individuals.

FIG. 12B shows a visualization 1220 with several defined geo-fences 1212, 1222, 1224. The individual is located the geo-fence 1212 with a status of "in danger" and is directed to exit by the visualization 1220. The primary escape route 1202 may be dynamically determined by the system 200 based on the status of other geo-fences 1222, 1224 that lie in the path of the escape route 1202. For example, the dotted geo-fence 1224 may represent a dangerous area and the primary escape route 1202 may pass through the geo-fence 1222, which may indicate a safer route. In some embodiments, the primary escape route 1202 may change over time due to the changing safety status levels of geo-fences. For example, 12C shows visualization 1220 at a later time than in FIG. 12B. The individual has left the geo-fence 1212 and has proceeded along the primary escape route 1202. However, the safety status levels of the other geo-fences 1222, 1224 has changed. In particular, geo-fence 1222 now shows a status of "in danger" while geo-fence 1224 now shows a "safe" status. The system 200 dynamically adjusts the primary route 1202 to guide the individual through the safer geo-fence 1224. In some embodiments, the escape routes may be optimized according to other factors, including total distance to safety or health of the individual. For example, a handicapped individual may be directed to follow a shorter route during an emergency where time is critical, such as a fire.

Figure 13:
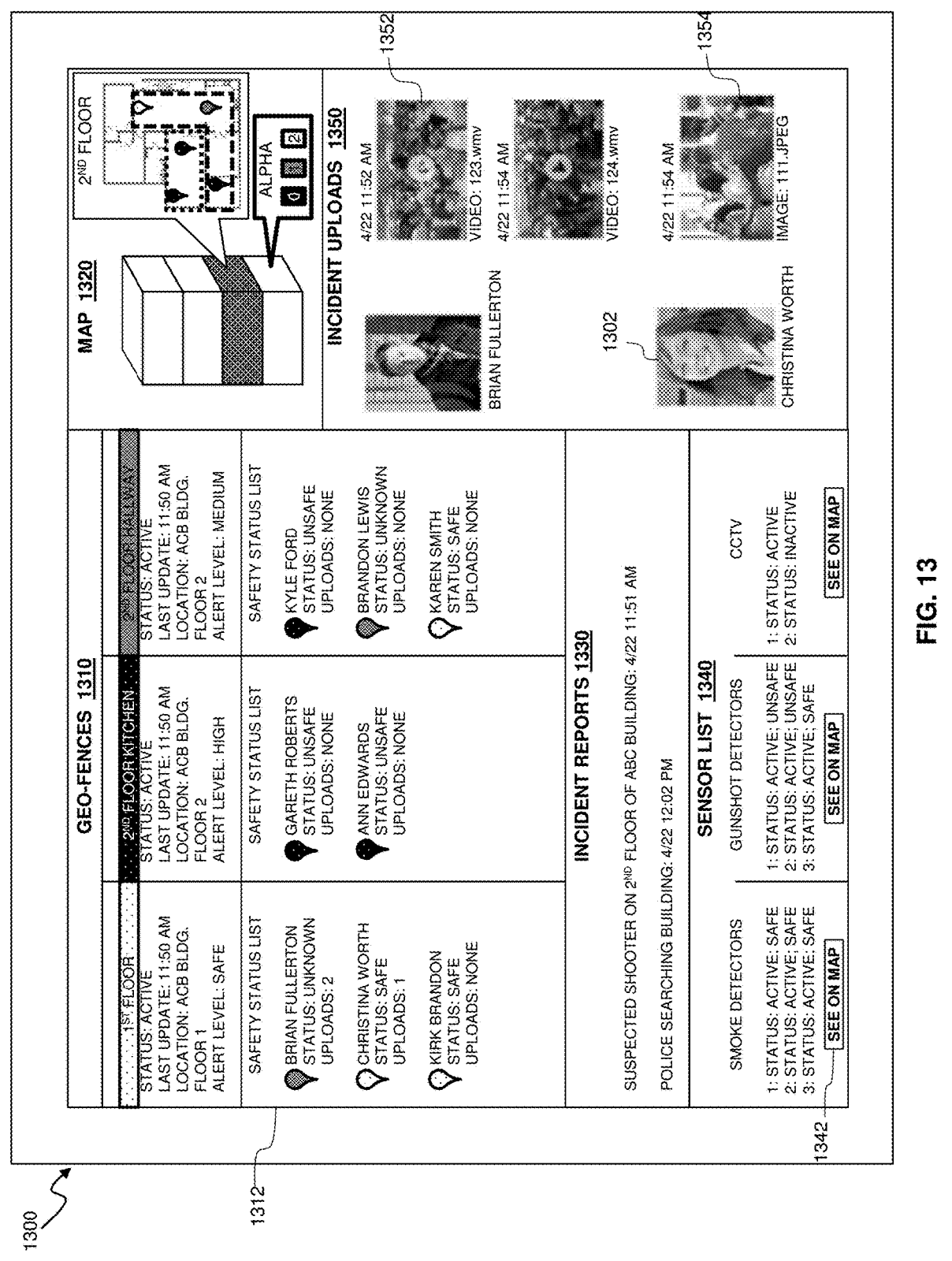

FIG. 13 shows an exemplary display 1300 which may be used to track aspects of an incident. The display 1300 may be displayed on any type of display device, such as a computer monitor, and may be part of the interactive emergency visualization system 200. In some embodiments, the display 1300 is configured to give an operator a high level view of an incident. The display 1300 may include a geo-fence window 1310, a map 1320, an incident report window 1330, a sensor list 1340, and an incident upload window 1350.

The geo-fence window 1310 may include information about the name and safety status level of each geo-fence. In the example of FIG. 13, the first floor geo-fence has a safe status, the second floor kitchen geo-fence has a status of "in danger," and the second floor hallway geo-fence has a status of "at risk." In some embodiments, the geo-fence window 1310 may include a safety status list 1312 for each geo-fence. The safety status list may include a list of individuals located within the geo-fence and their respective safety statuses. As discussed above in association with FIG. 5A, the system 200 may determine that individuals are in geo-fences corresponding to floors of a building using beacon-based location information received from the user devices associated with the individuals.

The information displayed in the geo-fence window 1310 may be displayed visually in the map 1320. In some embodiments, the map 1320 is operable to display any of the visualizations depicted in FIGS. 4A-4D, 6, 7, and 8, as well as other visualizations. In particular, the operator may expand the map 1320 to show more detailed information on any of the visualizations.

Still referring to FIG. 13, the incident report window 1330 may be used to display updates about the incident. In some embodiments, the incident report window 1330 includes information collected from news feeds, social media, law enforcement, and other sources. This information may include a time stamp to allow the operator to see when the report was received.

The sensor list 1340 may include a list of the sensors in the visualization. In some embodiments, this may include sensor systems within a building, such as smoke detectors, gunshot detectors, and CCTV cameras. The sensor list may include the status of each detector, as well as an optional tool 1342 to view the sensor of the map 1320. In some embodiments, the operator may press the tool 1342 to pull up a diagram showing the location and status of each sensor, such as those shown on layer 1120 in FIG. 11B.

The incident uploads 1350 may include media uploaded by individuals during an incident. A picture 1302 of the individual uploading media may be displayed alongside the media, including videos 1352, images 1354, and other forms of media. The media uploads may include time stamps. As in previous visualizations, the operator may be able to expand portions of the display 1300 by clicking on the windows. Expanded portions may include more detailed information about aspects of the display 1300.

Figure 14:
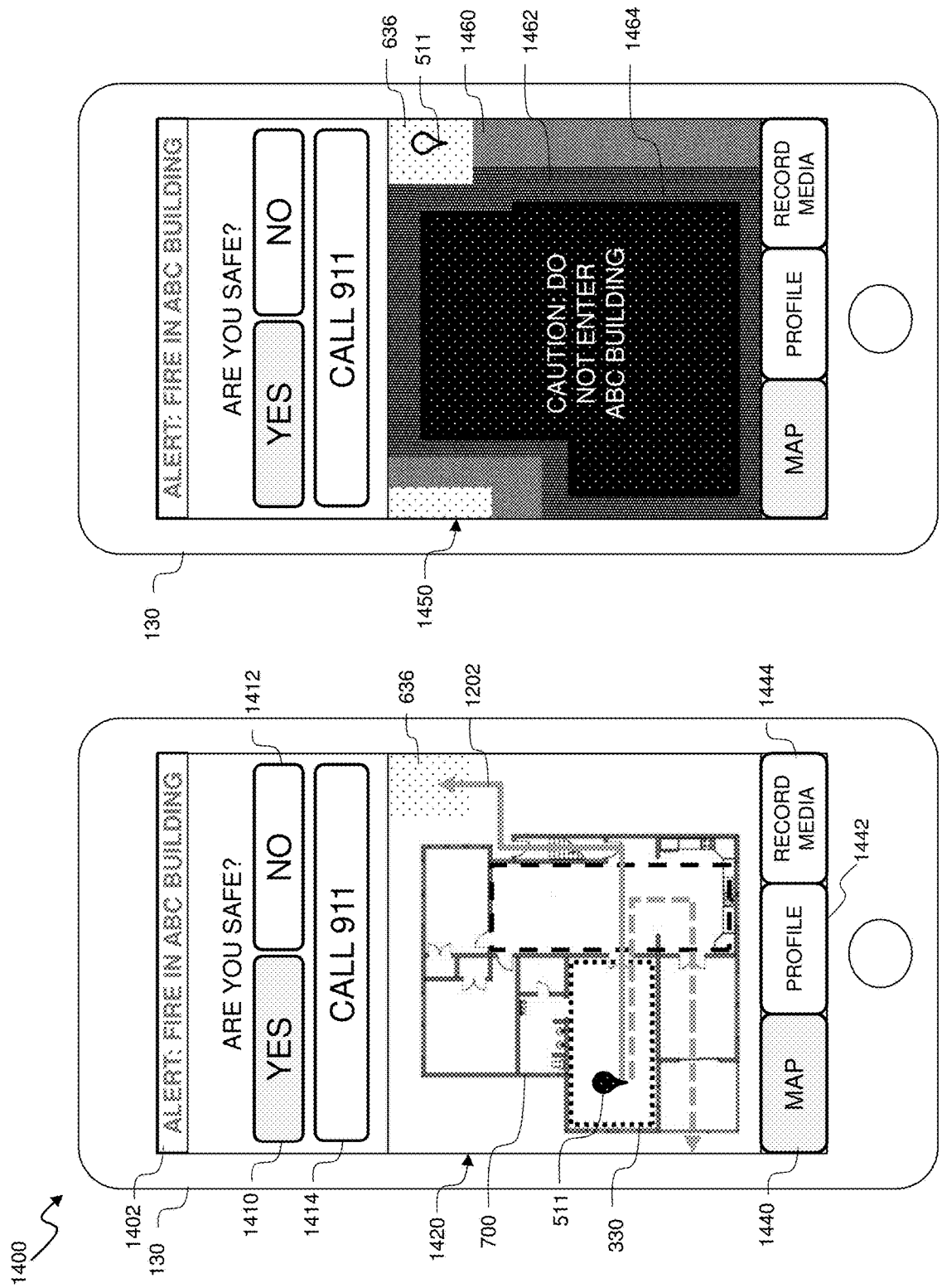
FIG. 14A illustrates an exemplary visualization displayed to an individual during an emergency, in accordance with some exemplary embodiments.
FIG. 14B illustrates another exemplary visualization displayed to an individual during an emergency, in accordance with some exemplary embodiments.
FIG. 14C illustrates exemplary user device permission levels and options, in accordance with some exemplary embodiments.
FIG. 14D illustrates other exemplary user device permission levels and options, in accordance with some exemplary embodiments.
FIG. 14E illustrates other exemplary user device permission levels and options, in accordance with some exemplary embodiments.

FIGS. 14A and 14B may show visualizations that may be transmitted to user devices 130 by the interactive emergency visualization system 200 and displayed to the individuals associated with the user devices. The visualizations may show different aspects of an incident and may display information differently according to the location and status of the individual. In some instances the visualizations may be rendered and displayed by an app instance 584 executing on the user device. In other instances, the visualizations may be rendered and displayed within the context of a web browser executing on the user device.

In FIG. 14A, an alert 1402 is displayed on the user device 130. The alert 1402 is accompanied by feedback tools 1410, 1412, and 1414. The individual may provide feedback on his or her status with the buttons 1410 and 1412, and may call 9-1-1 by selecting button 1414. The alert 1402 may also be accompanied by a visualization 1420. The visualization 1420 may include a map which is accessed by pressing the map button 1440. The map may include a floor plan 700 and one or more geo-fences 330. The location of the individual on the map may be displayed by the individual marker 511.

In the example of FIG. 14A, the individual is located within a geo-fence with a safety status level of "in danger." Accordingly, the individual is directed to exit the building via escape route 1202 toward a safe zone 636. As in FIGS. 12A-12C, the escape route 1202 may dynamically change over time according the status of geo-fences along the escape route 1202. The visualization 1420 may also include a profile button 1442 and an optional button 1444 for recording media.

FIG. 14B shows a visualization 1450 sent to another individual who is located away from dangerous areas. In particular, the individual is located in the safe zone 636, as shown by the location of the individual marker 511. Although the incident is the same in both visualizations 1420, 1450, the individuals may be shown a different view of the incident based on their proximity to the incident. In the example of FIG. 14B, the individual is shown a number of areas 1460, 1462, 1464 with different safety levels. These safety levels may warn the individual of risk levels associated with the incident.

FIG. 14C illustrates exemplary user device permission levels and options. In some embodiments, the options available to a user of a user device (such as user devices 130 and first responder user devices 162 shown in FIGS. 1A, 1B, and 2) may vary according to the type (or tier) of user accessing the device. Different types of users may have different permission levels. In some embodiments, a single app instance is provided to all types of users but the available options within the app instance may vary based on the user type. The available options in the app instance may be controlled by an authentication step such as a login, where different user types have different login credentials corresponding to different options. In other embodiments, different app instances with different features are provided to different user types. The user device 162 and/or app instance may be configured to support three or more tiers, as well as a tier for individuals not associated with a tier. For example, a "top tier" user may be a first responder from FEMA or DHS. Top tier users may have a high level of access including options as shown in screens 1401, 1403, 1405, 1407, 1409, which may be exemplary screens of a first responder user device 162 operated by a top tier user. These options may include activating and deactivating geo-fences in areas corresponding to their organizations, modifying geo-fence details and safety status levels, and the ability to see all individuals and first responders within active geo-fences corresponding to their organizations. "Second tier" users may include local first responders such as law enforcement individuals and fire fighters, as discussed in reference to FIG. 14D. "Third tier" users may include local responders such as security guards, as discussed in reference to FIG. 14E. In some embodiments, individuals that are not first responders are not included in a tier may not have the ability to see all individuals within geo-fences or edit the status, size, and shape of geo-fences. Individuals may also not be able to edit the safety status of other individuals.

FIG. 14D illustrates exemplary user device permission levels and options for "second tier" users. In some embodiments, second tier users may be first responders such as law enforcement individuals and fire fighters. In some embodiments, second tier users may have fewer options than top tier users. For example, options available to second tier users are shown in screens 1411, 1413, 1415, 1417. Second tier users may be able to see details about incidents and safety statuses of individuals, but may not be able to modify these details. Furthermore, second tier users may be able to activate geo-fences within their immediate areas. These local geo-fences may be modified by the second tier users. In some embodiments, second tier users may be able to see safety statuses and details regarding individuals in nearby geo-fences and geo-fences that the second tier users have activated.

FIG. 14E illustrates exemplary user device permission levels and options for "third tier" users. In some embodiments, third tier users may be local responders such as security guards. Third tier users may have fewer options available to them than the top tier or second tier users. For example, options available to third tier users are shown in screens 1421, 1423, 1425, 1427, 1429. In some embodiments, third tier users are only able to view details about the local geo-fence they are assigned to. They may also only be able to view details about individuals within this geo-fence. Third tier users may be able to activate this geo-fence, but not other geo-fences, and they may not be able to modify details about the geo-fence or change the safety status of users within the geo-fence.

Figure 15:
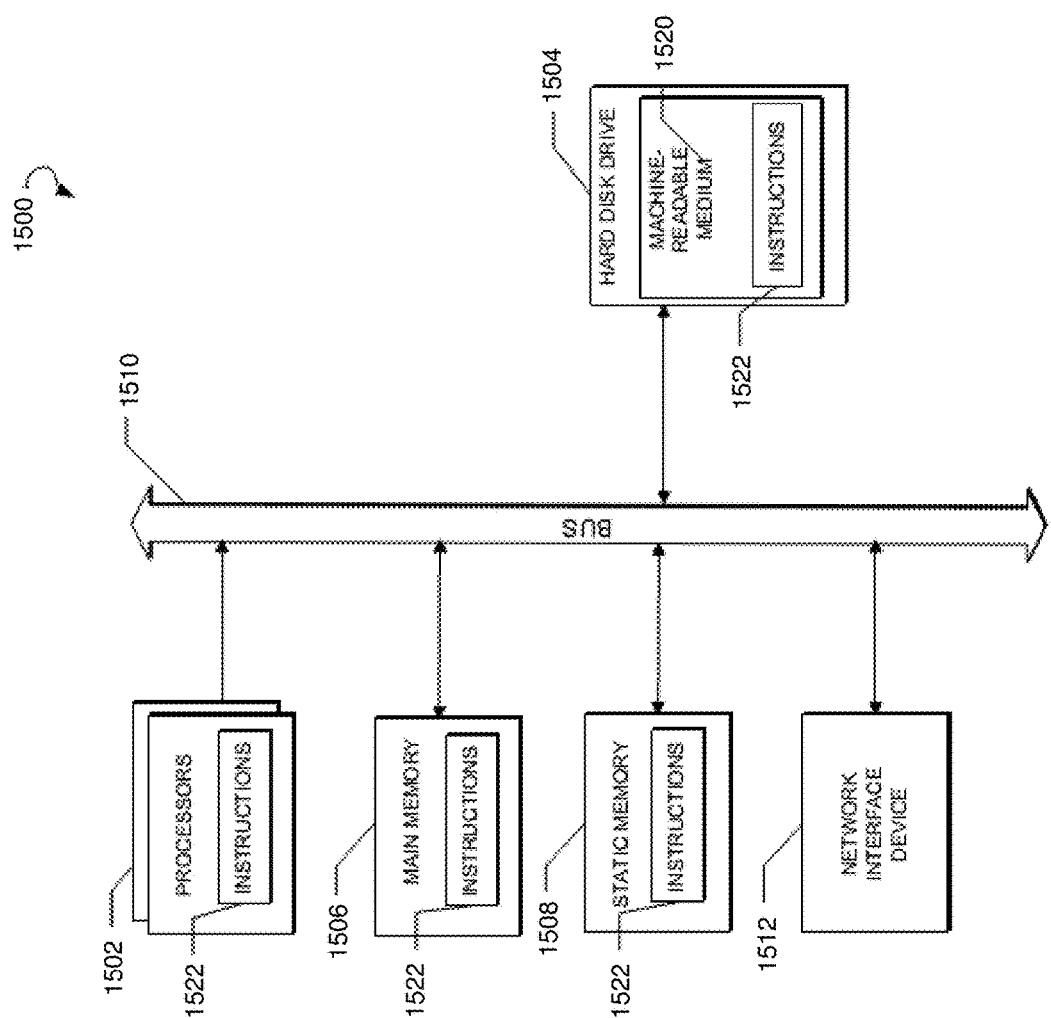
FIG. 15 illustrates a diagrammatic representation of a computing device for a machine in the exemplary electronic form of a computer system, within which a set of instructions for causing the machine to perform any one or more of the methodologies discussed herein may be executed.

In some embodiments, a system includes an interactive emergency visualization system configured to receive information about an incident and information representing locations of a plurality of user devices, each user device being associated with an individual. The interactive emergency visualization system is also configured to determine, based on the location information, which of the user devices are located within a geo-fence encompassing a geographical location of the incident. The system also includes a first tier application executing on a first user device, the first tier application configured to (i) receive, from the interactive emergency visualization system, and display the information about the incident and the information representing locations of the plurality of user devices and (ii) alter the geo-fence. The system also includes a second tier application, different from the first tier application, executing on a second user device, the second tier application configured to (i) receive, from the interactive emergency visualization system, and display a first subset of the information about the incident and a first subset of the information representing locations of the plurality of user devices and (ii) alter the geo-fence if the geo-fence is within the jurisdiction of the individual associated with the second user device. The system also includes a third tier application, different from the first and second tier applications, executing on a third user device, the third tier application configured to (i) receive, from the interactive emergency visualization system, and display a second subset of the information about the incident and a second subset of the information representing locations of the plurality of user devices and (ii) alter the geo-fence if the third user device is within the geo-fence. In one embodiment, the first, second, and third tier applications are the same application configured to receive login credentials via a user interface, wherein the login credentials differentiate options available in the user interface. In one embodiment the second subset of information about the incident and the second subset of the information representing locations of the plurality of user devices are respectively smaller than the first subset of information about the incident and the first subset of the information representing locations of the plurality of user devices. FIG. 15 shows a diagrammatic representation of a computing device for a machine in the exemplary electronic form of a computer system 1500, within which a set of instructions for causing the machine to perform any one or more of the methodologies discussed herein may be executed. In various exemplary embodiments, the machine operates as a standalone device or may be connected (e.g., networked) to other machines. The computer system 1500 may form part of the interactive emergency visualization system 200. In a networked deployment, the machine may operate in the capacity of a server or a client machine in a server-client network environment, or as a peer machine in a peer-to-peer (or distributed) network environment. The machine may be a personal computer (PC), a tablet computer, a set-top box (STB), a cellular telephone, a smart phone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 may include a processor or multiple processors 1502, a hard disk drive 1504, a main memory 1506 and a static memory 1508, which communicate with each other via a bus 1510. The computer system 1500 may also include a network interface device 1512 that provides wired and/or wireless access to communication networks, such as the Internet. The hard disk drive 1504 may include a computer-readable medium 1520, which stores one or more sets of instructions 1522 embodying or utilized by any one or more of the methodologies or functions described herein. The instructions 1522 may also reside, completely or at least partially, within the main memory 1506 and/or within the processors 1502 during execution thereof by the computer system 1500. The main memory 1506 and the processors 1502 also constitute non-transitory, machine-readable media.

While the computer-readable medium 1520 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media may also include, without limitation, hard disks, floppy disks, NAND or NOR flash memory, digital video disks (DVDs), RAM, ROM, and the like.

FIG. 16 shows location services provided by the system 200 and a method of three-dimensional location and visualization, such as the one described in association with FIGS. 4-13. The disclosure in FIG. 16 is intended to be read in conjunction with the methods and visualizations of FIGS. 4-13.

Figure 17:
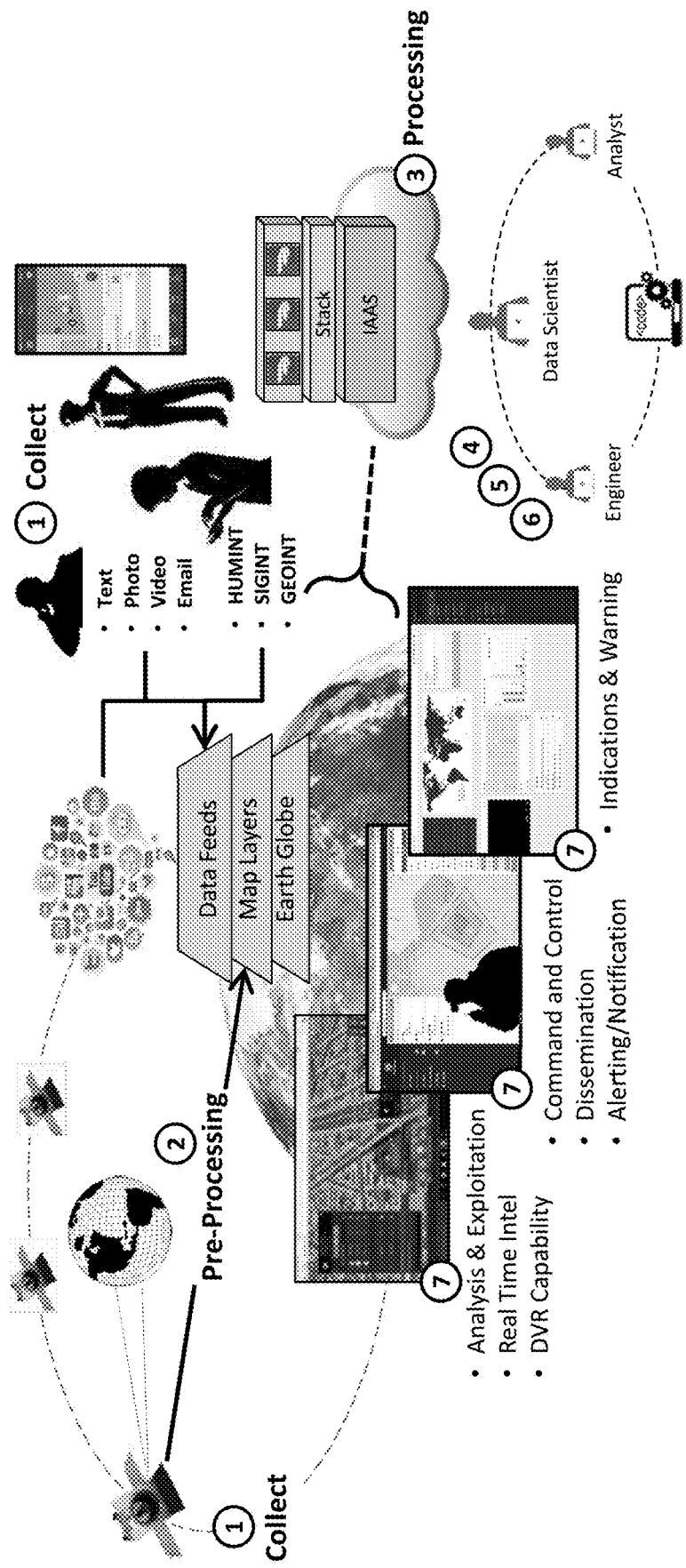
FIG. 17 illustrates steps of collection, processing, and analyzing in an interactive emergency visualization system, in accordance with some exemplary embodiments.

FIG. 17 shows steps of collection, processing, and analyzing, according to embodiments of the present disclosure, such as the embodiments discussed in association with FIG. 2. The disclosure in FIG. 17 is intended to be read in conjunction with FIG. 2.

Figure 18:
FIG. 18 illustrates an exemplary visualization of an intelligent geo-fencing method which may be performed by the interactive emergency visualization system, in accordance with some exemplary embodiments.

FIG. 18 shows an exemplary visualization of an intelligent geo-fencing method. In particular, various objects entering geo-fences may be tracked by location and status. For example, geo-fences may be used to track various vessels in relation to a port. The vessels may be clustered according to their location based on their distance from the port. Each vessel may also be assigned a status based on route, destination, origination, size, type, etc. This information may be used by a system to organize and facilitate communication between the various vessels and the port.

Figure 19:
FIG. 19 illustrates an exemplary visualization showing aspects of an intelligent geo-fencing method that may be performed by the interactive emergency visualization system, in accordance with some exemplary embodiments.

FIG. 19 shows an exemplary visualization showing aspects of an intelligent geo-fencing method. In some embodiments, geo-fences may be used to visualize real-time locations of assets, personnel, and vehicles on a single operating platform. The system 200 may also be used to integrate real-time video including footage from drones, CCTV, and dashboard cameras for real-time situational awareness.

Embodiments of the present disclosure include a method for visualizing an emergency, which comprises receiving, at a first time, incident location information describing the geographical location of an incident; displaying on a user interface a map of an area encompassing the location of the incident; displaying a graphical indication of the incident location on the map; receiving, at a second time subsequent to the first time, a first incident-related data element, the first incident-related data element including a content portion and a location portion describing the geographical location from which the first incident-related data element originated; displaying a user-selectable graphical representation of the first incident-related data element at a location on the map corresponding with the geographical location from which the first incident-related data element originated; receiving a user selection of the graphical representation of the first incident-related data element; and displaying, in response to the user selection, the content portion of the first incident-related data element. In some embodiments, the method further comprises showing data elements on the graphical representation occurring during the same time period. In some embodiments the content of the first incident-related data element is selected from one of a video, an image, and textual information. In some embodiments, the method further comprises establishing a geo-fence based on the incident location information; and displaying the geo-fence on the map. In some embodiments, the method further comprises altering the geo-fence based on the first incident-related data element; displaying the altered geo-fence on the map. In some embodiments, the method further comprises receiving a plurality of incident-related data elements; and in response to user input, displaying a subset of the plurality of incident-related data elements. In some embodiments, the subset is a selected based on the content portions of the plurality of incident-related data elements. In some embodiments, the subset is selected based on the respective time at which each incident-related data element originated.

Embodiments of the present disclosure include a method for visualizing an emergency, which comprises: displaying a visualization having three-dimensional depiction of a multi-floor building, each floor being independently selectable by a user; receiving a user selection of one of the floors; displaying a two-dimensional floor plan of the floor, the floor plan depicting a plurality of rooms; graphically differentiating each room based on emergency information about the safety status of each room; and graphically indicating the locations of users within each room. In some embodiments, the method further comprises graphically indicating the safety status of each user. In some embodiments, the method further comprises graphically displaying aggregated user safety statuses as an icon representing a plurality of user devices. In some embodiments, the icon is graphically color-coded according to the relative percentages of safety statuses of the individuals associated with the user devices. In some embodiments, the icon is associated with an icon of a beacon detected by the user devices represented by the icon. In some embodiments, the method further comprises graphically indicating a safe zone.

Embodiments of the present disclosure include defining geo-fences in an incident visualization, which comprises receiving incident information associated with a multi-room building, the information including a location of an incident within the building; defining a geo-fence for each room, the boundaries of each geo-fence corresponding with the boundaries of a respective room; determining a safety level for each room based on the location of the emergency within the multi-room building; receiving location information associated with the location of a user device physically located within the building, the user device being associated with an individual, and the location information indicating in which room the user device is physically located; determining in which geo-fence the user device is located; and assigning a safety status of the individual based on the geo-fence in which the user device is located. In some embodiments, the location information is based a location of a beacon within the multi-room building.

Embodiments of the present disclosure include a method for defining a dynamic emergency route on a visualization, which comprises receiving incident information associated with a multi-room building, the information including a location of an incident within the building; determining a safety level for each room based on the location of the emergency within the multi-room building; receiving location information associated with the location of a user device physically located within the building, the user device being associated with an individual, and the location information indicating in which room the user device is physically located; determining an evacuation route for the individual based on the respective safety levels of the rooms; and transmitting the evacuation route to the user device, such that it can be displayed to the individual. In some embodiments, determining the evacuation route includes determining a route that goes through rooms with the same or higher safety level than the room in which the user device is located. In some embodiments, the evacuation route is does not pass through rooms with a lower safety level than the room in which the user device is located. In some embodiments, the evacuation route is graphical form. In some embodiments, the evacuation route graphically depicts a route though the multi-room building.

The exemplary embodiments described herein may be implemented in an operating environment comprising computer-executable instructions (e.g., software) installed on a computer, in hardware, or in a combination of software and hardware. The computer-executable instructions may be written in a computer programming language or may be embodied in firmware logic. If written in a programming language conforming to a recognized standard, such instructions may be executed on a variety of hardware platforms and for interfaces to a variety of operating systems. Although not limited thereto, computer software programs for implementing the present method may be written in any number of suitable programming languages such as, for example, C, C++, C# or other compilers, assemblers, interpreters or other computer languages or platforms.

Thus, various interactive emergency visualization systems and methods have been described. Although embodiments have been described with reference to specific exemplary embodiments, it will be evident that various modifications and changes may be made to these embodiments without departing from the broader spirit and scope of the system and method described herein. Further, elements of different embodiments in the present disclosure may be combined in various different manners to disclose additional embodiments still within the scope of the present embodiment. For instance, elements from the described environments may be combined, exchanged, or otherwise altered to form additional embodiments. Accordingly, the specification and drawings are to be regarded in an illustrative rather than a restrictive sense.

What is claimed is:

1. A computer-implemented method for incident visualization, which comprises:
   receiving sensor information from at least one sensor device in a reporting area;
   determining that an incident has occurred based on the received sensor information;
   defining a first geo-fence around the incident, wherein the first geo-fence has a two-dimensional shape representing a first geographical region, such that the incident is located within the first geographical region;
   requesting current location information from at least one user device associated with an individual;
   receiving, in response to the request, current location information from the at least one user device; and
   displaying, with a display device, a graphical map comprising the received sensor information, a visual representation of the first geo-fence with a depiction of the incident within the first geo-fence, and a visual representation of the received current location information of the at least one user device in relation to the visual representation of the first geo-fence, wherein the shape of the first geo-fence is based on at least one geographical feature, further comprising displaying a visual representation of the geographical feature on the graphical map with the visual representation of the first geo-fence.

2. The method of claim 1, wherein the geographical feature is a building.

3. The method of claim 2, wherein the visualization comprises a representation of one or more floors within the building.

4. The method of claim 1, further comprising defining a second geo-fence representing a second geographical region different than the first geographical region; and
   displaying, with the display device, a visual representation of the second geo-fence.

5. The method of claim 4, wherein the second geo-fence has a two-dimensional shape.

6. The method of claim 4, wherein the second geo-fence has a three-dimensional shape.

7. The method of claim 4, wherein the second geo-fence represents a building and the first geo-fence represents a floor within the building.

8. The method of claim 7, wherein the visual representation comprises an indicator representing the current location information of the at least one user device within the floor of the building.

9. The method of claim 1, wherein the at least one sensor device comprises at least one of a smoke alarm, a gunfire detection system, an anti-drone system, a CCTV camera, a traffic camera, a radiation detector, a seismic alert system, and a pollution sensor.

10. The method of claim 1, wherein the visual representation further comprises a location of the at least one sensor device.

11. The method of claim 1, further comprising requesting safety status information from the at least one user device;
receiving, in response to the request, safety status information from the at least one user device; and
displaying, with the display device, the received safety status information.

12. The method of claim 1, wherein the sensor information from the at least one sensor device is used to generate a notification of the incident.

13. A computer-implemented method for incident visualization, which comprises:
receiving, with a processor, a first notification of an incident;
defining, with the processor, a geo-fence representing a first geographical region around the incident, wherein the shape of the first geo-fence is based on at least one geographical feature;
requesting, with the processor, current location information from at least one user device associated with an individual;
receiving, in response to the request, current location information from the at least one user device;
determining, with the processor, whether the at least one user device is within the geo-fence based on the received current location information;
transmitting, from the processor to the at least one user device, a second notification comprising information regarding the incident if the at least one user device is determined to be within the geo-fence; and
generating, with the processor, a report comprising the received current location information from the at least one user device, a visual depiction of the defined geo-fence, a visual depiction of the at least one geographical feature in relation to the defined geo-fence, the incident within the defined geo-fence and any user devices determined to be within the geo-fence, and the information regarding the incident.

14. The method of claim 13, wherein the second notification comprises at least one of a text message, a push alert, and a phone call.

15. The method of claim 13, further comprising transmitting, with the processor, a request for feedback from the at least one user device;
receiving, in response to the request, feedback from the at least one user device; and
generating, with the processor, the report comprising the feedback.

16. A computer-implemented method for incident visualization, which comprises:
receiving, with a processor, a notification of an incident;
defining, with the processor, a first geo-fence in proximity to the incident, the first geo-fence representing a first geographical region around the incident, wherein the first geographical region is based on at least one geographical feature;
requesting, with the processor, current location information from at least one user device associated with an individual;
transmitting, from the user device to the processor, current location information based on the request;
generating, with the processor, a visualization of the at least one user device, the first geo-fence, and the incident within the first geo-fence based on the current location information of the at least one user device and the notification of the incident;
determining an access level of a third party based on credentials of the third party, such that a higher access level is granted access to more data than a lower access level; and
transmitting, from the processor to the third party, aspects of the generated visualization based on the access level of the third party.

17. The method of claim 16, wherein an access level of a civilian is different than an access level of a first responder such that a transmission of the generated visualization to the civilian comprises less data than a transmission of the generated visualization to the first responder.

18. The method of claim 16, wherein the aspects of the generated visualization comprise activating or deactivating geo-fences, modifying geo-fence details, modifying safety status levels of one or more individuals, and viewing all individuals and first responders within the first geo-fence.

19. The method of claim 18, wherein the access level of the third party comprises a first tier representing high level first responders, a second tier representing local law enforcement, and a third tier representing local responders.

20. The method of claim 19, wherein the first tier grants greater abilities to view and modify the aspects of the generated visualization than the second tier, wherein the second tier grants greater abilities to view and modify the aspects of the generated visualization than the third tier.

21. The method of claim 16, wherein the third party is associated with a security company.

22. The method of claim 16, wherein the third party is security personnel with responsibility for the security of a building.

23. The method of claim 22, wherein the aspects of the generated visualization transmitted to the security personnel correspond to the building.

* * * * *